United States Patent
Rosamond

(10) Patent No.: US 11,885,115 B2
(45) Date of Patent: Jan. 30, 2024

(54) SYSTEM AND METHOD FOR LOW-COST STRUCTURE FABRICATION AND DEPLOYMENT

(71) Applicant: Future Earth, Inc., Dover, DE (US)

(72) Inventor: Jason Rosamond, Scottsdale, AZ (US)

(73) Assignee: Future Earth, Inc., Dover, DE (US)

( * ) Notice: Subject to any disclaimer, the term of this patent is extended or adjusted under 35 U.S.C. 154(b) by 251 days.

(21) Appl. No.: 17/465,151

(22) Filed: Sep. 2, 2021

(65) Prior Publication Data
US 2022/0074193 A1 Mar. 10, 2022

Related U.S. Application Data

(60) Provisional application No. 63/076,301, filed on Sep. 9, 2020.

(51) Int. Cl.
| | | |
|---|---|---|
| *E04B 1/343* | (2006.01) | |
| *E04H 1/12* | (2006.01) | |
| *G06K 19/07* | (2006.01) | |
| *H04W 4/029* | (2018.01) | |
| *G01S 19/14* | (2010.01) | |

(52) U.S. Cl.
CPC ...... *E04B 1/34321* (2013.01); *E04B 1/34384* (2013.01); *E04H 1/1205* (2013.01); *G01S 19/14* (2013.01); *G06K 19/0723* (2013.01); *H04W 4/029* (2018.02); *E04B 1/34317* (2023.08)

(58) Field of Classification Search
CPC .............. E04B 1/34321; E04B 1/34384; E04B 1/34317; E04H 1/1205
See application file for complete search history.

(56) References Cited

U.S. PATENT DOCUMENTS

| | | | | |
|---|---|---|---|---|
| 2,647,287 A | * | 8/1953 | Jones ................... | E04B 1/34321 D25/33 |
| 2,846,732 A | * | 8/1958 | Burns .................... | E04B 1/2612 403/56 |
| 3,512,316 A | * | 5/1970 | Parr ...................... | E04B 1/34321 52/270 |
| 3,527,008 A | * | 9/1970 | Greenhalgh ............ | B66C 1/666 52/749.1 |
| 3,543,462 A | * | 12/1970 | Spratt ..................... | E04B 2/825 52/698 |
| 3,600,870 A | * | 8/1971 | Greenhalgh ........... | E04B 1/3538 52/745.11 |

(Continued)

FOREIGN PATENT DOCUMENTS

WO 2019/239130 12/2019

OTHER PUBLICATIONS

International Search Report and Written Opinion issued in PCT/US2021/048836, dated Dec. 15, 2021, 12 pages.

*Primary Examiner* — Rodney Mintz
(74) *Attorney, Agent, or Firm* — King & Spalding

(57) ABSTRACT

There is provided a structure that is a prefabricated (or systems-built) building space including a floor assembly, modular wall assemblies, and a roof assembly. The structure may at any time be connected to one or more other structures or prefabricated room extensions to form integrated building spaces. The structure is attached in a semi-permanent connection to a helical pier foundation assembly. The structure can include a locking mechanism adapted to be removably fastened to the floor assembly and the foundation assembly.

16 Claims, 56 Drawing Sheets

(56) References Cited

U.S. PATENT DOCUMENTS

| | | | | |
|---|---|---|---|---|
| 3,681,886 | A * | 8/1972 | Ekstrom | E04B 2/58 |
| | | | | 52/489.1 |
| 4,744,111 | A * | 5/1988 | Tegg | E04B 1/34321 |
| | | | | 4/460 |
| 6,003,280 | A | 12/1999 | Wells | |
| 6,094,873 | A | 8/2000 | Hoffman et al. | |
| 8,978,319 | B2 * | 3/2015 | Patino | E04H 1/02 |
| | | | | 52/745.02 |
| 9,206,595 | B2 * | 12/2015 | Rutledge | E04B 1/34315 |
| 10,731,329 | B1 * | 8/2020 | Novikov | E04B 1/3483 |
| 2006/0026922 | A1 * | 2/2006 | Li | E04B 1/34321 |
| | | | | 52/586.2 |
| 2006/0248807 | A1 | 11/2006 | Penna | |
| 2012/0005968 | A1 * | 1/2012 | Patino | E04H 1/02 |
| | | | | 52/745.13 |
| 2012/0304549 | A1 * | 12/2012 | Rutledge | E04B 7/028 |
| | | | | 52/302.1 |
| 2019/0100917 | A1 | 4/2019 | Malinoswski et al. | |
| 2023/0061113 | A1 * | 3/2023 | Keller | E04B 1/14 |
| 2023/0167636 | A1 * | 6/2023 | Keller | E04B 1/14 |
| | | | | 52/91.3 |

* cited by examiner

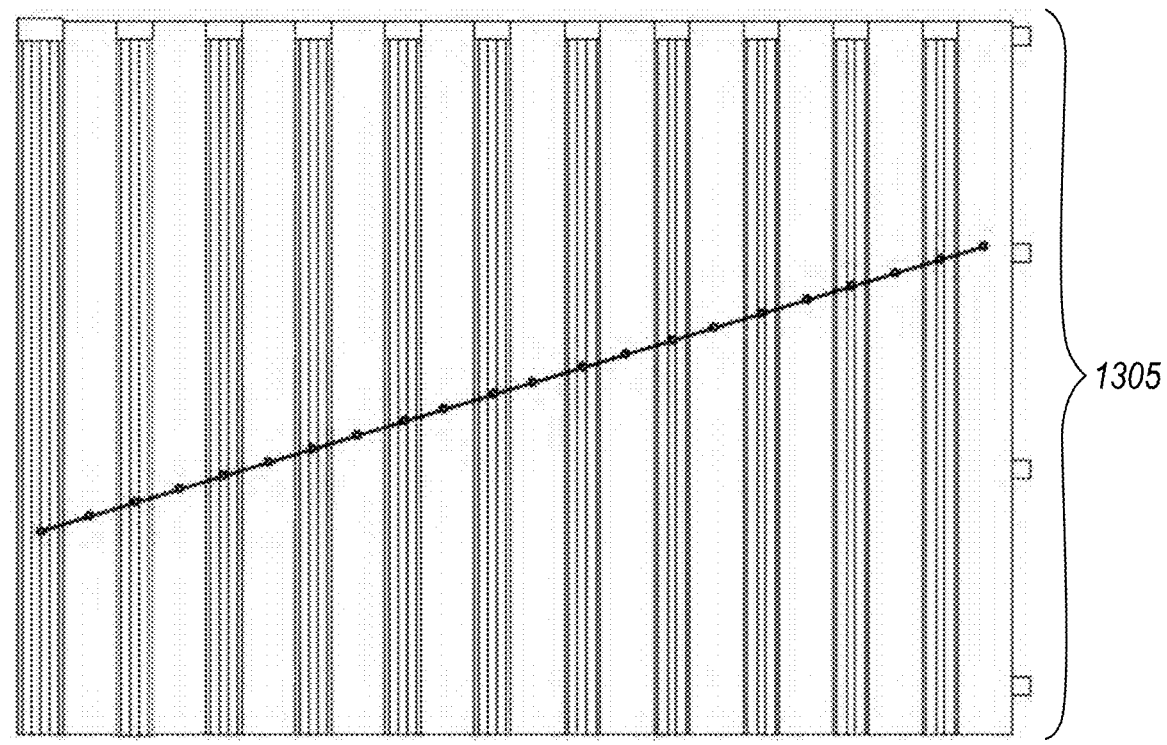
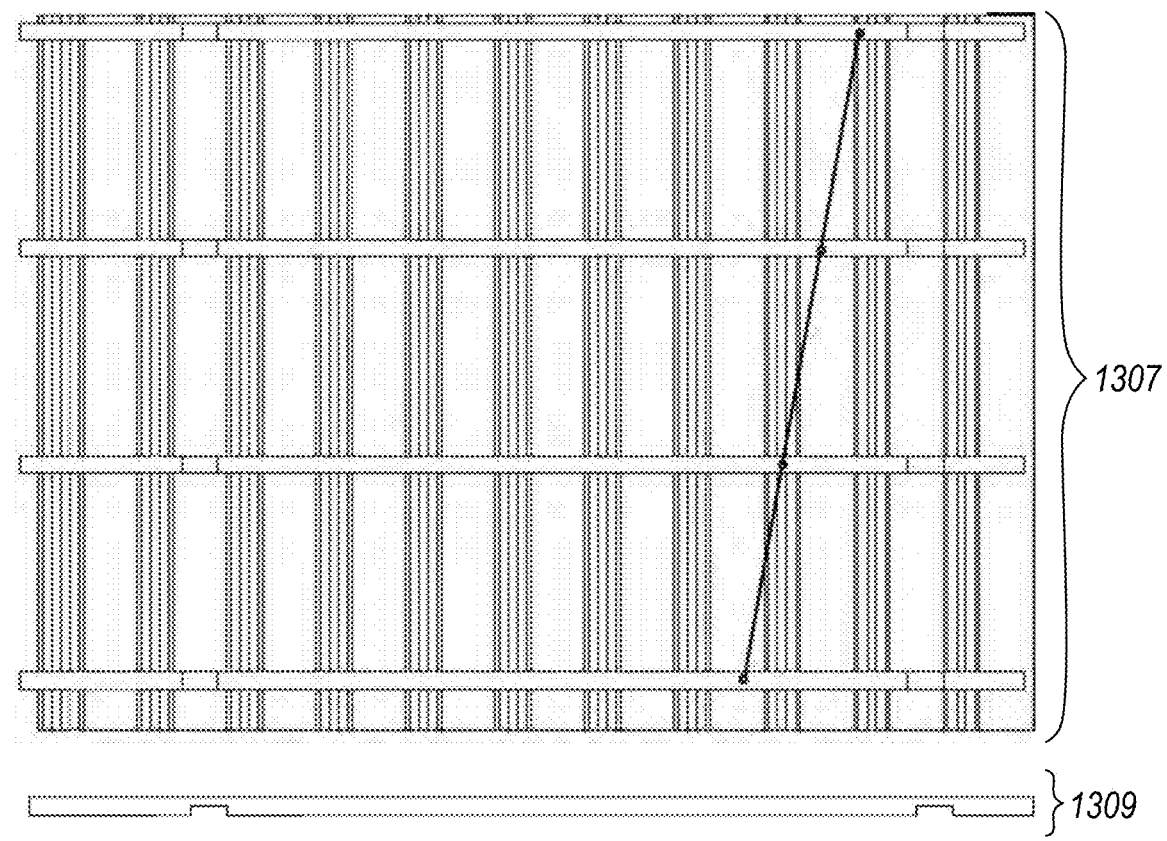
FIG. 13D

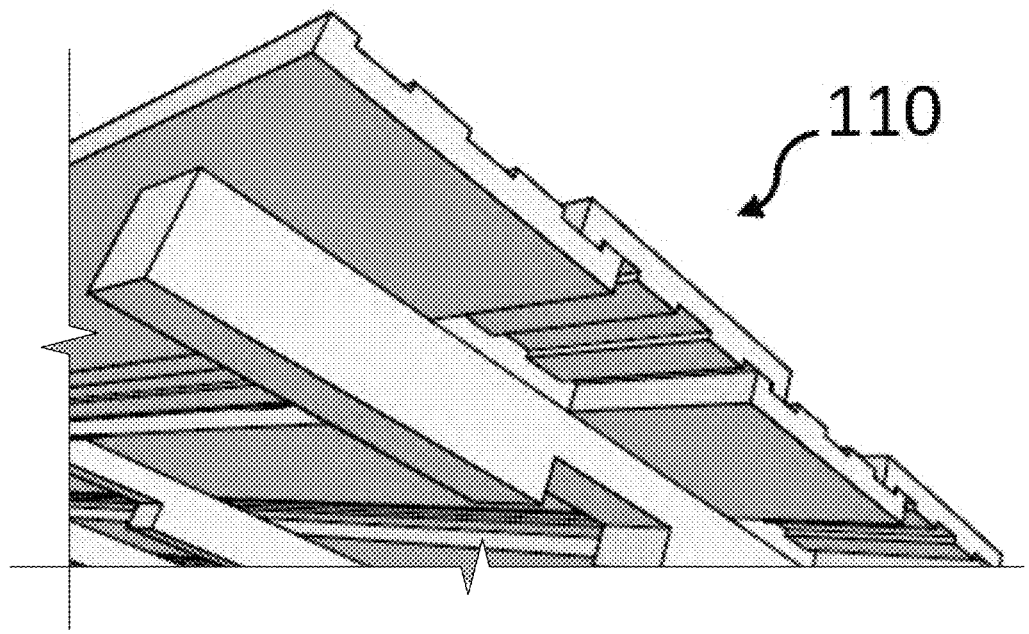
FIG. 13E1
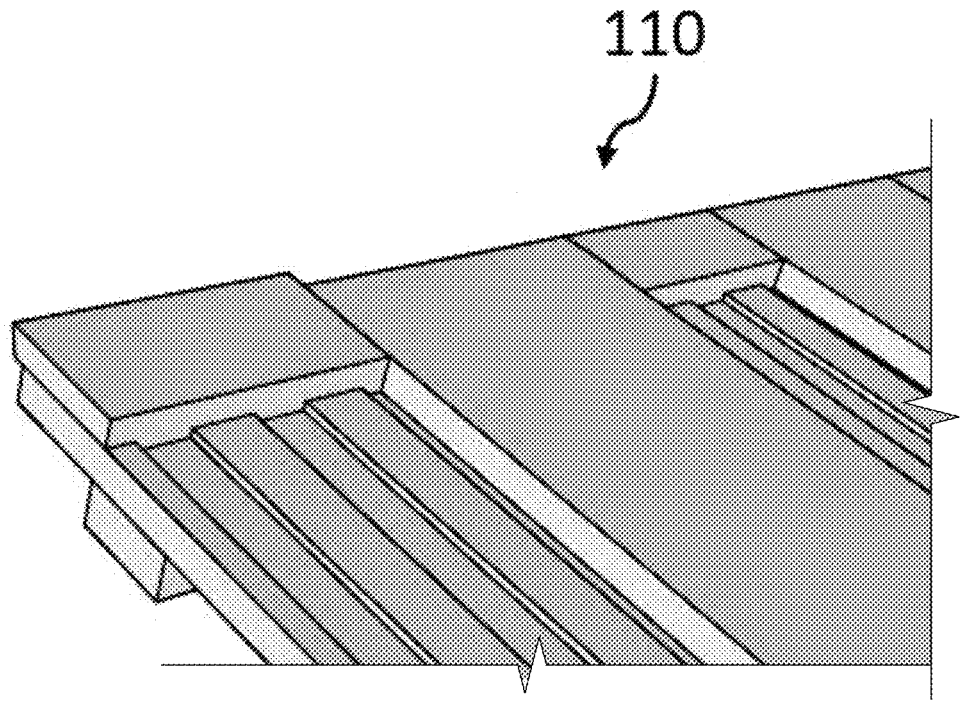
FIG. 13E2

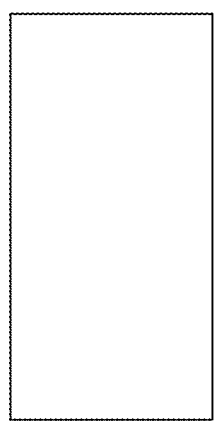
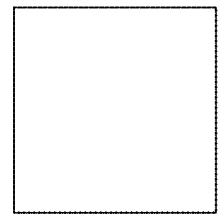
FIG. 29A    FIG. 29B

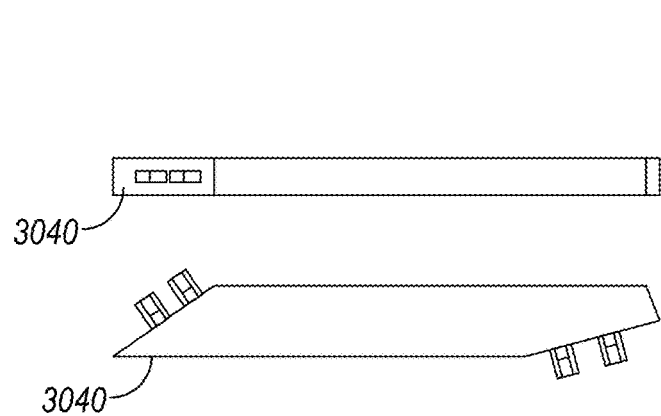
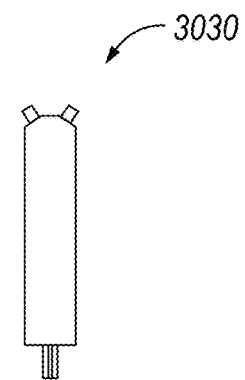
FIG. 30C　　　　　　　　　　FIG. 30D
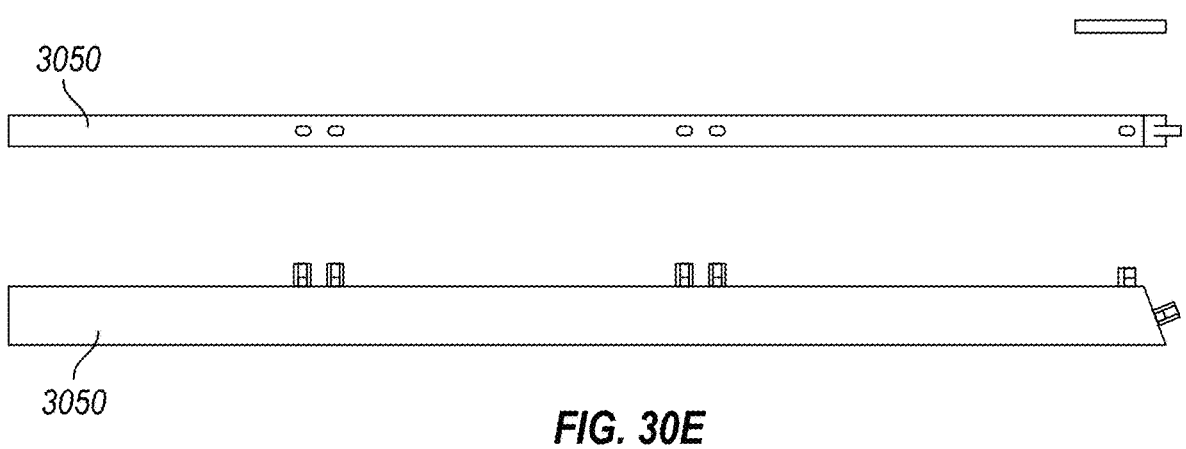
FIG. 30E

| MEMBER CONNECTION | MEMBER SIZES | QUANTITY & FASTENER SIZE | PILOT HOLE (IF REQUIRED) | RECOMMENDED MANUFACTURE |
|---|---|---|---|---|
| BOTTOM & TOP PLATES TO STUDS | 40mm to STUDS | (2) - 4.8mm x 76.2mm (min) #STUD | 7/64" (2.8mm) | SDWS16300KT5 |
| WALL CLEAT TO SIDING | 40mm to 16mm | (2) - 4.2mm x 50.8mm (min) #BOARD | 3/32" (2.4mm) | DSV12RL5 |
| WALL CLEAT TO STUDS | 40mm to 100mm | (2) - 4.8mm x 76.2mm (min) #STUD | 7/64" (2.8mm) | SDWS16300KT5 |
| FLOOR DECKING TO JOIST NAILER | 25mm to 80mm | (1) - 4.2mm x 63.5mm (min) #BOARD | 3/32" (2.4mm) | DSV212RL5 |
| JOIST NAILER TO FLOOR JOIST | 40mm to 40mm | (1) - 4.8mm x 63.5mm (min) @ 220mm C/C | 7/64" (2.8mm) | SDWS16220KT5 |
| FLOOR BAND JOIST TO FLOOR JOIST | 40mm to 50mm | (3) - 4.8mm x 76.2mm (min) #JOIST | 7/64" (2.8mm) | DSV212RL5 |
| CONNECTOR BLOCK TO STUD | 40mm to 50mm | (3) - 4.8mm x 76.2mm (min) #STUD | 7/64" (2.8mm) | SDWS16300KT5 |
| ROOFING TO ROOFING BATTENS | 16mm to 50mm | (2) - 4.2mm x 50.8mm (min) #BOARD | 3/32" (2.4mm) | DSV12RL5 |
| ROOFING BATTEN TO TRUSS BATTEN | 50mm to 50mm | (1) - 4.8mm x 76.2mm (min) @ 300mm C/C | 7/64" (2.8mm) | SDWS16300KT5 |
| TRUSS BATTEN TO TRUSS CHORD | 50mm to 100mm | (3) - 4.8mm x 76.2mm (min) #JOIST | 7/64" (2.8mm) | SDWS16300KT5 |
| TRUSS TO WALL (TOP PLATE) | 100mm to 50mm | (2) - 5.5mm x 203.2mm (min) #TRUSS | 1/8" (3.2mm) | SDWH08300DB-RPI |
| RIDGE BOARD TO ROOFING | 16mm to 16mm | (2) - 4.2mm x 50.8mm (min) #BOARD | 3/32" (2.4mm) | DSV12RL5 |
| WALL CORNER BOARD TO SIDING | 16mm to 16mm | (2) - 4.2mm x 50.8mm (min) @ 400mm C/C | 3/32" (2.4mm) | DSV12RL5 |
| WINDOW DOOR TO WALL STUDS | 32mm to 50mm | (4) - 4.2mm x 63.5mm (min) @ 400mm C/C | 3/32" (2.4mm) | DSV212RL5 |
| HELICAL PILES TO FLOOR BEAM/JOIST | STL TO JOIST | (8) - 7.0mm x 101.6mm (min) @ 400mm C/C | 5/32" (4.0mm) | SDWH27400G-RPI |
| EAVE BLOCKING TO TRUSS CHORD | POCKET SCREWS | (4) - 4.8mm x 63.5mm (min) #BLOCK | SPECIALTY BIT | SML-C150 |
| WINDOW FRAME HEAD/SILL TO STYLE | POCKET SCREWS | (4) - 4.2mm x 63.5mm (min) @ EA CORNER | SPECIALTY BIT | SML-C1525 |

*FIG. 31*

SYSTEM AND METHOD FOR LOW-COST STRUCTURE FABRICATION AND DEPLOYMENT

CROSS-REFERENCE TO RELATED APPLICATION

This application claims priority to and the benefit of U.S. Provisional Application No. 63/076,301, filed on 9 Sep. 2020, entitled "SYSTEM AND METHOD FOR LOW-COST STRUCTURE FABRICATION AND DEPLOYMENT," the entire contents of which is hereby incorporated herein by reference.

TECHNICAL FIELD

The present disclosure relates to systems and methods for fabricating low-cost, lightweight, rapidly deployable building structures from locally sourced lumber, with modular assemblies designed to ease construction and reconfiguration with minimally skilled labor. Embodiments of the present disclosure offer the ability to reconfigure the building structure to add, move, or re-arrange, walls, windows, doors, or ventilation features. Certain embodiments also provide for ease of expansion of the building structure with minimal revision to the original structure.

BACKGROUND

Today, housing options are extremely limited in markets around the world where personal incomes are constrained (or nonexistent), and in locales such as sub-Saharan Africa, informal housing is often constructed of local found objects combined with what materials can be afforded for construction. In higher income areas, construction of most conventional homes requires complex architectural plans, careful planning and delivery of construction materials obtained from far-distant factories, and significant skilled labor resulting in relatively high costs and construction timeframes elapsing many weeks to months before a home may be available for occupation by residents. Further, pre-fabricated homes that are remotely constructed and hauled to a site of use also require substantial cost to build and transport, and both the pre-fabricated homes and bespoke construction utilize a significant amount of inorganic materials that are frequently expensive and unsustainable or environmentally undesirable in their manufacture, delivery, and use.

What is needed is a sustainable, affordable building structure that may be fabricated from locally sourced lumber, fabricated into transportable modules that utilize minimal connector hardware, and quickly assembled onsite with minimally skilled labor and with a minimum of inorganic hardware. What is further needed is a housing structure that can be reconfigured in a modular fashion without need to demolish or rebuild the original structure. What is additionally needed is a housing structure that is affordable by persons of minimal income, and can be supported financially through inclusion in innovative farm and distribution networks. What is also needed is a movable housing structure that can be selectively locked to a foundation element and in the event of foreclosure, can be selectively unlocked, and moved to a different location.

SUMMARY

As used herein, the term "structure" can generally refer to any type of building that may be fabricated according to methods of the present disclosure, and may include such structures as a structure, a residence, a business, a rural shop, a delivery/distribution point, a convenience store, a storage facility, a mercantile, a school, a store, a warehouse, a factory, an address point of origin, a power production facility, or any other structure whether residential or commercial in nature. In a preferred embodiment, as shown as the structure 100 in FIG. 1 (also referred to as a modular structure 100), the structure of the present disclosure may comprise a structure, having an approximate footprint of 3 m by 5 m (where "m" denotes "meters"). In certain embodiments, the structure is affordable and may qualify for financing even by those of very limited income, and in one configuration from locally sourced products, may have an approximate cost of $1,650.00 US, delivered.

There is provided a structure 100 of the present disclosure such as a "housing unit" or an integrated collection of structures/housing units, in which: the structure is a prefabricated (or systems-built) building space manufactured in various sizes; the structure 100 is able to function independently as a standalone building space; the structure 100 may at any time be connected to one or more other structures or prefabricated room extensions to form integrated building spaces; the structure 100 is attached in a semi-permanent connection to a helical pier foundation, the connection to which may be locked to prevent disconnection, and may later be unlocked; the semi-permanent connection allows the structure(s) to later be removed from the helical pier foundation, transported to another location, and attached to a foundation at that new location.

As described in depth below, the systems-built modular assemblies of the disclosed structure can allow remote fabrication in an efficient factory/mill setting, allowing processing of raw timber into lumber and assembly of panels that will comprise the assembled structure. The panels can be designed to be size and weight constrained to be easily banded and trucked to the construction site to be assembled by minimally skilled workers. Thus, the modular assemblies and panels of the structure 100 may be delivered to a construction site and assembled into the structural form within about a day. In one configuration, an exemplary embodiment of a structure 100 of the present disclosure may weigh approximately 5,600 pounds, and when assembled, may be lifted intact from its foundation (e.g. helical piers, as mentioned in more detail below) through a lifting device such as a 30,000-pound forklift, allowing for relocation of the assembled structure; however, as a feature of the present disclosure, modular construction of the structure allows a straightforward disassembly and reassembly at a second site without heavy lifting equipment, should relocation of the structure be desired.

The structure 100 may be equipped with a mobile ID/GPS locator tag embedded in the roof for associating a particular structure 100 with a physical location, which may be of particular value when address systems have not been defined for the construction site. Association of a particular structure 100 with a physical geolocation point may support identification of the structure 100 as a node in a structural network, allowing ease of delivery of new building panels for future expansion and may enable the occupants of the structure 100 to participate in an economic model that provides income to assist with mortgage payments or upkeep for the structure 100. Further, as embodiments of the present disclosure are systems-built, the occupant of a particular structure 100 may order additional rooms of any size at any time and have them seamlessly integrated on site in a short period (e.g., one day).

One or more structure 100 of the present disclosure may be provided with ventilation in a variety of ways; in addition to configuring a desired number of modular panels with windows, any wall panel segment can be removed and replaced at will to increase or decrease ventilation beyond existing number of doors and windows. In various embodiments, closed windows with screens and doors may provide a level of protection against a variety of insect disease vectors (such as malaria-carrying mosquitos).

Preferred embodiments of structures of the present disclosure are assembled primarily from wood, a renewable and sustainable product. Locally sourced indigenous woods are of particular value, as they reduce costs and environmental impact from distant transportation, and provide economic stimulus from harvesting and processing. Any appropriate wood may be used in constructing all or part of the structure 100, and types of wood may reflect locally available and sustainably obtained lumber to minimize environmental impact and reduce cost. Regional considerations may further guide selection of materials, such as the broad range of timber sources in African regions. For example, *Brachystegia spiciformis* may be used as a main lumber species for structures constructed in Southern Africa. Other appropriate species may include *Burkea africana, Julbernardia globiflora*, and *Brachystegia boehmii*. For lumber that is intended to be used in windows, doors, or other millwork applications, *Pterocarpus angolensis* may be used in in Southern Africa locations and *Pterocarpus soyauxii* may be used in West Africa locations. Other species for windows and doors could include *Afzelia quanzensis* in Southern Africa and *Afzeliz africana* in West Africa. Other species such as *Bridelia micrantha* may be considered in certain applications.

As described in more detail below, design of the modular assemblies can reduce the use of inorganic fasteners and connectors by use of innovative structural connection features: for example, the use of trusses with floating tenons, half-lap joints for interconnection of roof finish to battens, mortice-tenon-wedge tensioning wall interconnection, roofing material from overlapping wood members with backout relief cuts; angled batten panel interfaces, and the use of wood filler blocks to provide environmental protection against precipitation and insect entry. Further, the use of helical piers as a foundational element reduces the need for expensive and time-consuming concrete pours, provides for separation of wood from moist/wet areas below the structure 100, allows for ventilation below the structure 100, provides a mechanism for quick removal of the structure 100 from the foundation, and allows for rapid installation by minimally skilled labor.

BRIEF DESCRIPTION OF THE DRAWINGS

A more complete understanding of the present disclosure may be derived by referring to the detailed description and claims when considered in connection with the following illustrative figures. Like reference numerals refer to like components between the various figures. While measurements, tolerances, and dimensions are shown in the figures, these are to be considered exemplary embodiments only, but may include in some instances, preferred embodiments.

FIG. 13D illustrates a top plan view of a roofing panel according to various embodiments of the present disclosure.

FIG. 13E1 illustrates a partial underside perspective view of a roofing panel according to various embodiments of the present disclosure.

FIG. 13E2 illustrates a partial top side perspective view of a roofing panel according to various embodiments of the present disclosure.

FIGS. 29A and 29B respectively show exemplary cross sectional views of roof members comprising a truss batten and a roof batten according to various embodiments of the present disclosure.

FIG. 30C shows a plan view of a web member according to various embodiments of the present disclosure.

FIG. 30D illustrates an elevational view of a web post according to various embodiments of the present disclosure.

FIG. 30E shows a plan view of a top chord according to various embodiments of the present disclosure.

FIG. 31 presents an exemplary list and specification for fasteners used in constructing various portions of the structure according to various embodiments of the present disclosure.

Figure 1:
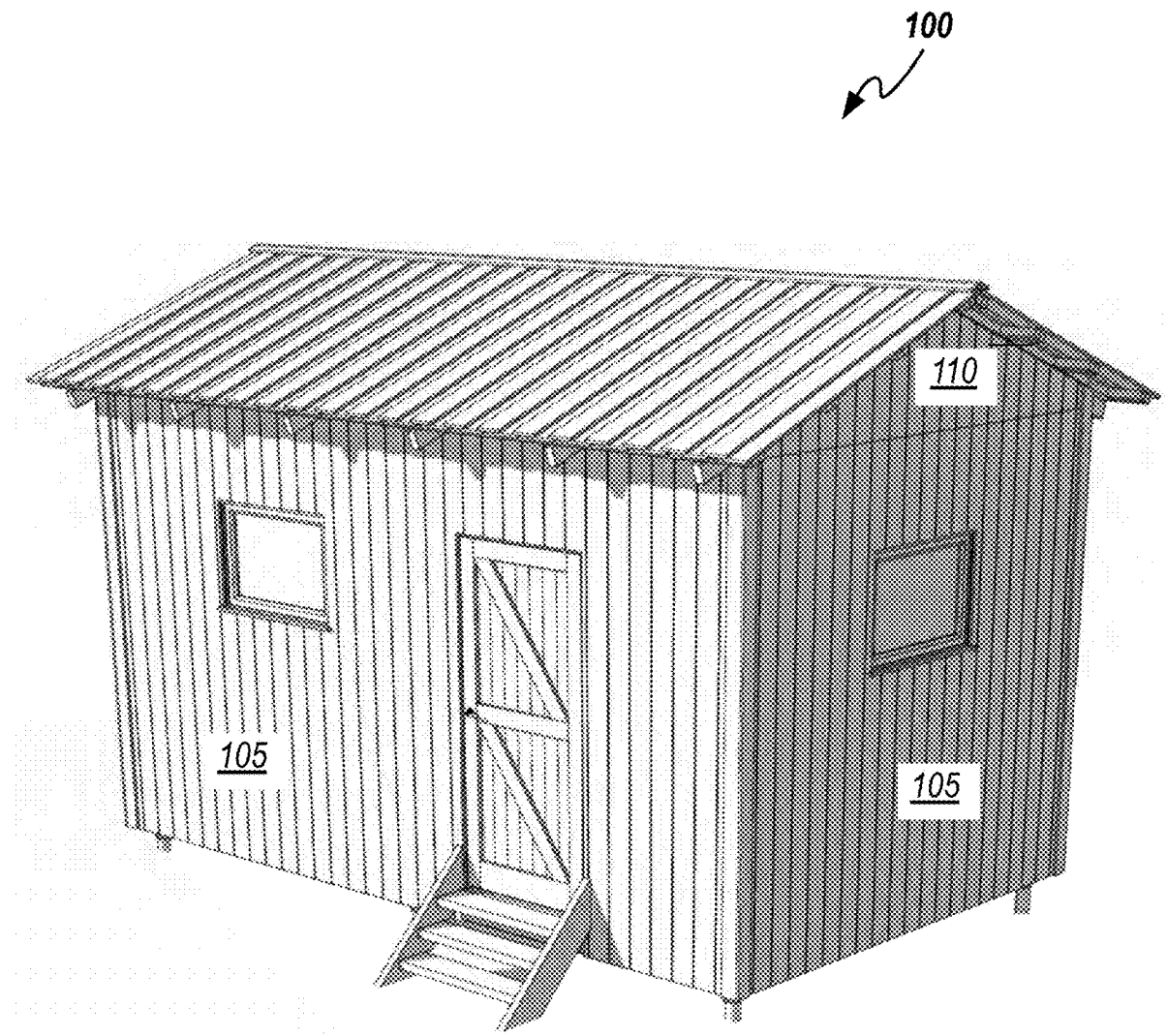
FIG. 1 illustrates a perspective view of a structure according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a panel" includes one panel and plural panels. The terms "substantial" or "substantially" mean to within acceptable limits or degrees acceptable to those of skill in the art. For example, the term "substantially parallel to" means that a structure or assembly may not be made perfectly parallel to some other structure or assembly due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the assembly and/or elements in addition to the orientation depicted in the drawings. For example, if a panel or the assembly were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the assembly and/or elements in addition to the orientation depicted in the drawings.

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Figure 2A:
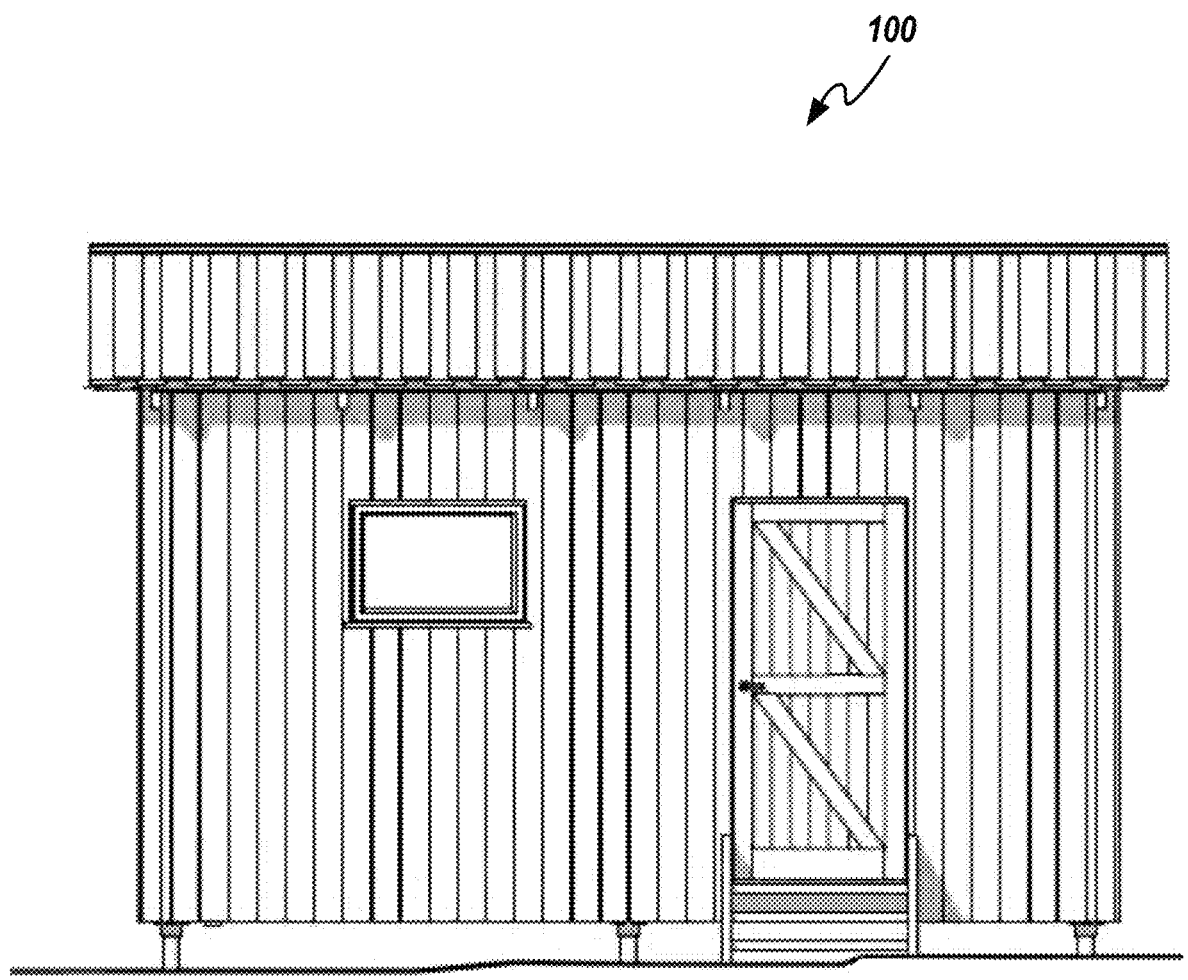
FIG. 2A illustrates a front elevation of the structure of FIG. 1 according to various embodiments of the present disclosure.
Figure 2B:
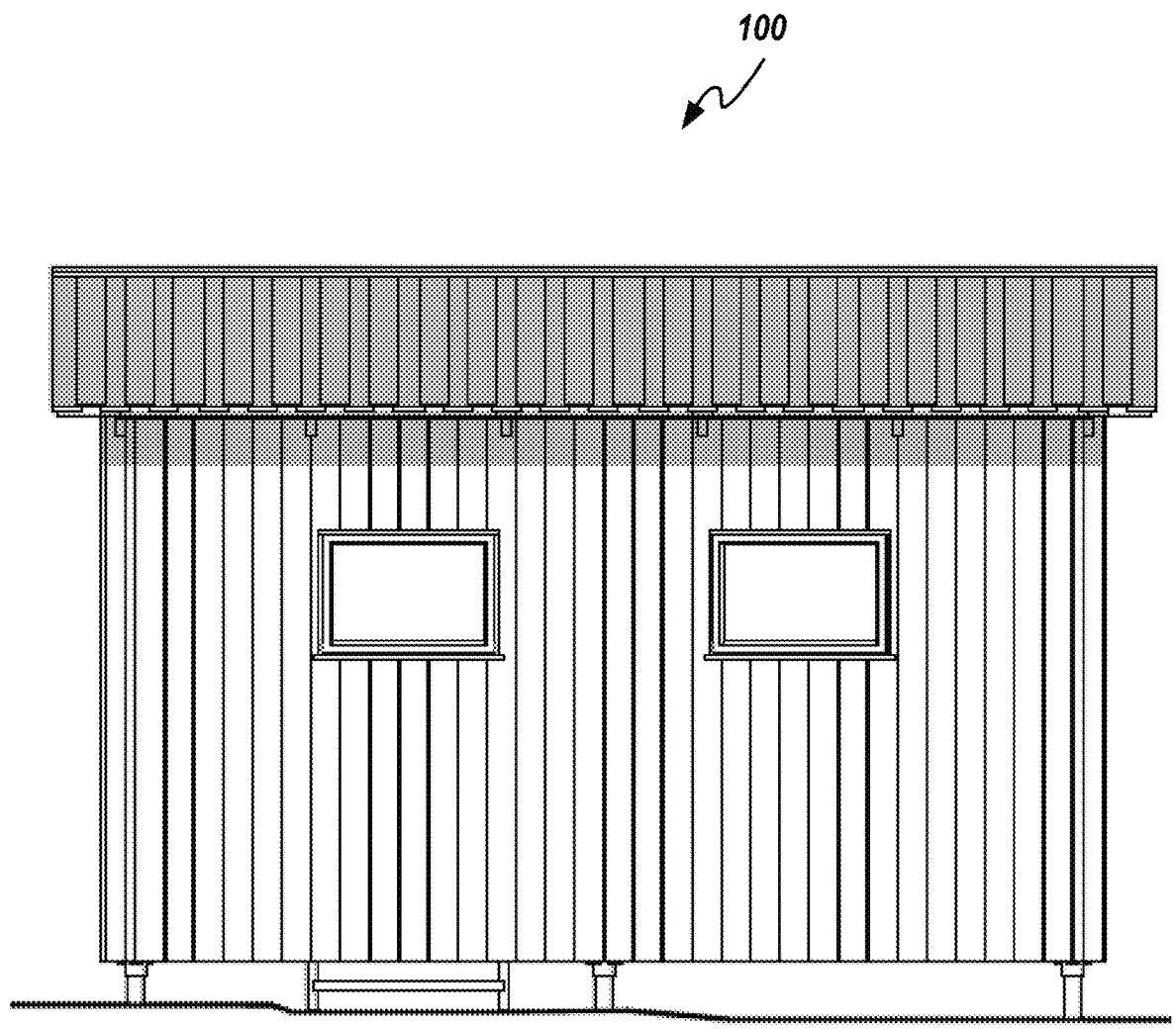
FIG. 2B illustrates a rear elevation of the structure of FIG. 1 according to various embodiments of the present disclosure.

Turning to the drawings, FIG. 1 illustrates a perspective view of a structure 100 of the present disclosure. The structure 100 can include a floor assembly 200, at least four modular wall assemblies 105, a door, a plurality of windows, and a roof assembly 110, as will be described in further detail with regard to FIGS. 1-33. FIG. 2A illustrates a front elevation of the structure 100 of FIG. 1. FIG. 2B illustrates a rear elevation of the structure 100 of FIG. 1.

Figure 2C:
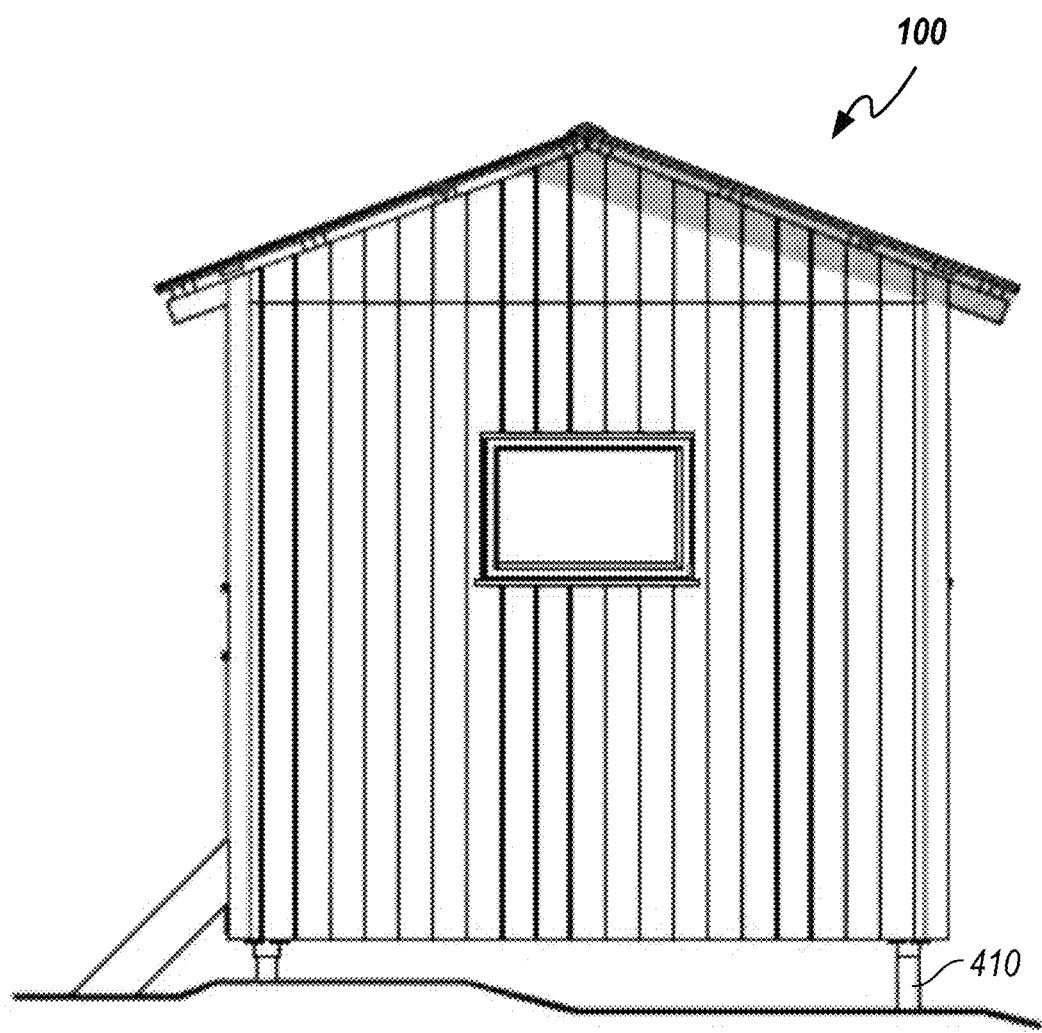
FIG. 2C illustrates a right elevation of the structure of FIG. 1 according to various embodiments of the present disclosure.
Figure 2D:
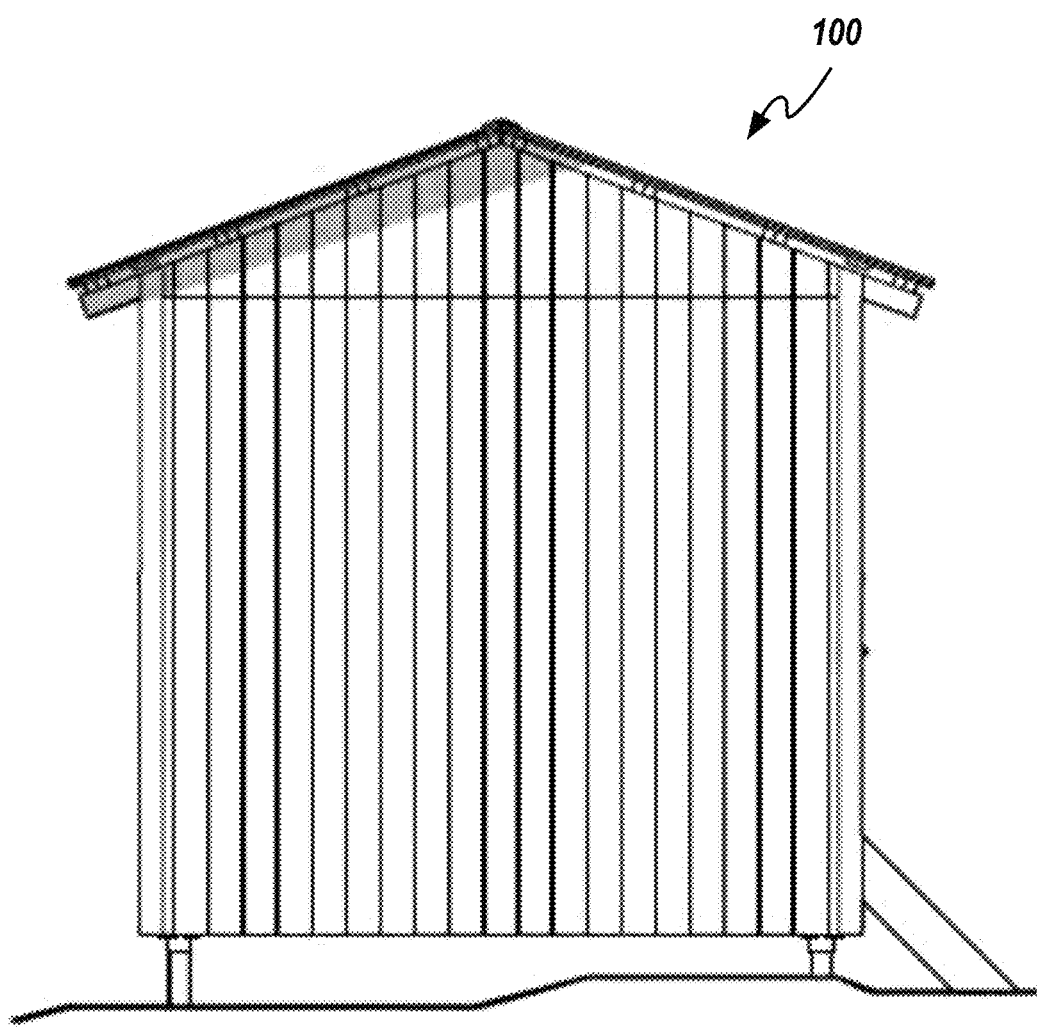
FIG. 2D illustrates a left elevation of the structure of FIG. 1 according to various embodiments of the present disclosure.

FIG. 2C illustrates a right elevation of the structure 100 of FIG. 1. FIG. 2D illustrates a left elevation of the structure 100 of FIG. 1. The structure 100 can include the modular wall assembly 105 comprising a plurality of siding panels. The siding panels can include a plurality of tongue- and groove siding boards (as indicated by "T&G vertical siding") in FIG. 2C. The structure 100 can include a plurality of helical piers 410 as depicted in FIG. 2C.

Figure 3:
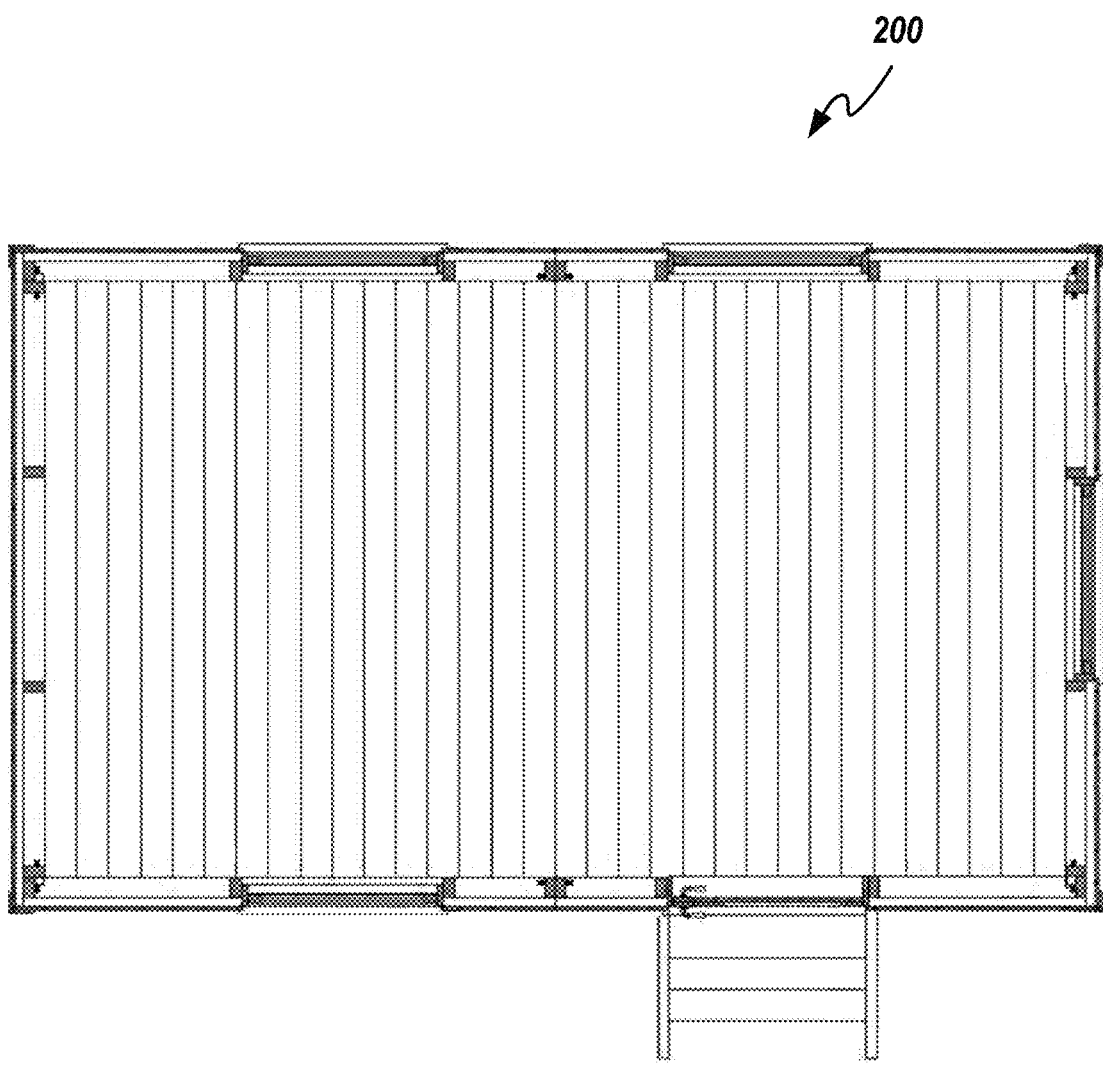
FIG. 3 depicts a floor assembly of the structure of FIG. 1 according to various embodiments of the present disclosure.
Figure 4:
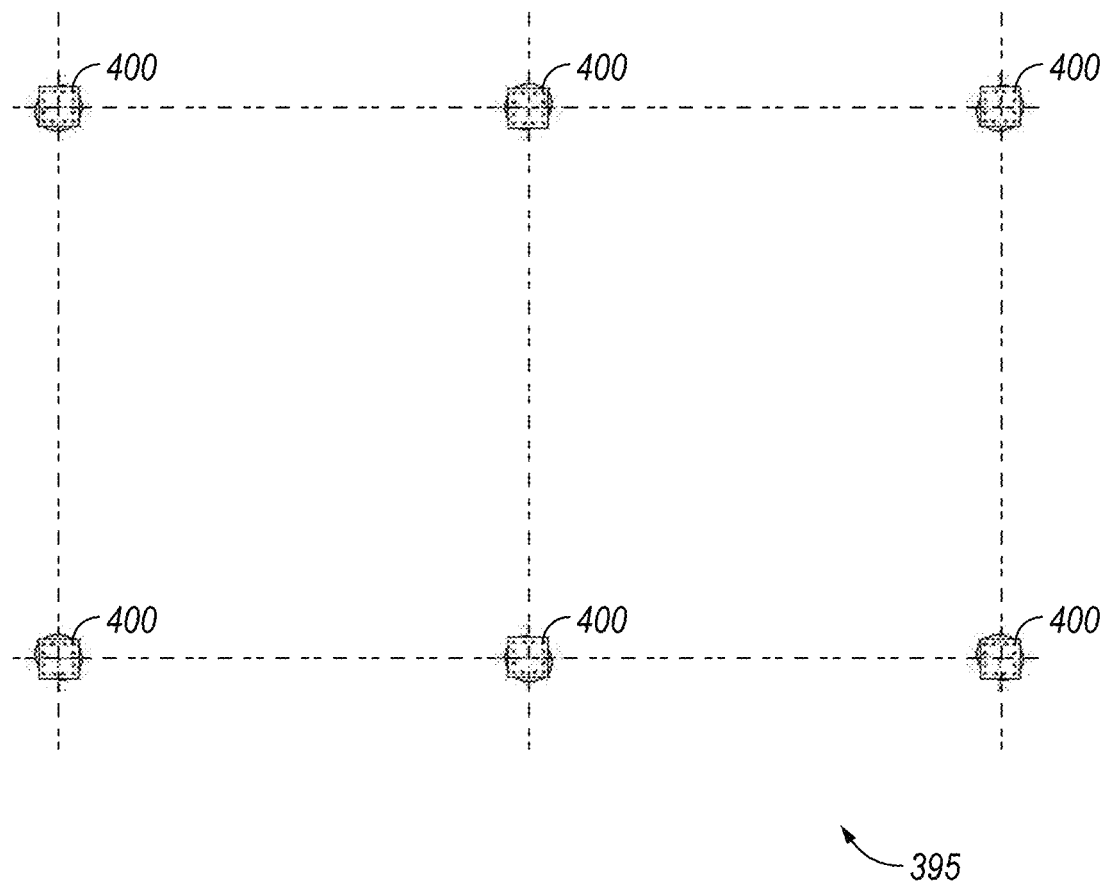
FIG. 4 illustrates a helical foundation in plan view, with six helical foundation pier caps illustrated according to various embodiments of the present disclosure.
Figure 5:
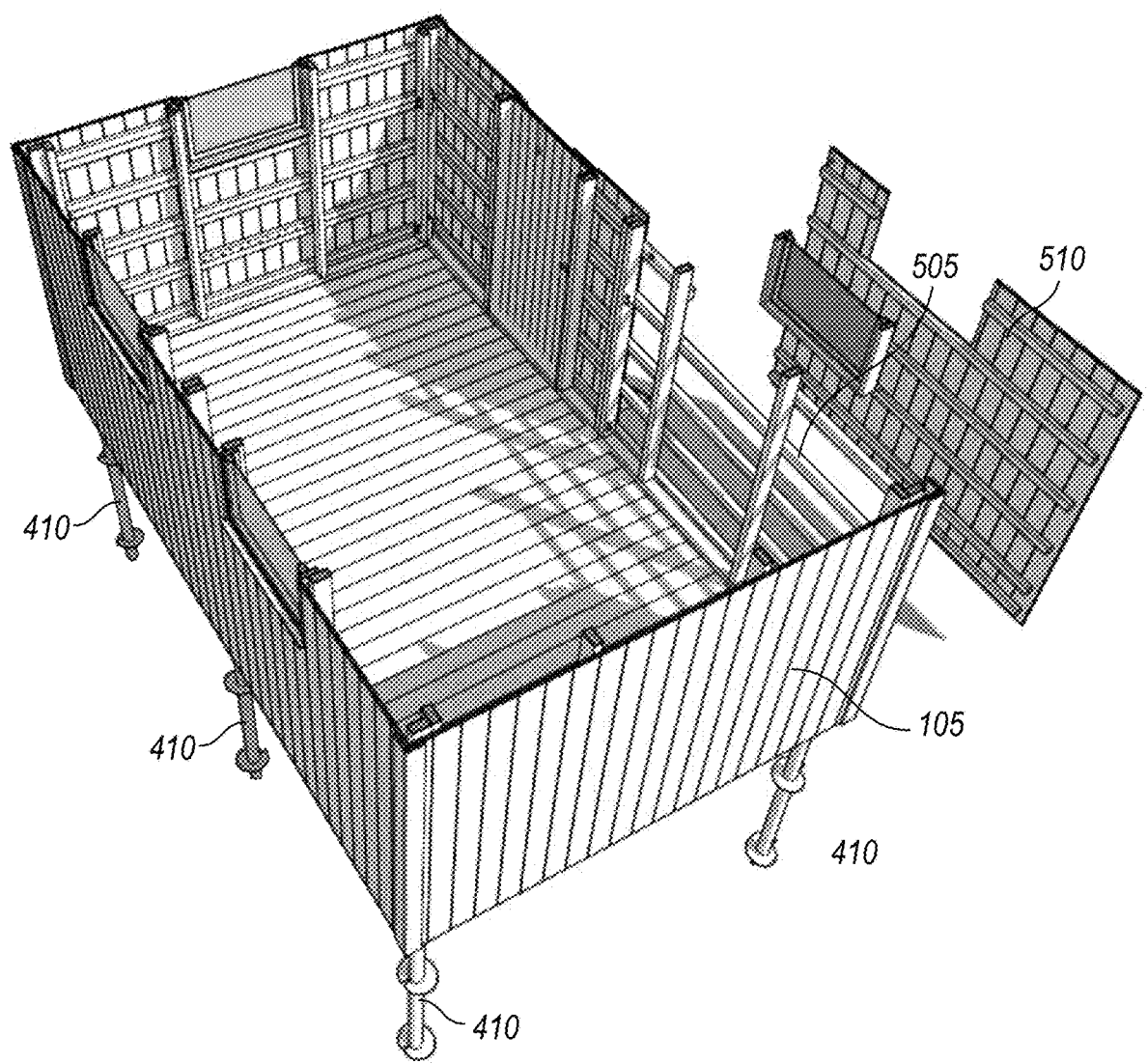
FIG. 5 Illustrates a partially exploded perspective view of the structure of FIG. 1.
Figure 6:
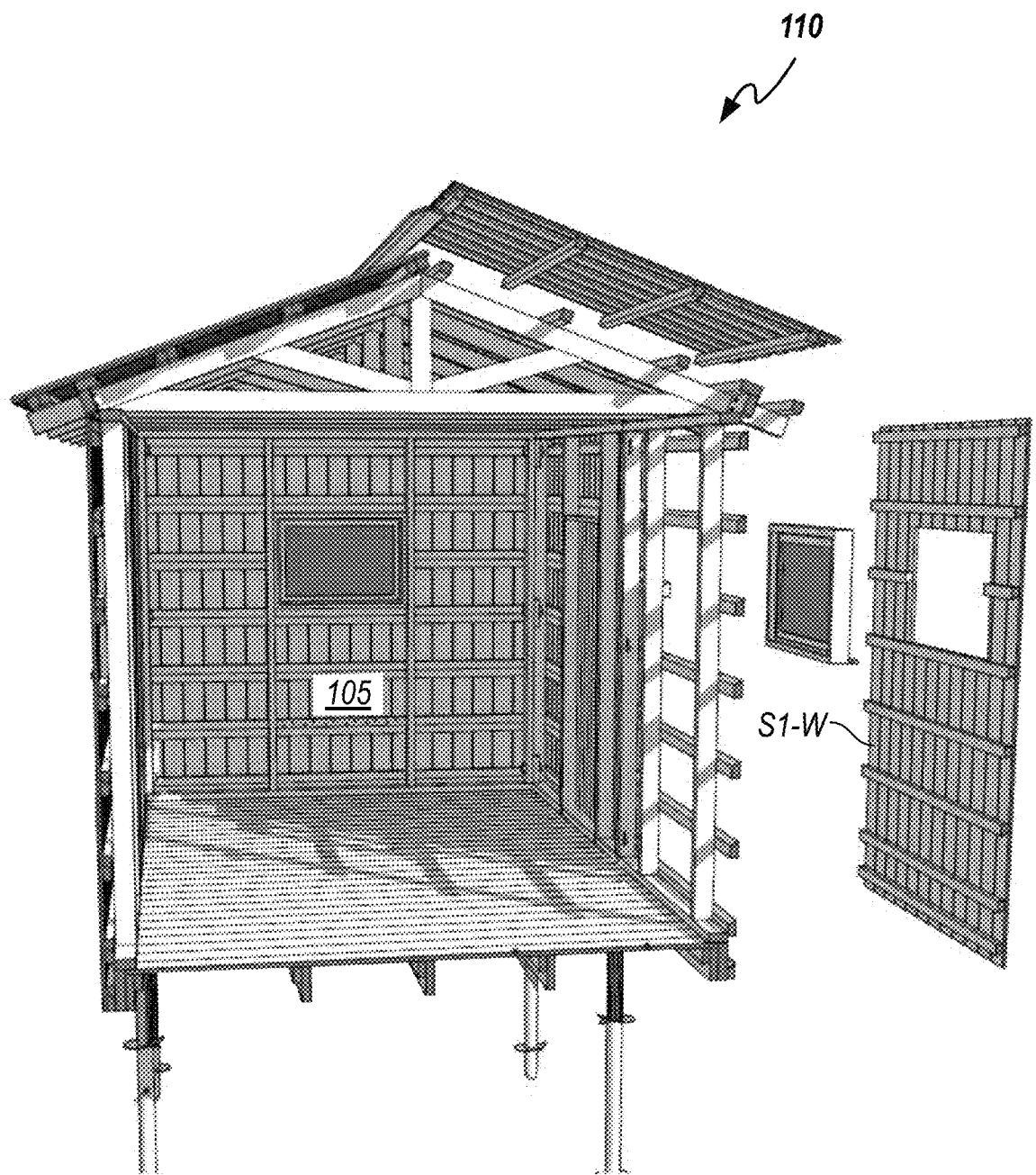
FIG. 6 shows a split side elevation view, partially exploded, of the structure of FIG. 1 according to various embodiments of the present disclosure.

FIG. 3 depicts the floor assembly 200 of the structure 100 of FIG. 1, with the front of the structure shown at bottom of FIG. 3. FIG. 4 illustrates a foundation assembly 395 of the structure 100 in plan view. FIG. 5 Illustrates a partially exploded perspective view of the structure 100 of FIG. 1. FIG. 6 shows a split side elevation view, partially exploded, of the structure 100 of FIG. 1, with the front of the structure 100 to the right.

The foundation assembly 395 can be a helical pier foundation assembly comprising a plurality of helical piers 410 and a plurality of helical foundation pier caps 400. As shown in FIGS. 4 and 5, the foundation assembly 395 can include six helical piers 410 and six helical foundation pier caps 400. The structure 100 can include the floor assembly 200 (e.g., as shown in FIG. 3) adapted to be removably fastened to the foundation assembly 395 by at least one of a plurality of fasteners. The at least four modular wall assemblies 105 can be removably fastened to the floor assembly 200.

As shown in FIGS. 5 and 6 and elsewhere in this disclosure, the modular wall assemblies 105 can include a plurality of wall framing panels 505 and a plurality of siding panels 510. FIG. 5 depicts the structure 100 can include siding panels 510 that are adapted to be removably fastened to the wall framing panels 505. The siding panels 510 can have a plurality of siding battens as indicated by "siding batten" in FIG. 5. FIG. 6 illustrates that the at least four modular wall assemblies 105 can be adapted to support a roof assembly 110. At least one of the siding panels 510 can be adapted to form a cutout for supporting a door or a window in an instance in which the at least one of the siding panels 510 is removably fastened to at least one of the wall framing panels 505. The siding panel 510 in FIG. 6 has been adapted to include a cutout for supporting a window. The structure 100 can include tongue and groove siding panels, floor joist panels, flooring panels, wall panels, roof trusses, and board-on-board roofing panels, among other things.

Figure 7:
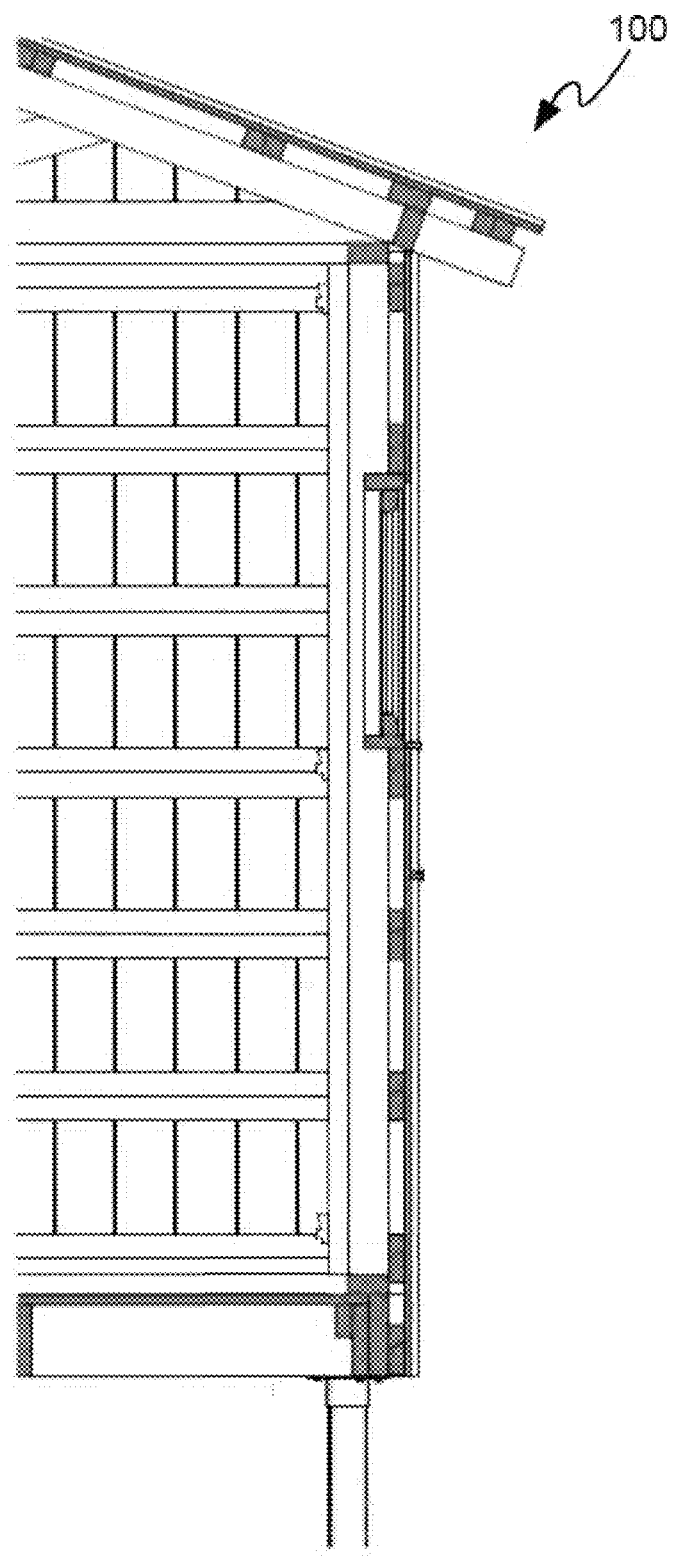
FIG. 7 illustrates a cutaway elevational view of a wall section of the structure of FIG. 1 according to various embodiments of the present disclosure.
Figure 7A:
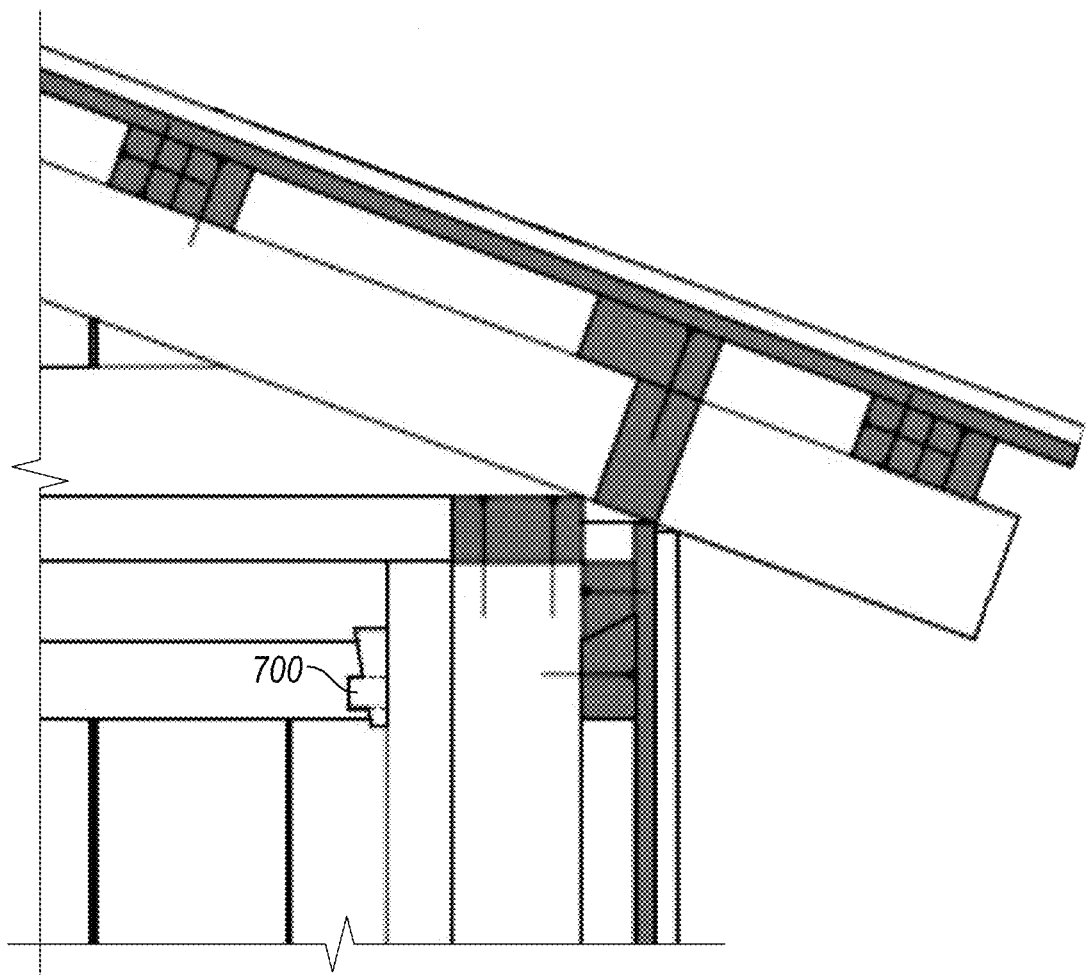
FIG. 7A shows a detailed enlargement of FIG. 7, depicting a wall section to roof interface according to various embodiments of the present disclosure.

FIG. 7 illustrates a cutaway elevational view of a wall section of the structure 100 of FIG. 1. FIG. 7A shows a detailed enlargement of area 1 AX of FIG. 7, depicting a wall section to roof interface. FIGS. 7, 7A and 13E1 depict that a plurality of modular wall assemblies 105 can support a roof assembly 110 comprising a plurality of purlins (as indicated by "roofing purlin" in FIG. 13E1). In some examples, the structure 100 has four modular wall assemblies 105 and four purlins.

Figure 7B:
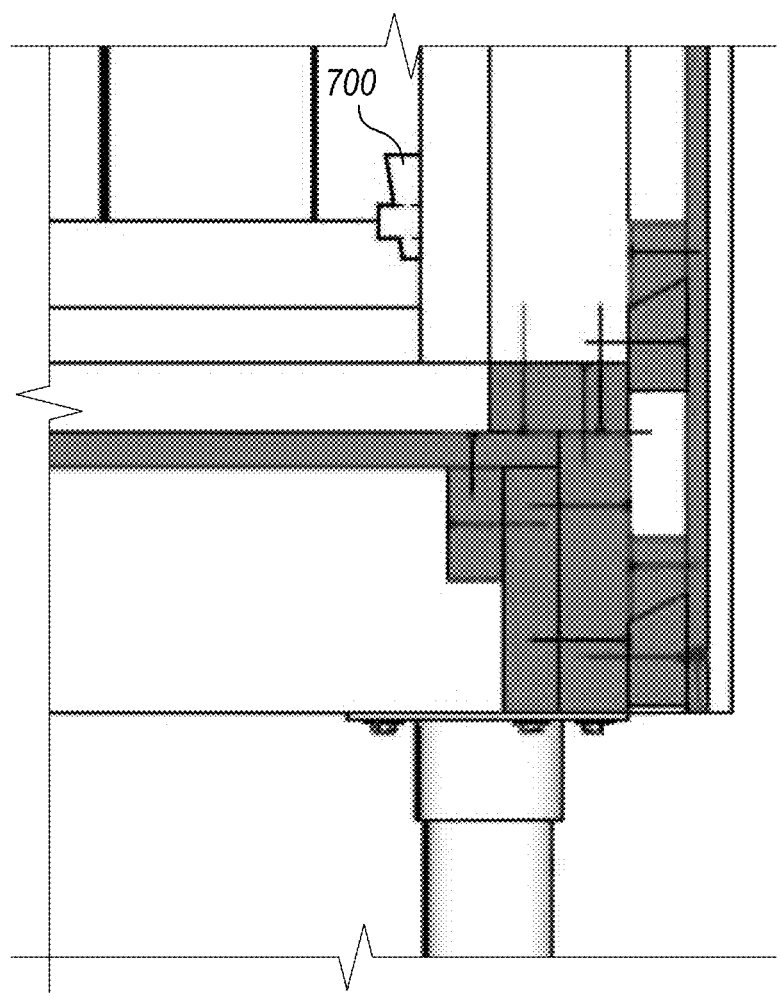
FIG. 7B shows a detailed enlargement of FIG. 7, depicting a modular wall assembly to floor assembly interface according to various embodiments of the present disclosure.
Figure 7C:
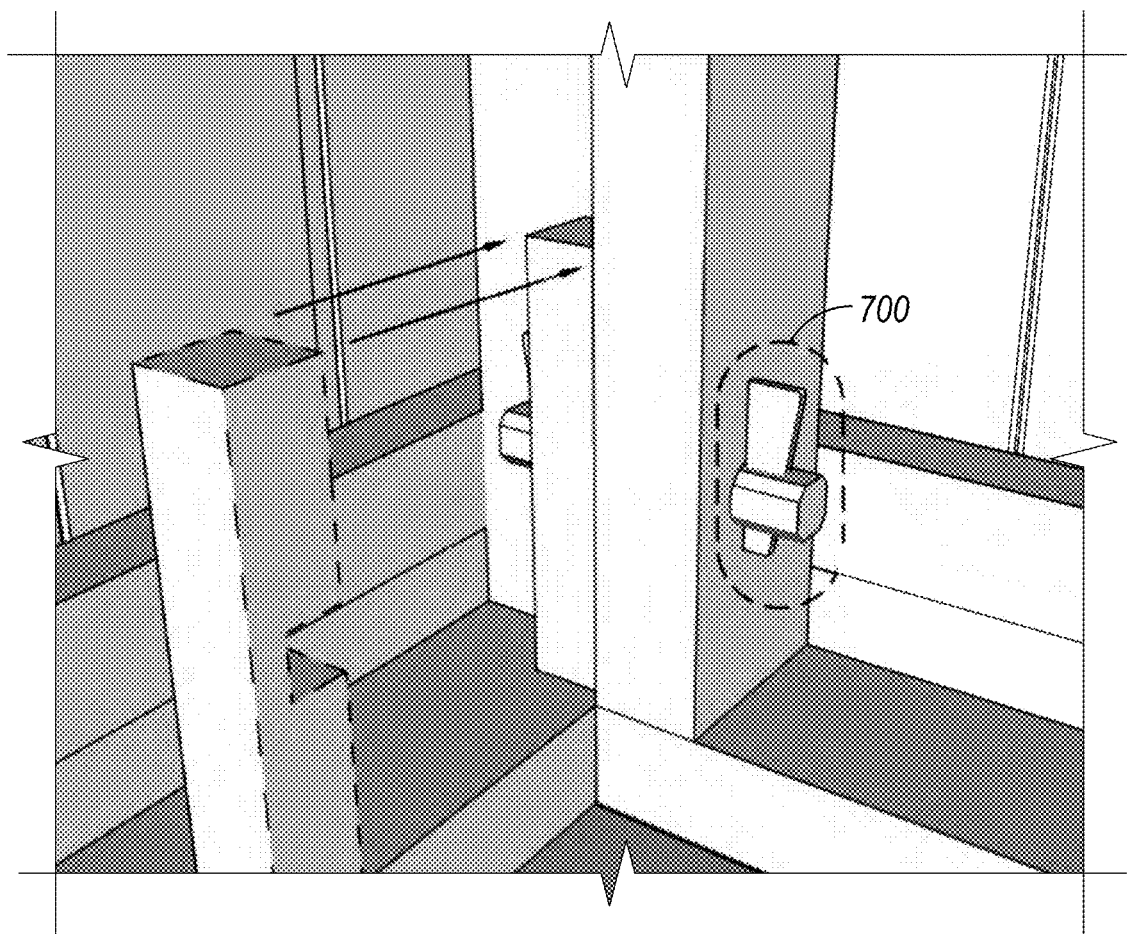
FIG. 7C shows a detailed wall connection diagram, depicting a wedge and peg or wedged tenon attachment and retention mechanism according to various embodiments of the present disclosure.

FIG. 7B shows a detailed enlargement of area 2 AX of FIG. 7, depicting a modular wall assembly 105 to floor assembly 200 interface. FIG. 7C shows a detailed wall connection diagram, depicting a wedge and peg or wedged tenon attachment and retention mechanism 700. FIG. 7C depicts that the at least four modular wall assemblies 105 can comprise at least one truss bearing wall (as indicated by "truss bearing wall" in FIG. 7C) and at least one gable end wall (as indicated by "gable-end wall" in FIG. 7C). In some embodiments, the structure 100 comprising the at least four modular wall assemblies 105 includes two truss bearing walls and two gable end walls. As shown in FIG. 7C, at least one of the truss bearing walls can be joined to at least one of the gable end walls by a wedge and peg or wedged tenon attachment and retention mechanism 700.

Figure 8:
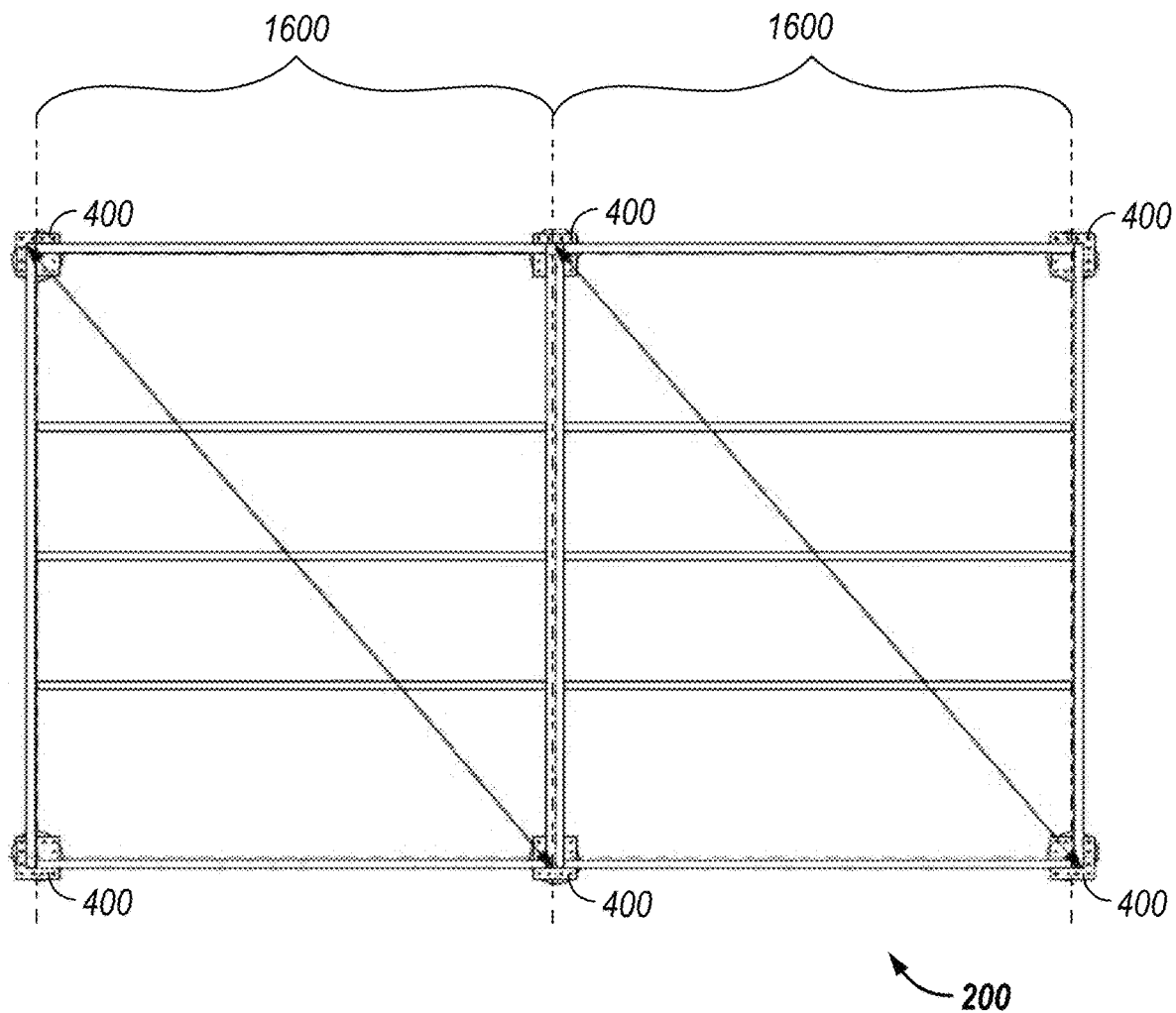
FIG. 8 illustrates a floor framing plan of the structure of FIG. 1, illustrating two floor joist panels as installed on helical pier caps according to various embodiments of the present disclosure.
Figure 9:
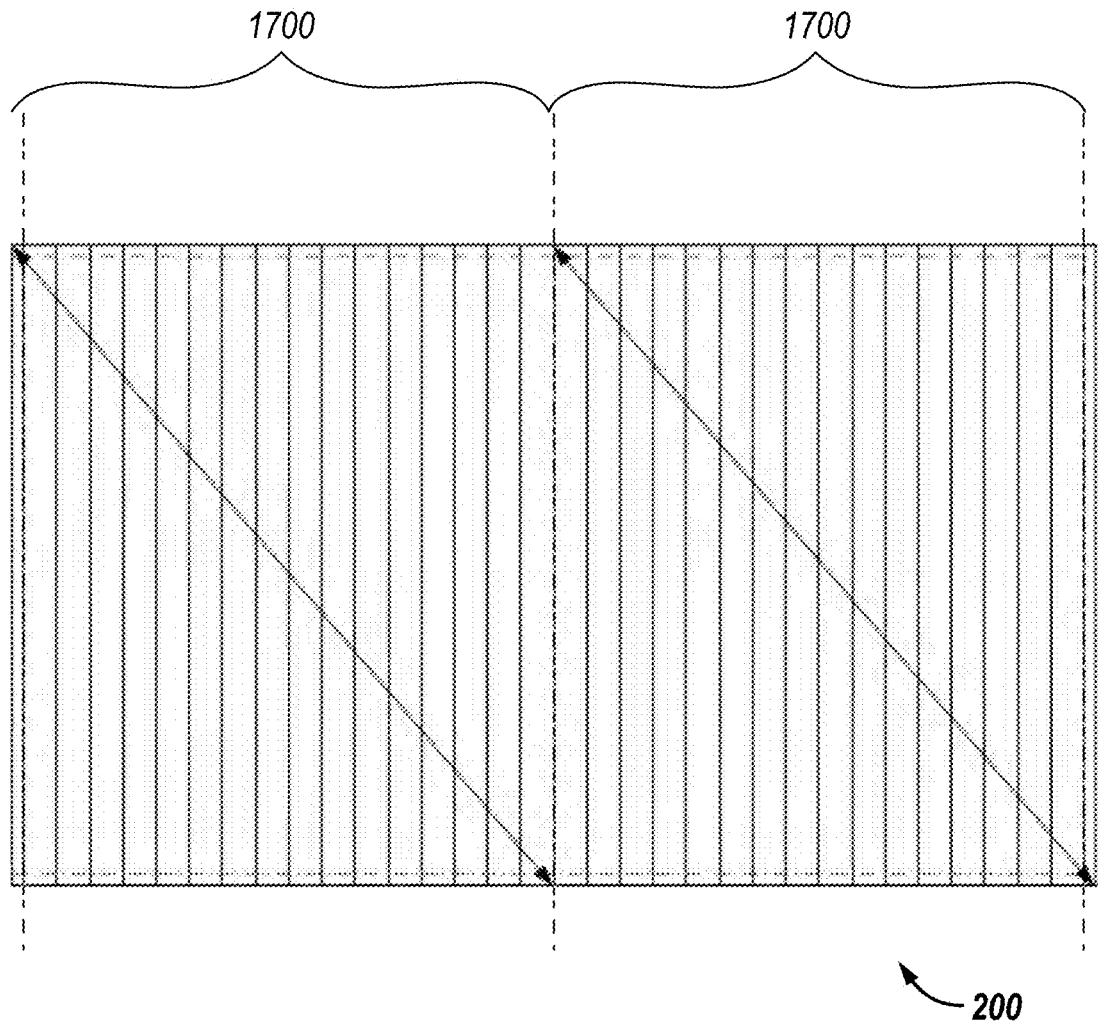
FIG. 9 illustrates a floor decking plan of the structure of FIG. 1, illustrating two floor decking panels as installed on the floor joist panels of FIG. 8 according to various embodiments of the present disclosure.

The floor assembly 200 can include a plurality of floor joist panels 1600 and a plurality of floor decking panels 1700. FIG. 8 illustrates a floor assembly 200 of the structure 100 of FIG. 1, illustrating two floor joist panels 1600 as installed on helical pier caps 400 of the foundation assembly 395. FIG. 9 illustrates a floor decking plan of the structure 100 of FIG. 1, illustrating two floor decking panels 1700 as installed on the floor joist panels 1600 of FIG. 8.

Figure 10:
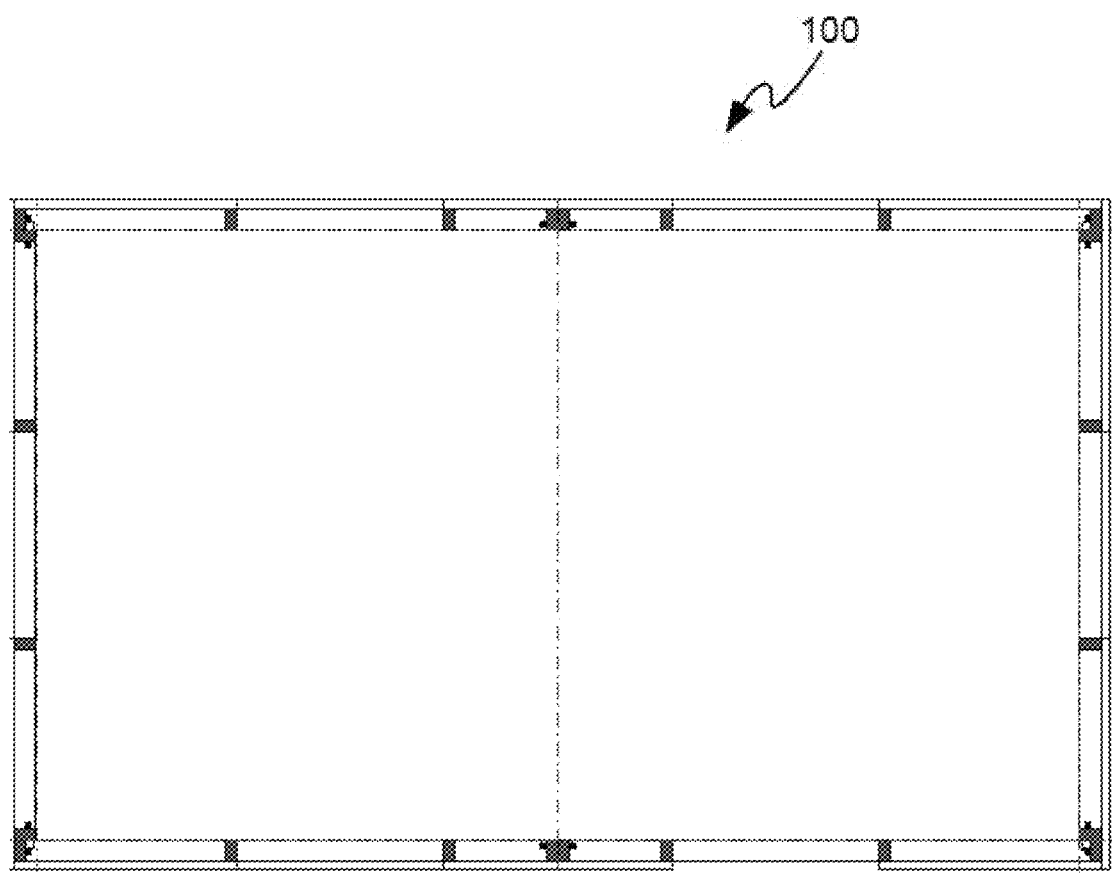
FIG. 10 illustrates a wall framing plan of the structure of FIG. 1, illustrating wall framing panels according to various embodiments of the present disclosure.

One or more of the modular wall assemblies 105 can include a plurality of wall framing panels 505 and a plurality of siding panels 510. FIG. 10 illustrates wall framing panels 505 including wall framing panels W1-W, and W2-W framing the rear wall of the structure 100 of FIG. 1, wall panel W4-W framing the right wall of the structure 100 of FIG. 1, wall panel W4-W framing the left wall of the structure 100 of FIG. 1, and wall panels W2-W and W3-D framing the front wall of the structure 100 of FIG. 1. A wall framing panel may also be referred to herein as a framing panel.

Figure 11:
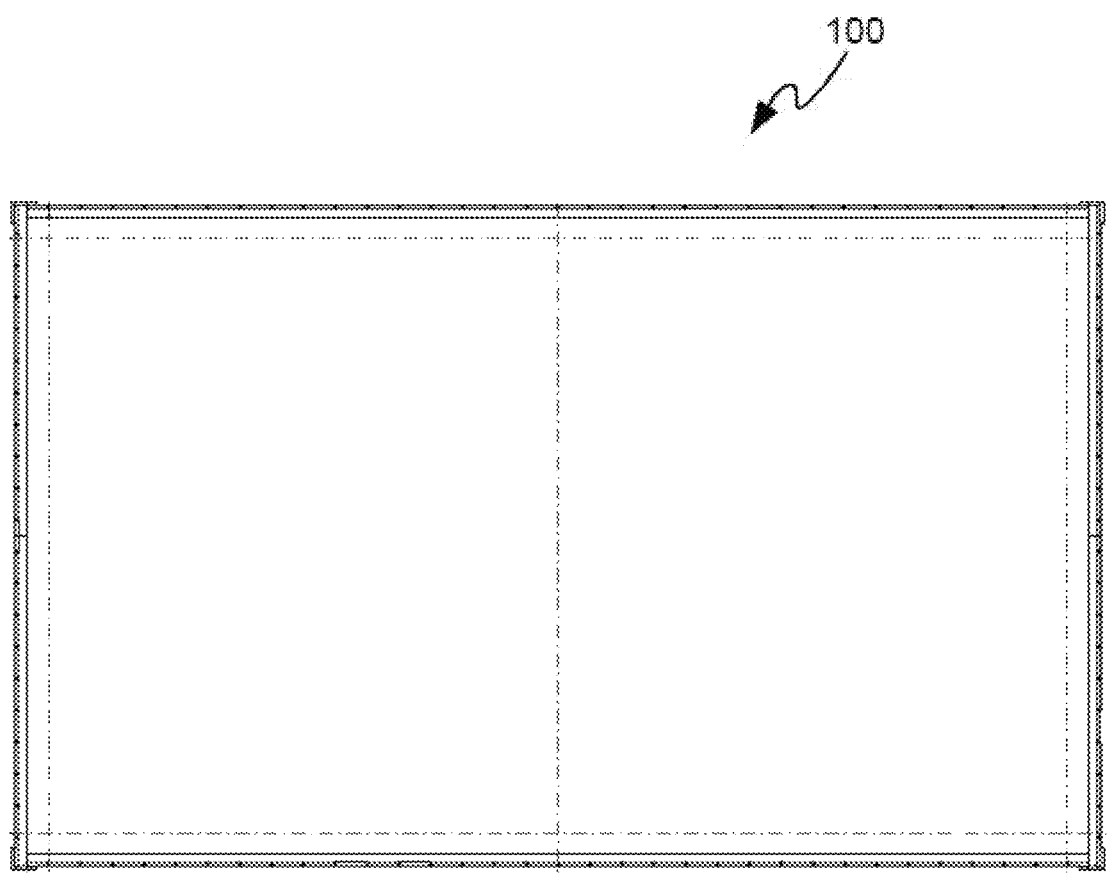
FIG. 11 depicts a wall siding plan of the structure of FIG. 1, with exemplary wall panels according to various embodiments of the present disclosure.

FIG. 11 depicts the plurality of siding panels 510 can include exemplary siding panels (proceeding clockwise from upper left corner) S1-W, S2-W, S4-W, S3-D, S2-W and S4. A siding panel may also be referred to herein as a wall panel or a wall siding panel.

Figure 12:
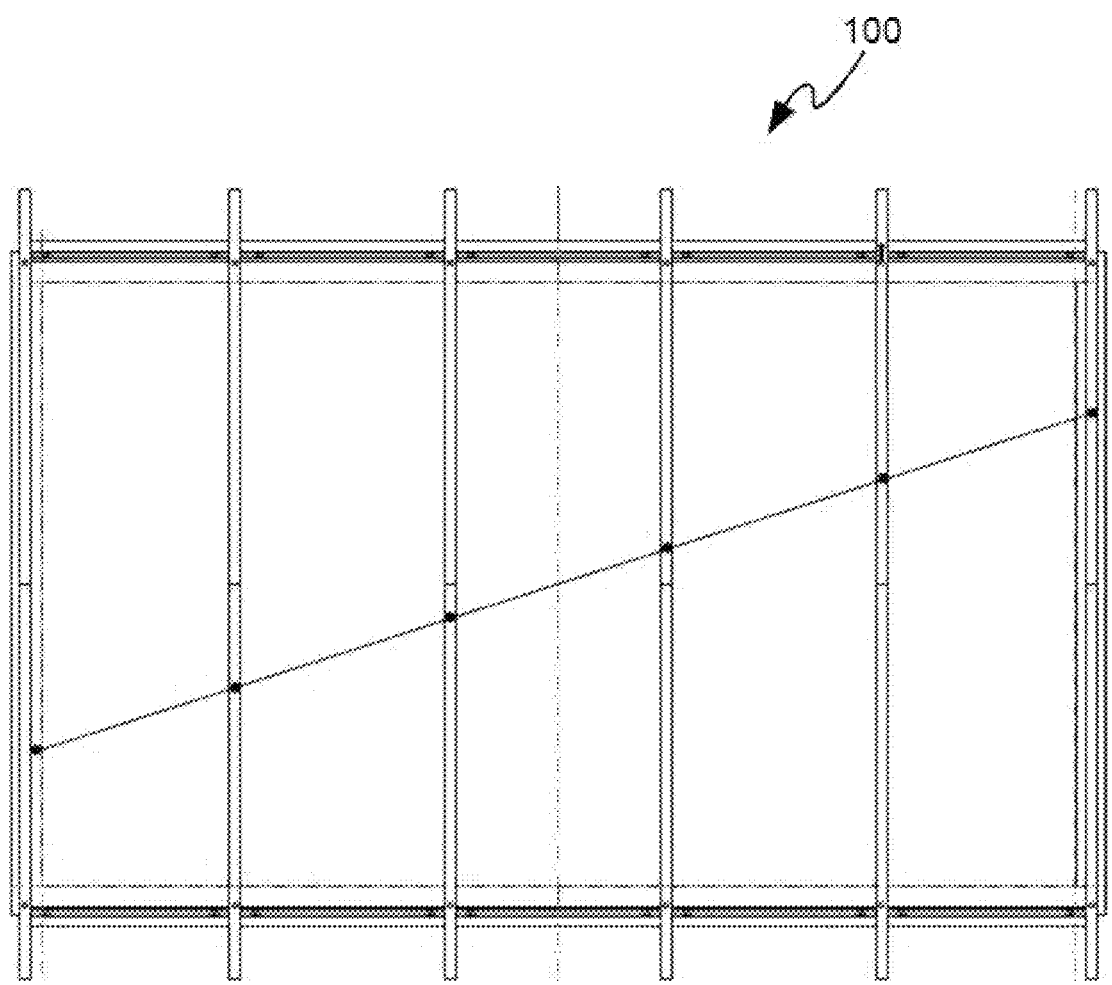
FIG. 12 illustrates a truss plan of the structure of FIG. 1 according to various embodiments of the present disclosure.
Figure 13A:
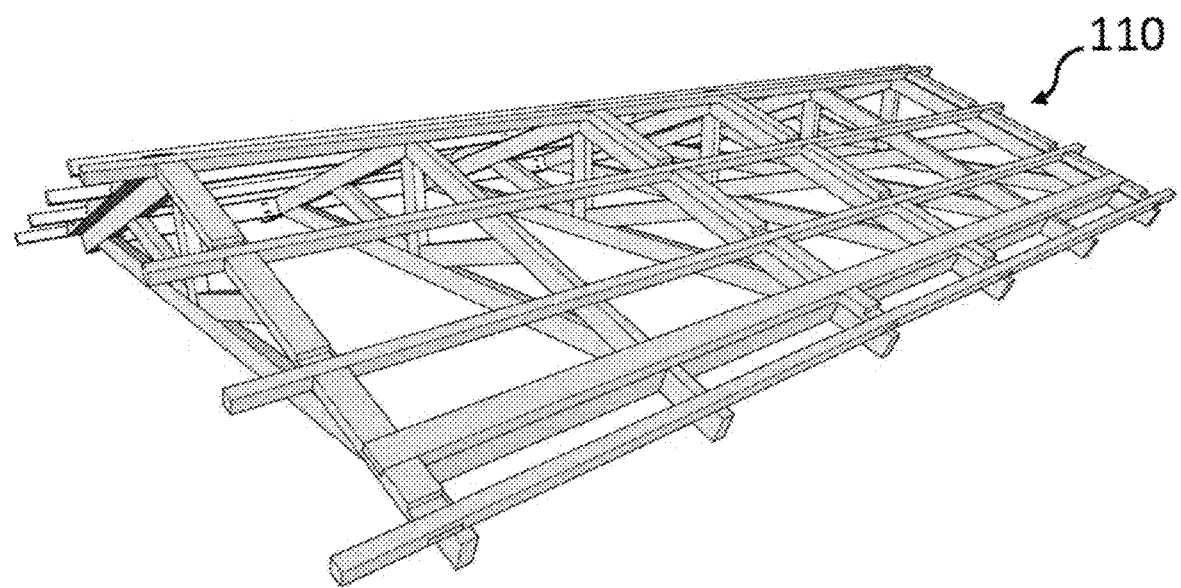
FIG. 13A illustrates a roof framing perspective view according to various embodiments of the present disclosure.
Figure 13B:
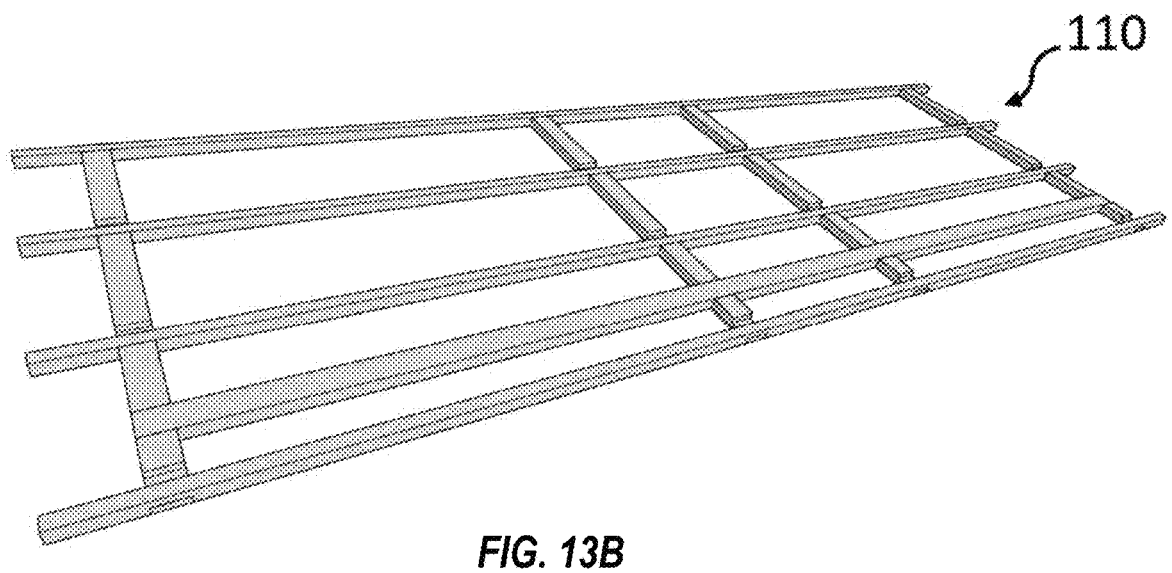
FIG. 13B illustrates a roof batten perspective view, depicting exemplary battens as installed on a portion of the roof frame illustrated in FIG. 13A according to various embodiments of the present disclosure.

FIG. 12 illustrates a truss plan for the roof assembly 110 of the structure 100 of FIG. 1. FIG. 13A illustrates a roof framing perspective view of the roof assembly 110. FIG. 13B illustrates a roof batten perspective view, depicting exemplary battens as installed on a portion of the roof assembly 110 (e.g., roof frame) illustrated in FIG. 13A.

Figure 13C:
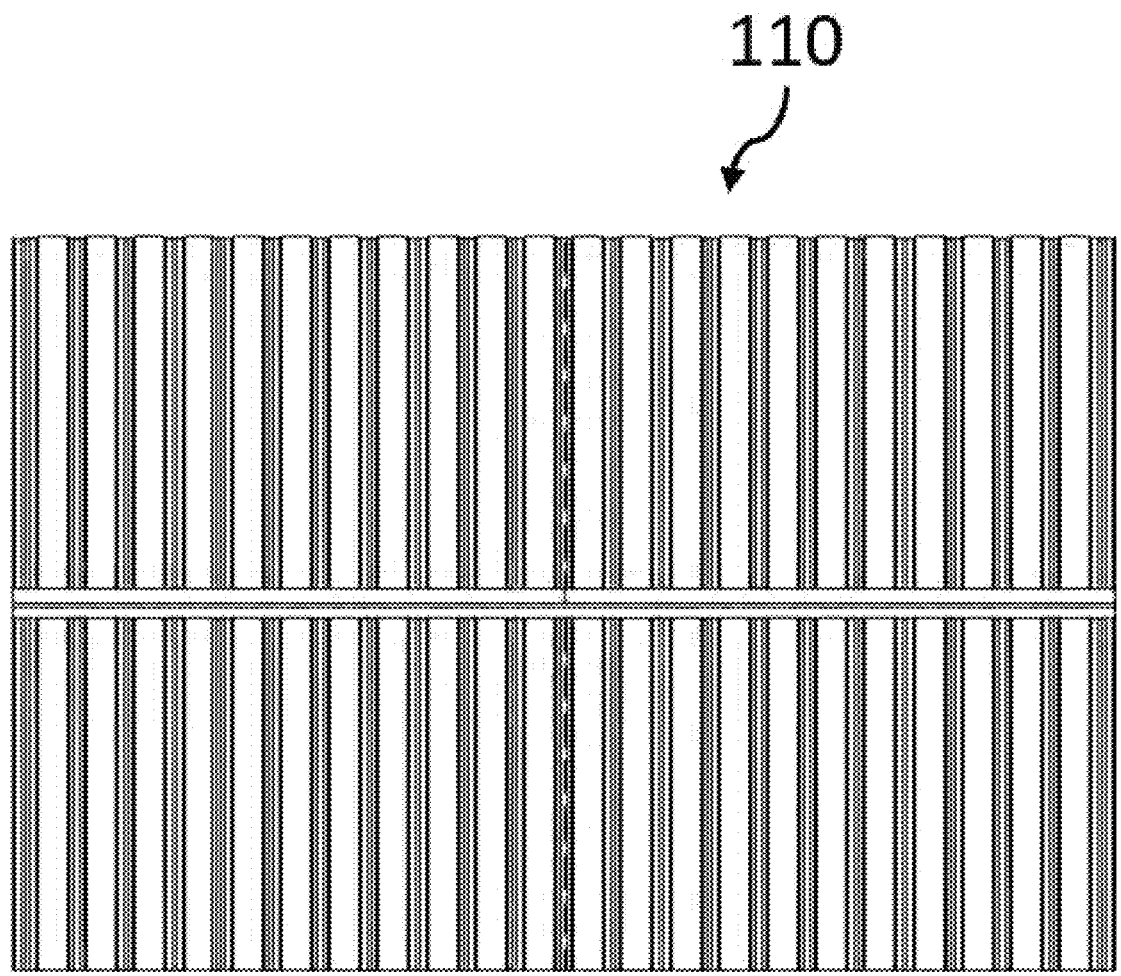
FIG. 13C illustrates a plan view of a roof of the structure in FIG. 1 according to various embodiments of the present disclosure.

FIG. 13C illustrates a plan view of a portion of the roof assembly 110 of the structure 100 in FIG. 1, with four roof panels (2×R1) and (2×R1-M, or the mirror image configurations of R1) installed over framed trusses, and ridge boards (as further shown in perspective in FIG. 13K) covering a peak of the roof of the structure 100.

FIG. 13D illustrates a top plan view 1305 of a roofing panel of the present disclosure (for example, panel R1-M at the upper left of FIG. 13C), illustrating an installed fascia block and 10 installed ridge/eave blocks, a bottom plan view 1307 of the roofing panel illustrating 4 roofing purlins installed on a bottom surface of the roofing panel, and an elevational view 1309 of a roofing purlin of the present disclosure.

FIG. 13E1 illustrates a partial underside perspective view of a roofing panel of the roof assembly 110 of the present disclosure, showing a ridge/eave filler block installed between an interlocking roofing board (with relief cuts facing down) and a roofing purlin that is abutted to the roofing boards of the roofing panel.

FIG. 13E2 illustrates a partial top side perspective view of a roofing panel of the present disclosure, showing a fascia block and a ridge/eave filler block installed on a top surface of interlocking roofing boards (with relief cuts facing up) of the roofing panel.

Figure 13F:
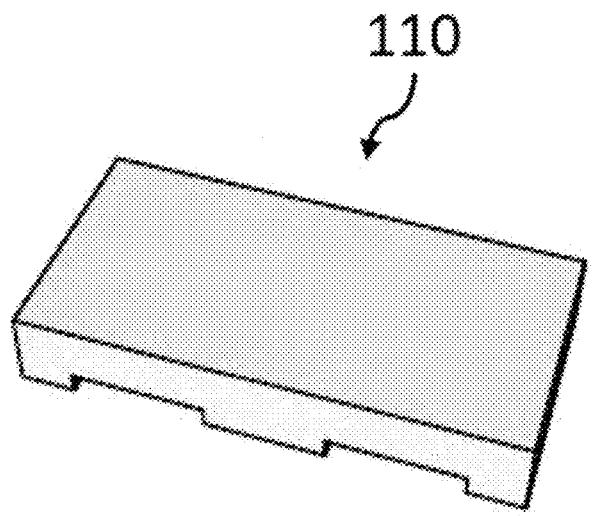
FIG. 13F illustrates a top perspective view of a ridge/eave filler block according to various embodiments of the present disclosure.

FIG. 13F illustrates a top perspective view of a ridge/eave filler block of the present disclosure with cross section shown with cutouts to mate with roofing boards of the present disclosure.

Figure 13G:
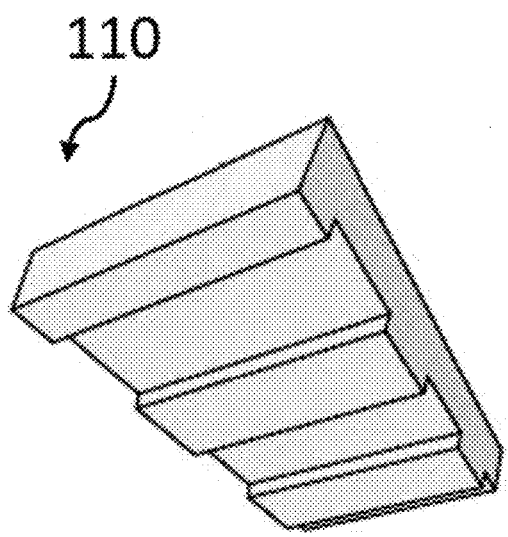
FIG. 13G illustrates a bottom perspective view of a fascia block according to various embodiments of the present disclosure.

FIG. 13G illustrates a bottom perspective view a fascia block of the present disclosure, with cutouts to mate with roofing boards of the present disclosure.

Figure 13H:
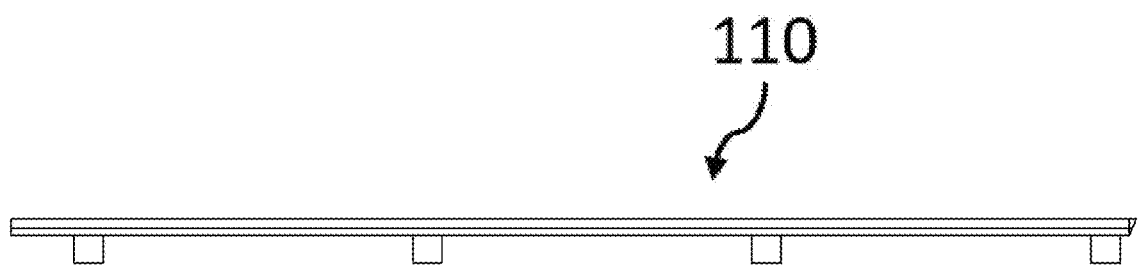
FIG. 13H illustrates a side view of a roofing panel according to various embodiments of the present disclosure.

FIG. 13H illustrates a side view of a roofing panel of the present disclosure, shown with installed roofing purlins end-on cross section.

Figure 13I:
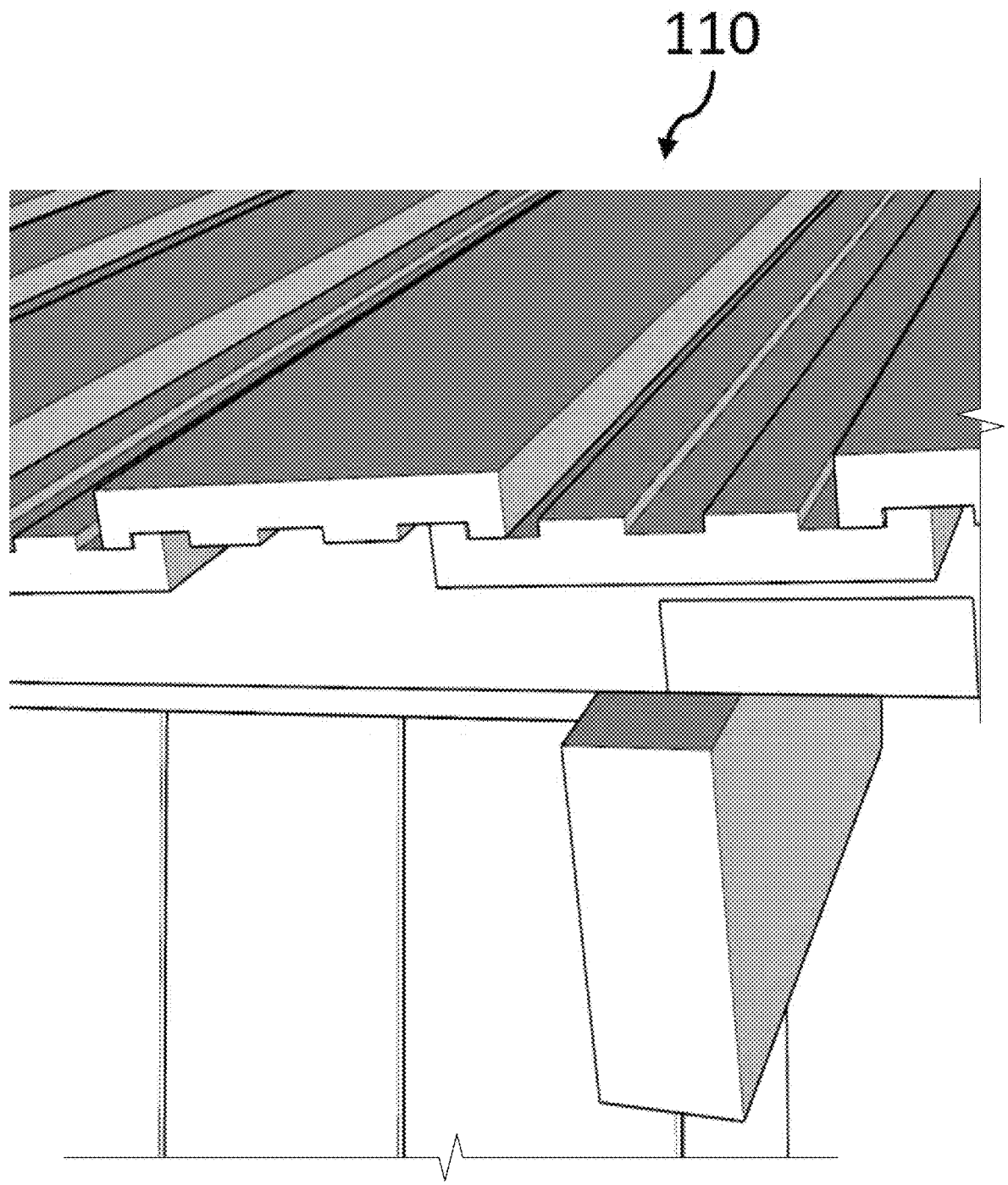
FIG. 13I shows a close-up side perspective view of an eave-end of a roofing panel according to various embodiments of the present disclosure.
Figure 13J:
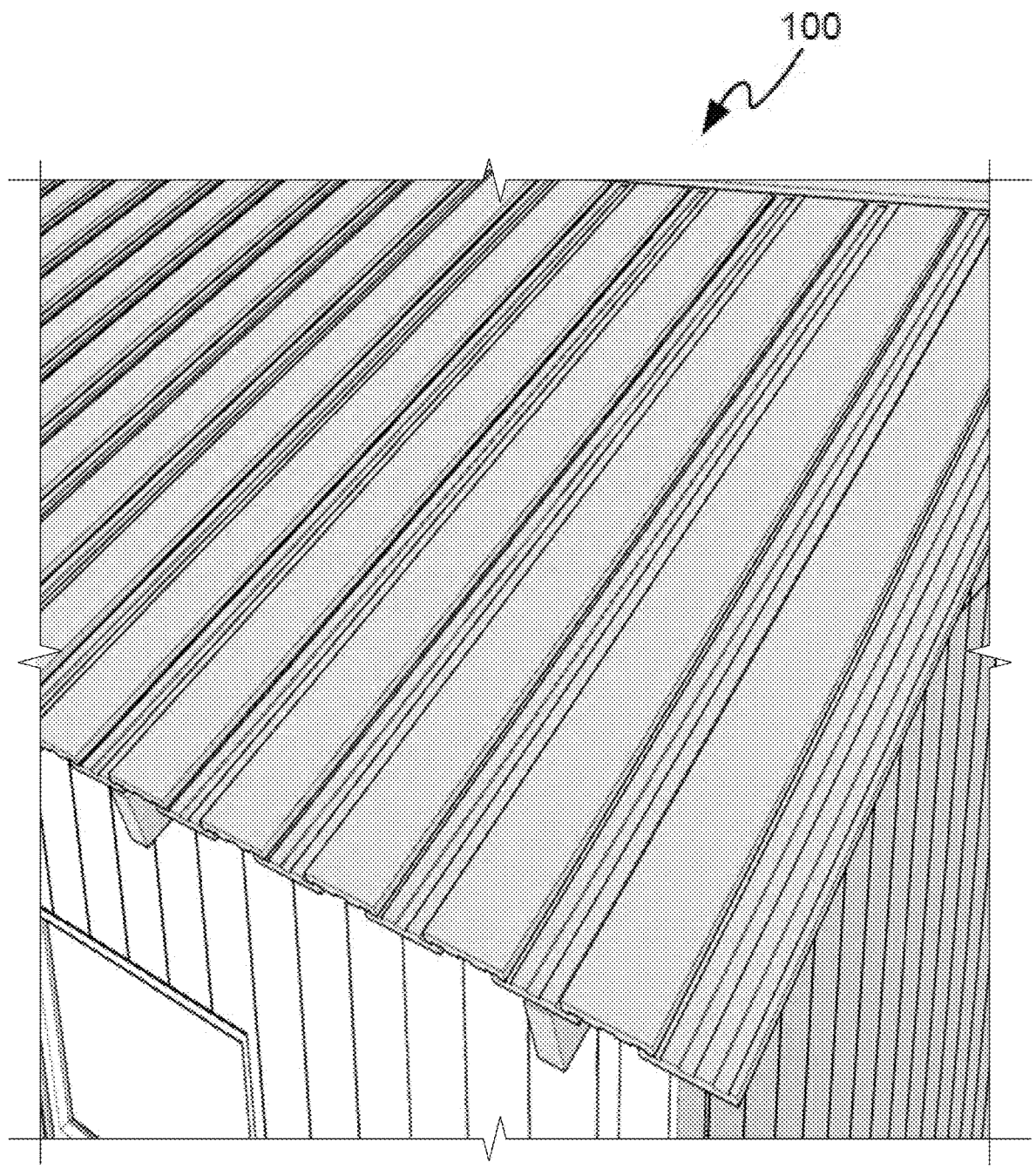
FIG. 13J shows a partial top perspective view of a corner of a roofing panel installed on a structure according to various embodiments of the present disclosure.

FIG. 13I shows a close-up side perspective view of an eave-end of a roofing panel of the present disclosure. FIG. 13J shows a partial top perspective view of a corner of a roofing panel installed on a structure 100 of the present disclosure. The roofing panel disclosed herein can include a plurality of roof boards comprising relief cuts and back-out relief cuts. The relief cuts and back-out relief cuts can be adapted to interlock. The back-out relief cuts can be overlapping as shown in FIG. 13I. The relief cuts can guide precipitation run-off and prevent leakage.

Figure 13K:
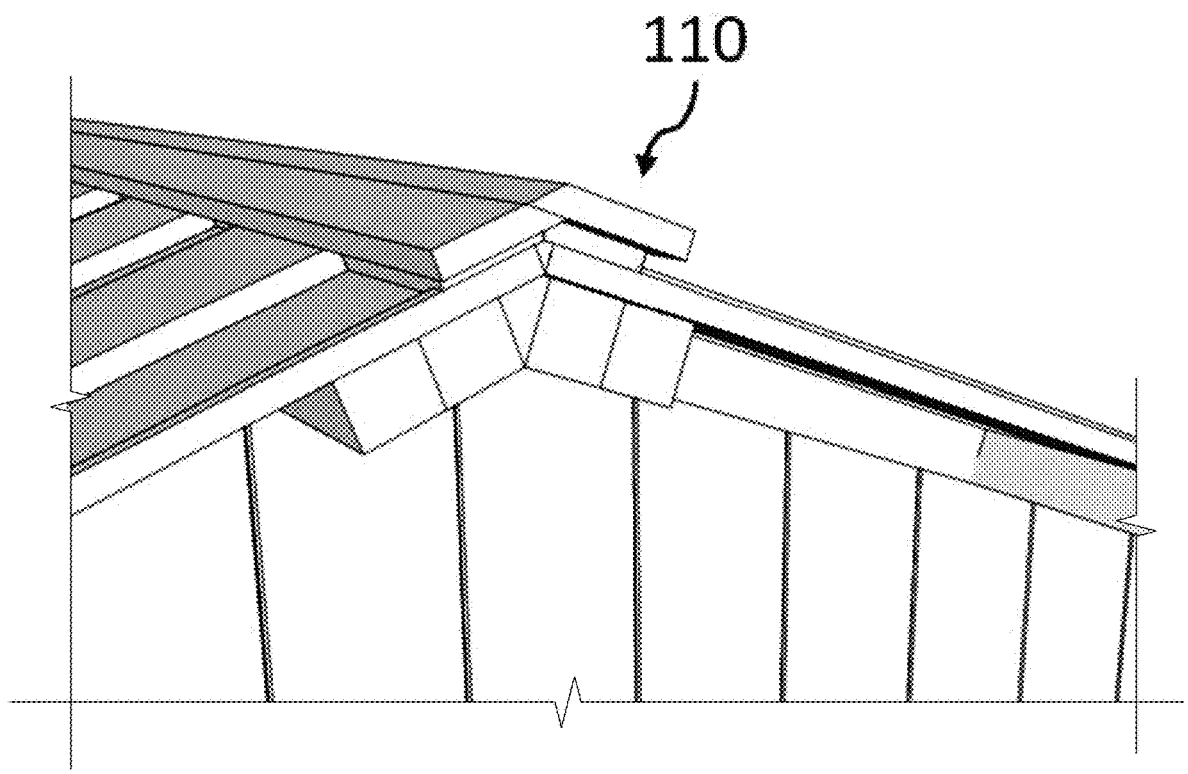
FIG. 13K illustrates a perspective/side view of a gable peak of a roof of the structure of the present disclosure, showing mitered roof boards, installed fascia blocks, roofing batten of the roof panel and truss batten according to various embodiments of the present disclosure.

FIG. 13K illustrates a perspective/side view of a gable peak of the roof assembly 110 of the structure 100 of the present disclosure. The roof assembly 110 depicted can include mitered roof boards, installed fascia blocks, one or more roofing battens, and one or more truss battens. In various aspects, the fascia block can act as an infill block used to close off an opening/gap between the ridge board and the roofing boards. The "ridge/eave filler blocks" can be fastened to the roofing boards (e.g., when the roofing panel is fabricated); the filler blocks may assist in preventing entry of insects to the structure 100.

Figure 14:
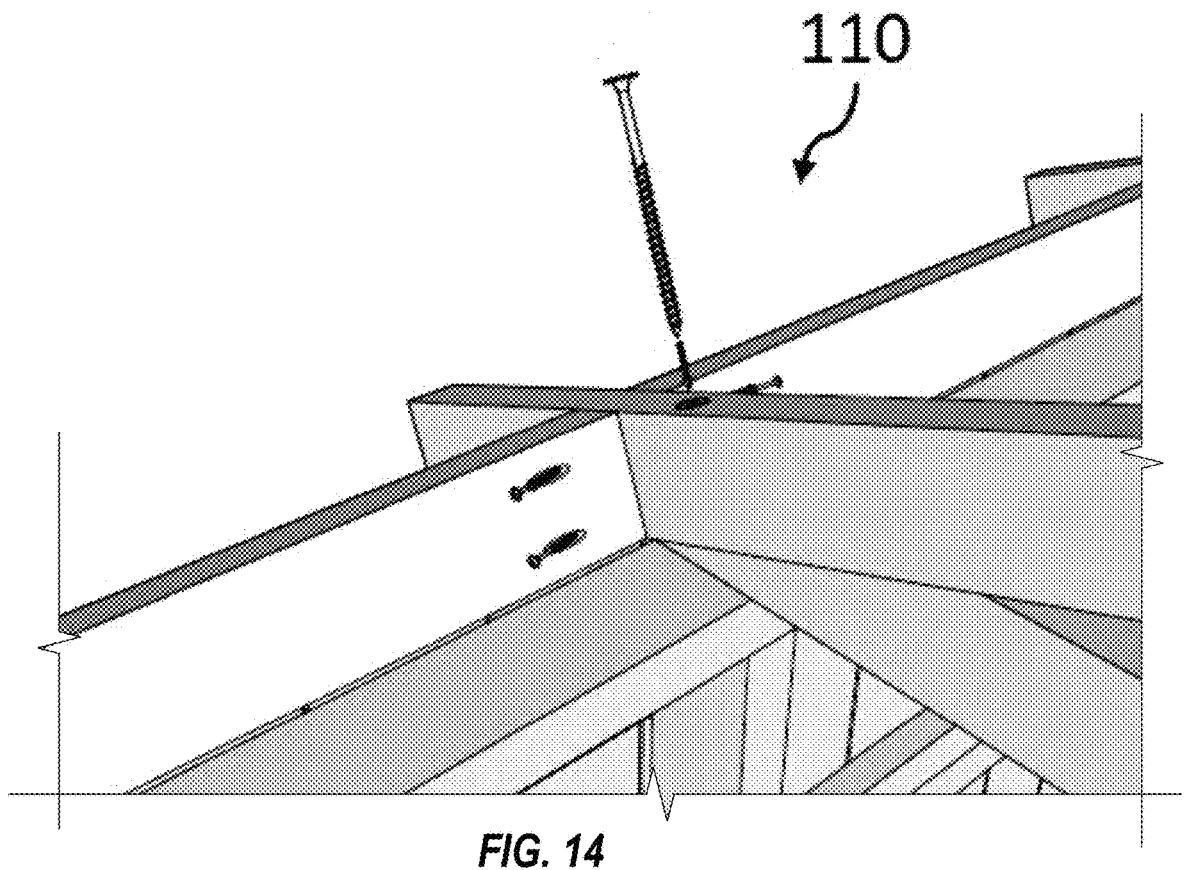
FIG. 14 illustrates a close-up roof detail, showing fastener attachments of trusses to eave blocks and top wall plates according to various embodiments of the present disclosure.
Figure 14A:
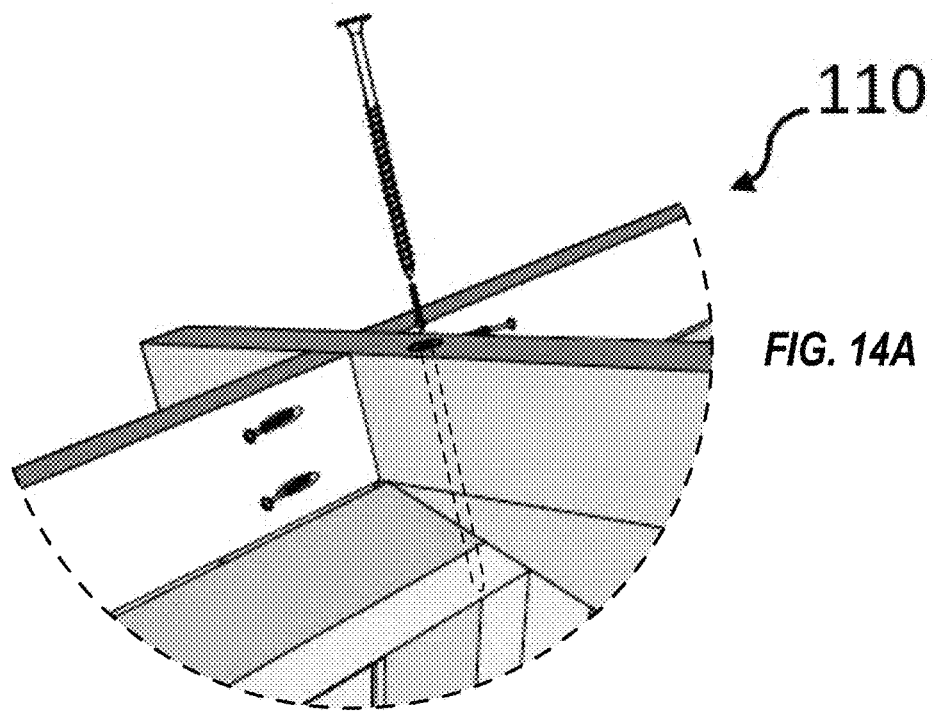
FIG. 14A shows a partial transparent view of FIG. 14, illustrating exemplary fastener installation locations according to various embodiments of the present disclosure.

FIG. 14 illustrates a close-up roof detail, showing fastener attachments of trusses to eave blocks and top wall plates. FIG. 14A shows a partial transparent view of FIG. 14, illustrating exemplary fastener installation locations. In some embodiments, ten precut truss eave blocks are installed using drilled pocket holes prior to positioning and attaching the roof batten panels.

Figure 15:
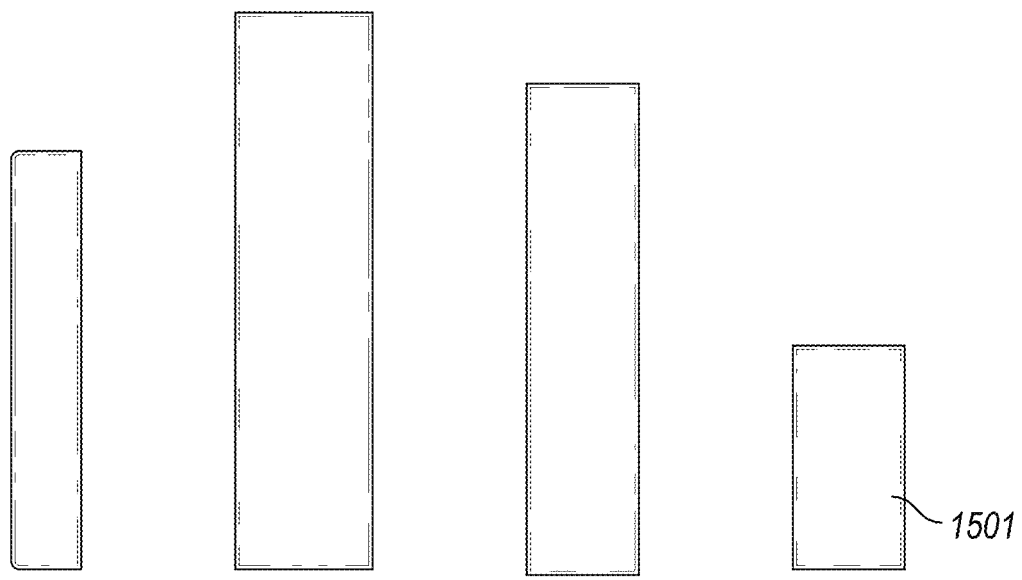
FIG. 15 illustrates exemplary profile dimensions for floor member lumber, including a flooring board, a perimeter floor beam, a floor joist, and a floor joist nailer according to various embodiments of the present disclosure.
Figure 16:
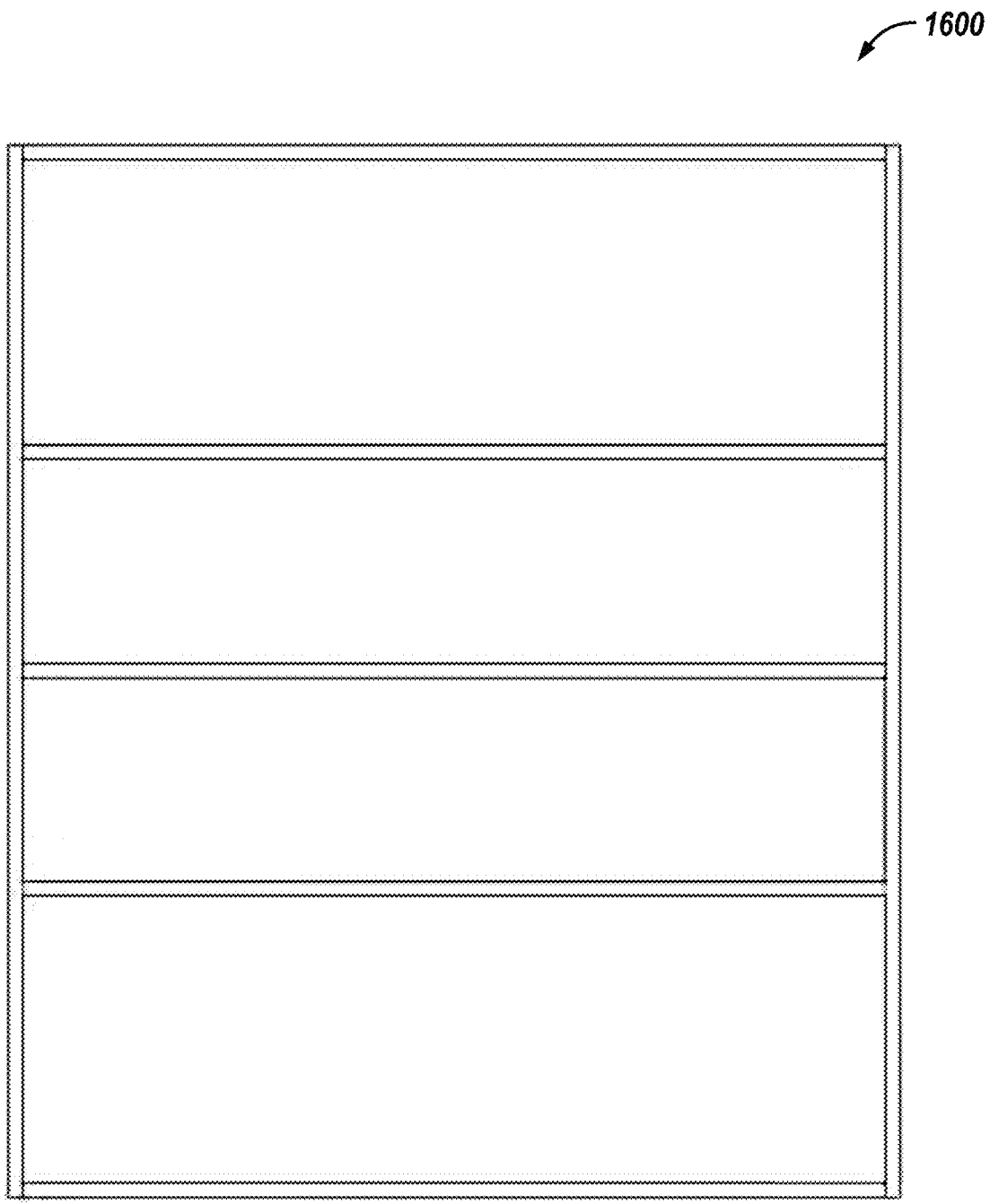
FIG. 16 shows a plan view of a floor joist panel including floor joist members illustrated in FIG. 15 according to various embodiments of the present disclosure.
Figure 17:
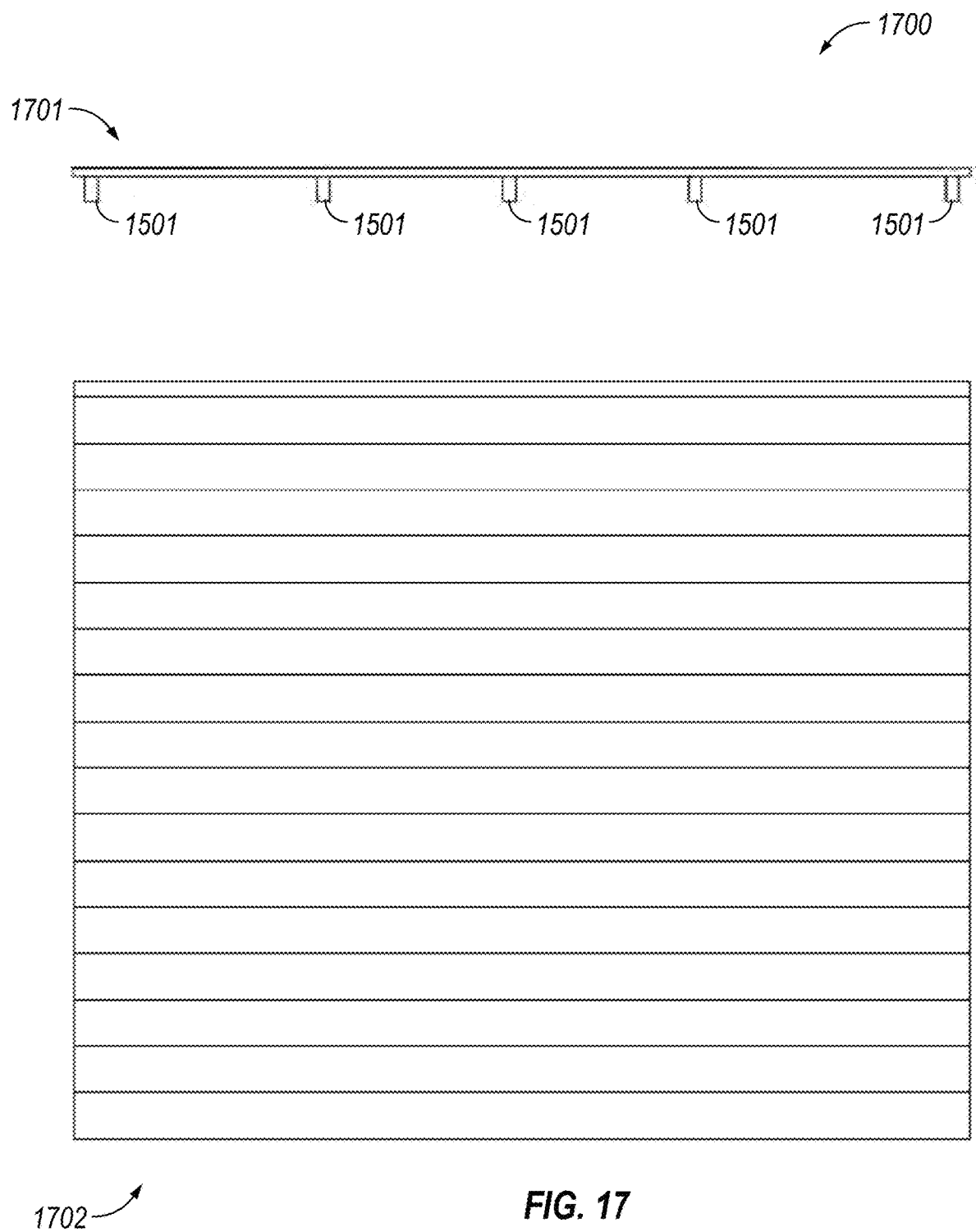
FIG. 17 shows a side view of a floor decking panel aligned above a plan view of a floor decking panel of the present disclosure, including flooring boards and floor joist nailers illustrated in FIG. 15 according to various embodiments of the present disclosure.

FIG. 15 illustrates exemplary profile dimensions for floor member lumber, including a flooring board, a perimeter floor beam, a floor joist, and a floor joist nailer 1501. FIG. 16 shows a plan view of a floor joist panel 1600 of the present disclosure, including floor joist members illustrated in FIG. 15. FIG. 17 shows a side view 1701 of a floor decking panel 1700 aligned above a plan view 1702 of a floor decking panel 1700 of the present disclosure, including flooring boards and floor joist nailers 1501 illustrated in FIG. 15.

Figures 18A, 18B:
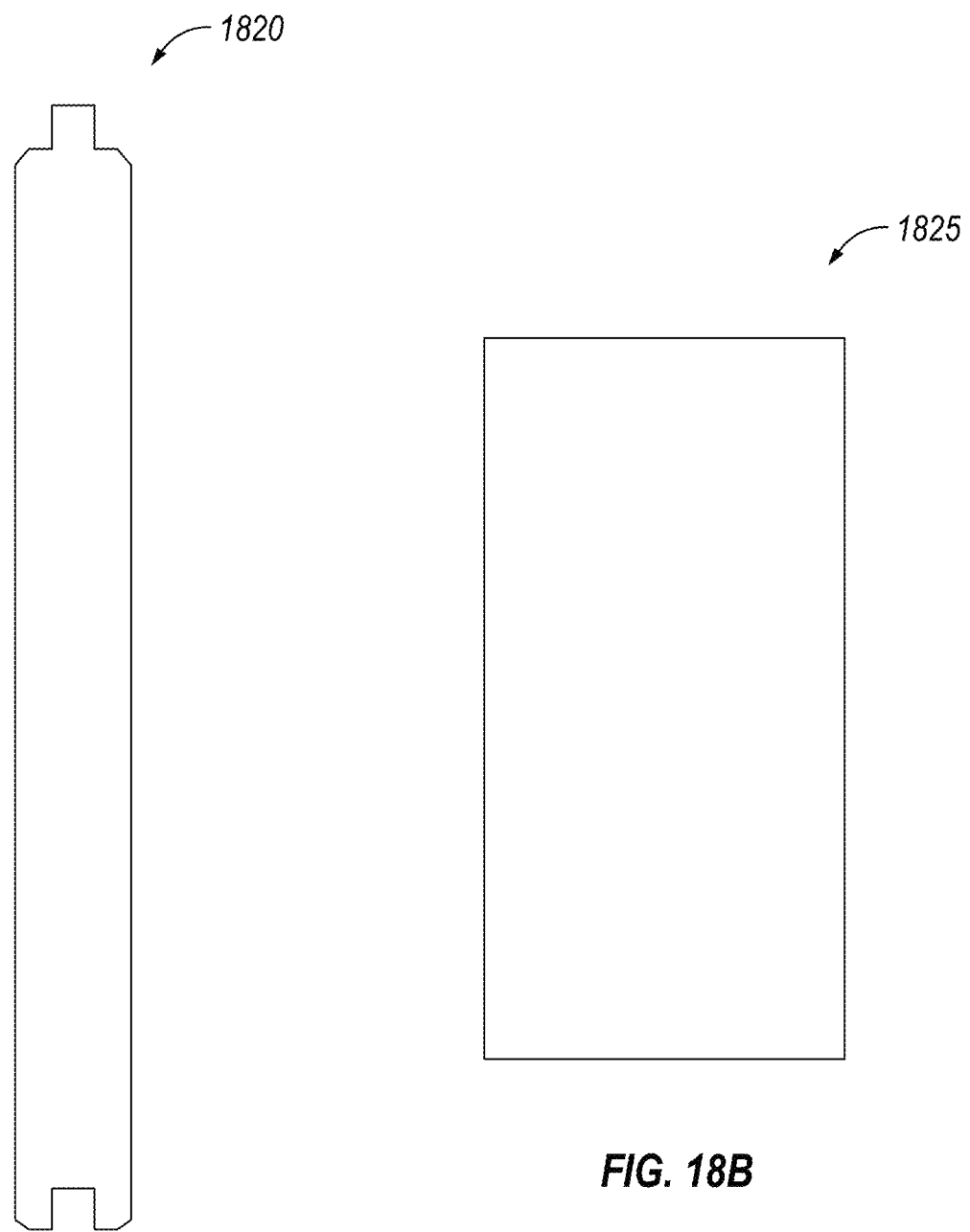
FIG. 18A illustrates a side view of an exemplary tongue-and groove siding board according to various embodiments of the present disclosure.
FIG. 18B illustrates a side view of an exemplary wall stud according to various embodiments of the present disclosure.

FIG. 18A illustrates a side view of an exemplary tongue-and groove siding board 1820 of the present disclosure. FIG. 18B illustrates a side view of an exemplary wall stud 1825 of the present disclosure. The wall framing panels 505 can comprise a plurality of wall studs 1825 that are adapted to be removably fastened to a door or a window as further described herein.

Figures 18C, 18D:
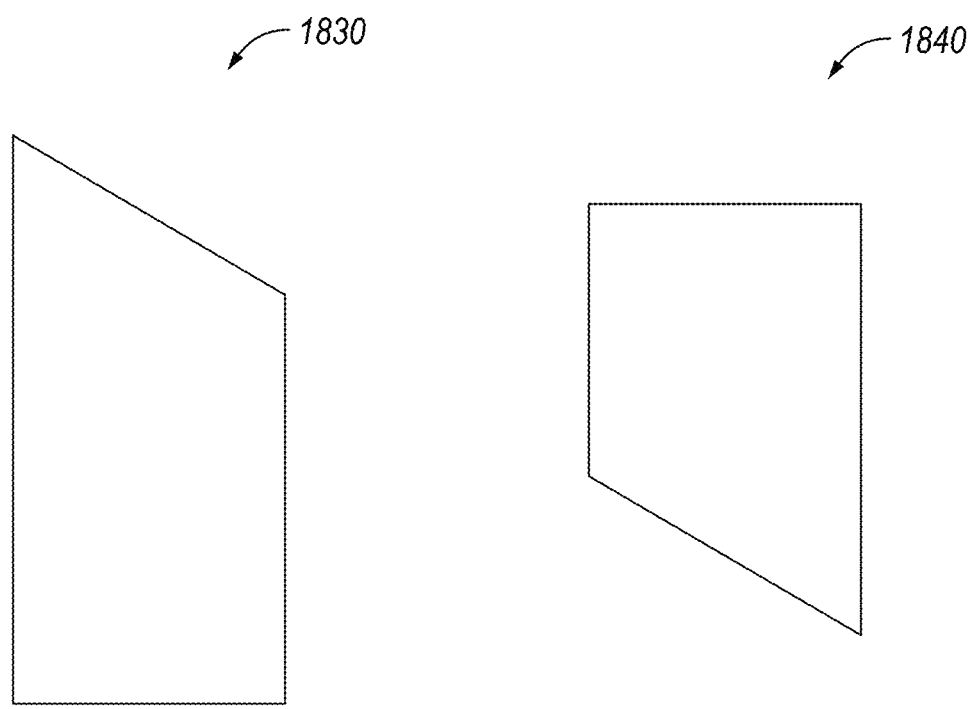
FIG. 18C illustrates an exemplary wall batten of according to various embodiments of the present disclosure.
FIG. 18D illustrates an exemplary siding batten of according to various embodiments of the present disclosure.
Figure 23:
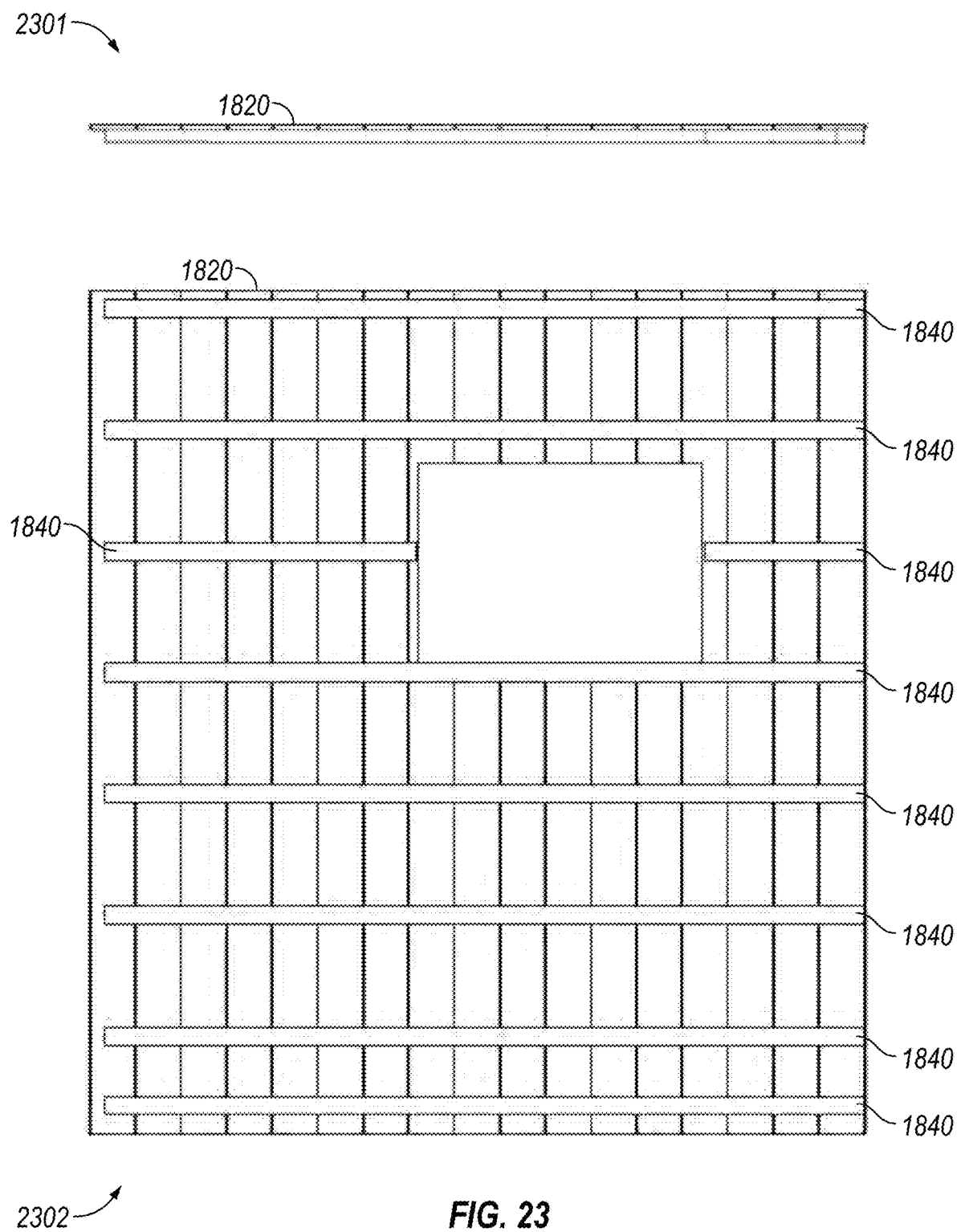
FIG. 23 illustrates a top view of a siding panel according to various embodiments of the present disclosure.
Figure 23A:
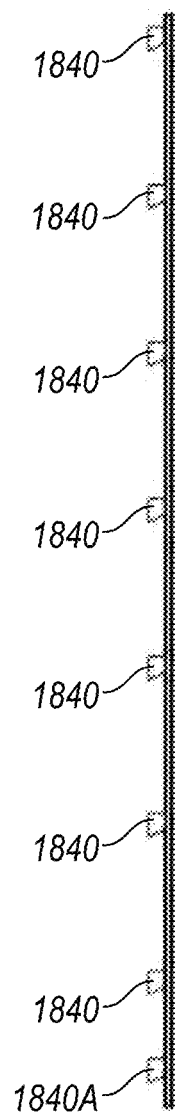
FIG. 23A illustrates a side elevational view (or cross section) of an exemplary siding panel of the present disclosure, such as the siding panel of FIG. 23 according to various embodiments of the present disclosure.
Figure 23B:
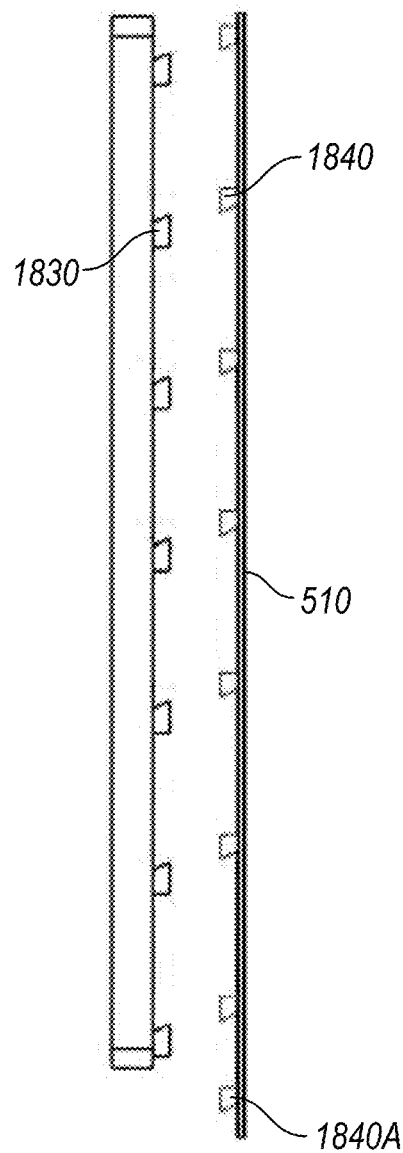
FIG. 23B illustrates a side view juxtaposition of an exemplary siding panel and framing panel according to various embodiments of the present disclosure.

FIG. 18C illustrates an exemplary wall batten 1830 of the present disclosure, which may be affixed to framing panels and configured to engage with siding battens 1840 as shown, for example, in FIG. 23B. FIG. 18D illustrates an exemplary siding batten 1840 of the present disclosure, which may be affixed to one or more siding panel S1-W and configured to engage with wall battens 1830 as shown, for example, in FIG. 23B. The examples of the siding battens 1840 and the wall battens 1830 are shown with complementary angled faces, however the battens could include other configurations for allowing engagement between the siding battens 1840 and the wall battens 1830.

Figure 19:
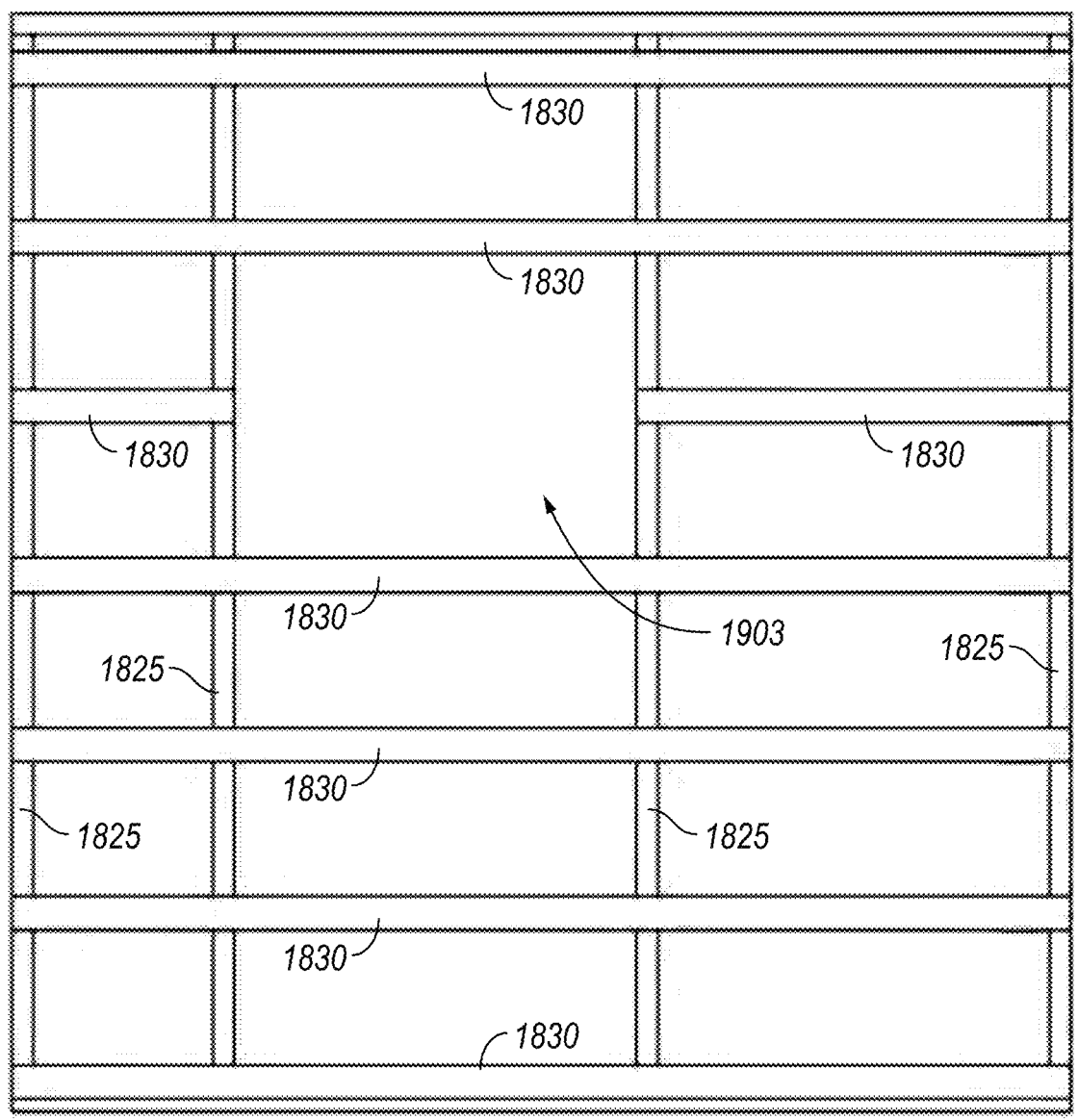
FIG. 19 illustrates a top view of a framing panel according to various embodiments of the present disclosure.
Figure 19A:
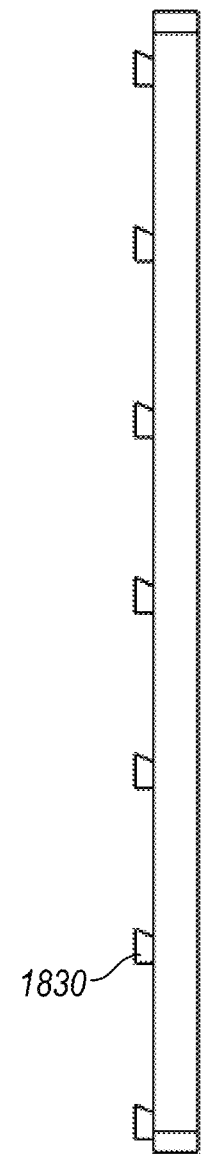
FIG. 19A illustrates a side elevational view (or cross section) of the framing panel of FIG. 19 according to various embodiments of the present disclosure.

FIG. 19 illustrates a top view 1901 of a framing panel W1-W aligned above an inside elevation view 1902 of a framing panel W1-W (also depicted in plan view in FIG. 10) of the present disclosure. At least one of the framing panels 505 (e.g., framing panel W1-W) or the siding panels 510 (e.g., S1-W) can be adapted to form a cutout for supporting a door or a window in an instance in which the at least one of the siding panels 510 is removably fastened to at least one of the wall framing panels 505. FIG. 19 depicts the framing panel W1-W can include wall battens 1830 (illustrated in FIG. 18C). The framing panel 505 of FIG. 19 has been adapted to form a cutout 1903 for a window. FIG. 19A illustrates a side elevational view (or cross section) of the framing panel 505 of FIG. 19, including attached wall battens 1830.

Figure 20:
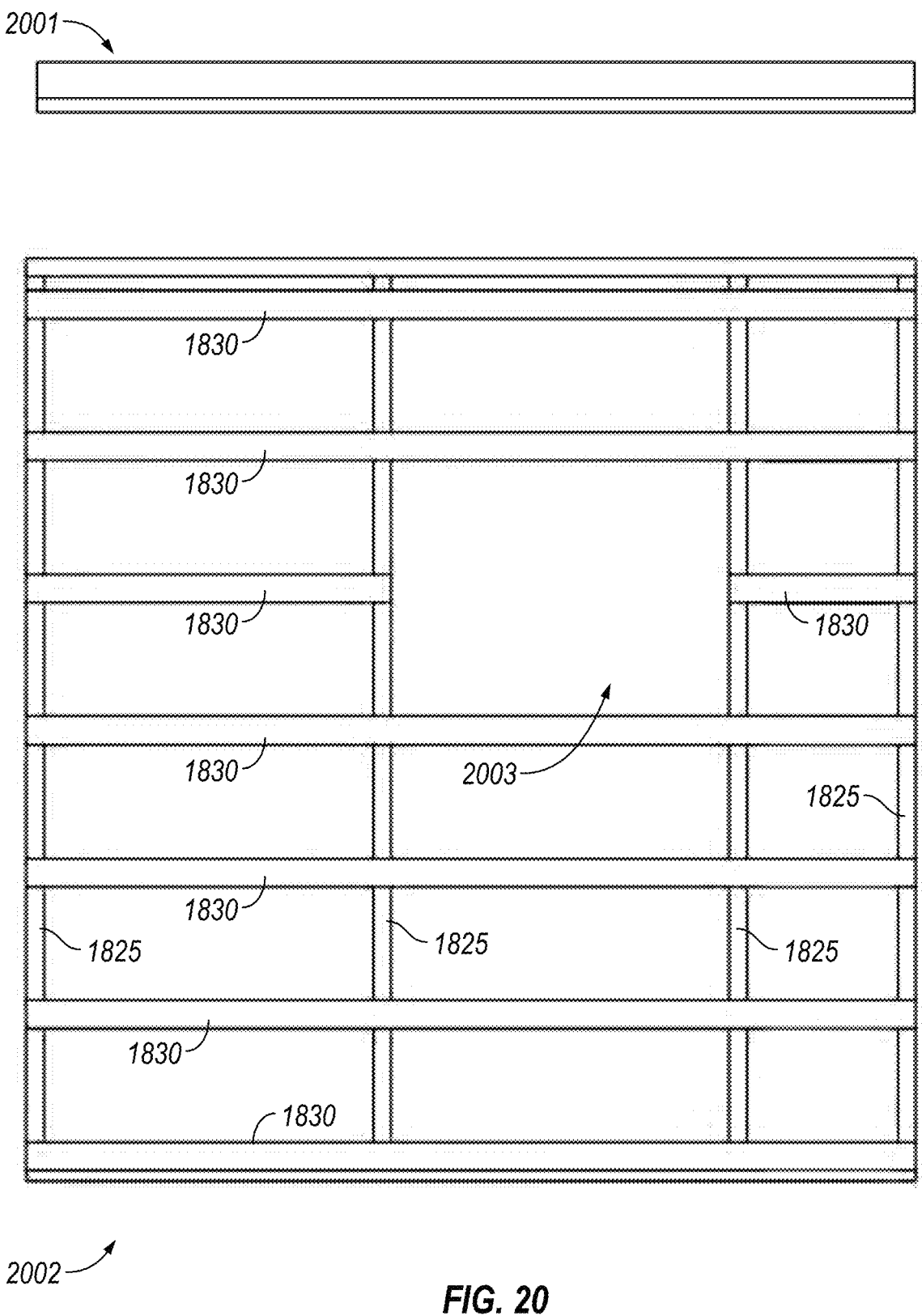
FIG. 20 illustrates a top view of a framing panel according to various embodiments of the present disclosure.

FIG. 20 illustrates a top view 2001 of a framing panel W2-W aligned above an inside elevation view 3102 of a framing panel W2-W (also depicted in plan view in FIG. 10) of the present disclosure, including wall battens 1830 illustrated in FIG. 18C; a cutout 2003 for a window is also depicted.

Figure 20A:
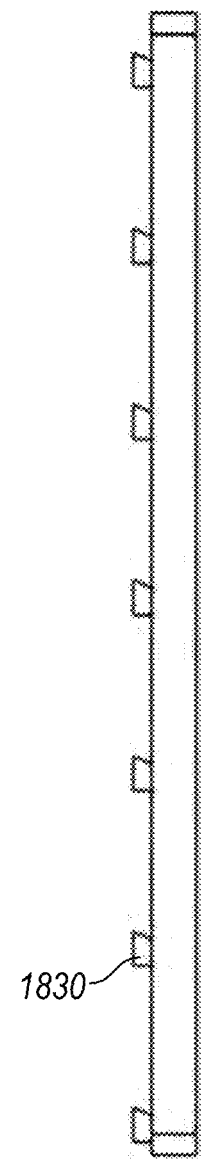
FIG. 20A illustrates a side elevational view (or cross section) of the framing panel of FIG. 20 according to various embodiments of the present disclosure.
Figure 21:
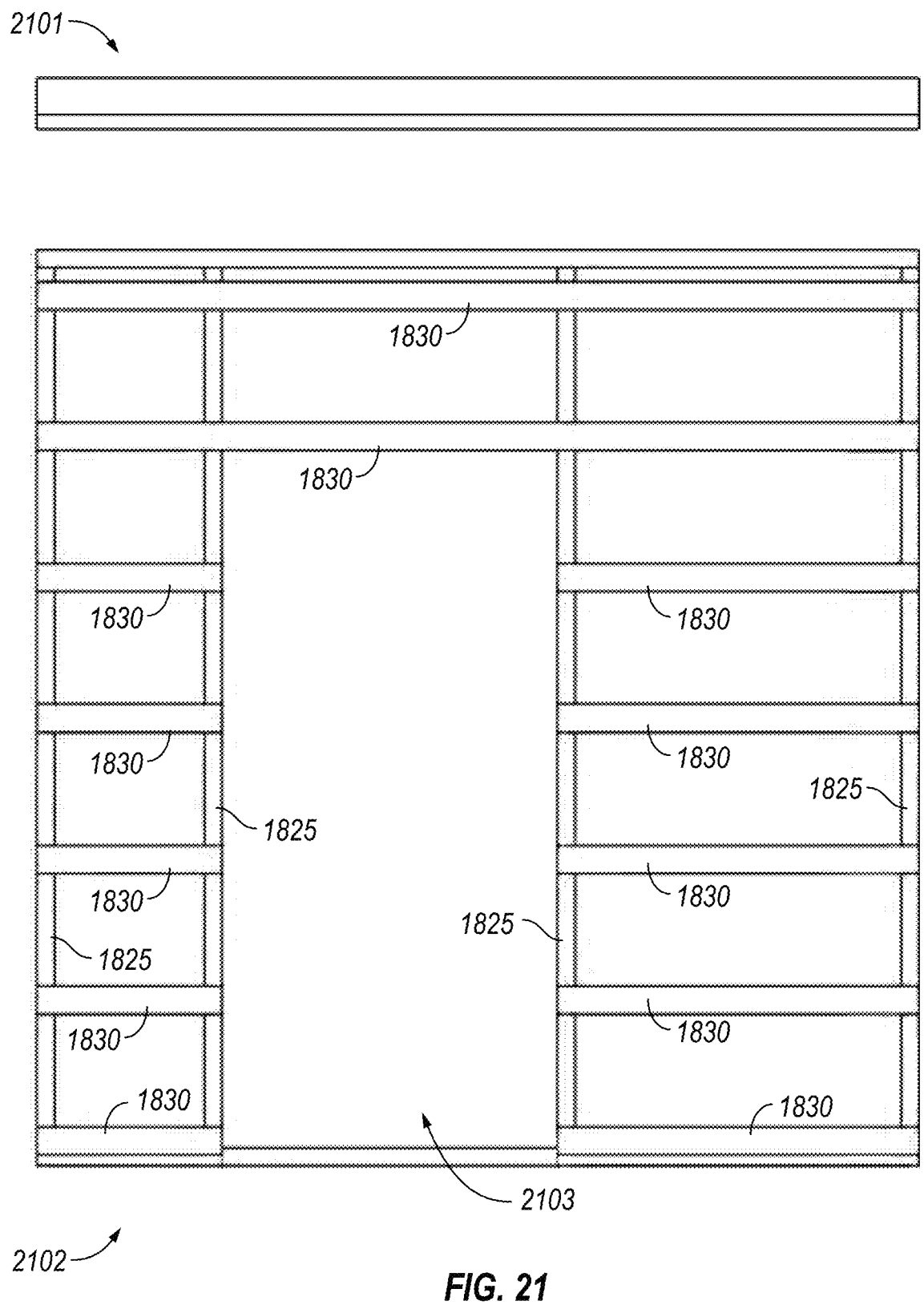
FIG. 21 illustrates a top view of a framing panel according to various embodiments of the present disclosure.
Figure 21A:
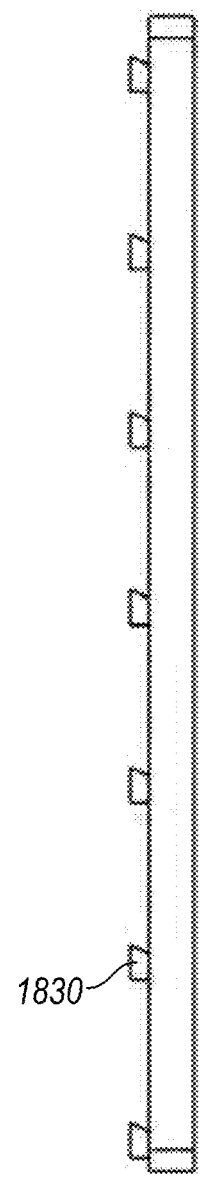
FIG. 21A illustrates a side elevational view (or cross section) of the framing panel of FIG. 21 according to various embodiments of the present disclosure.

FIG. 20A illustrates a side elevational view (or cross section) of the framing panel of FIG. 20, including attached wall battens 1830. FIG. 21 illustrates a top view 2101 of a framing panel W3-D aligned above an inside elevation view 2102 of a framing panel W3-D (also depicted in plan view in FIG. 10) of the present disclosure. Any of the framing panels 505 (e.g., framing panel W3-D) can including wall battens 1830 as illustrated in FIG. 18C. The framing panel 505 depicted in FIG. 21 has been adapted to form a cutout 2103 for a door. FIG. 21A illustrates a side elevational view (or cross section) of the framing panel of FIG. 21, including attached wall battens 1830.

Figure 22:
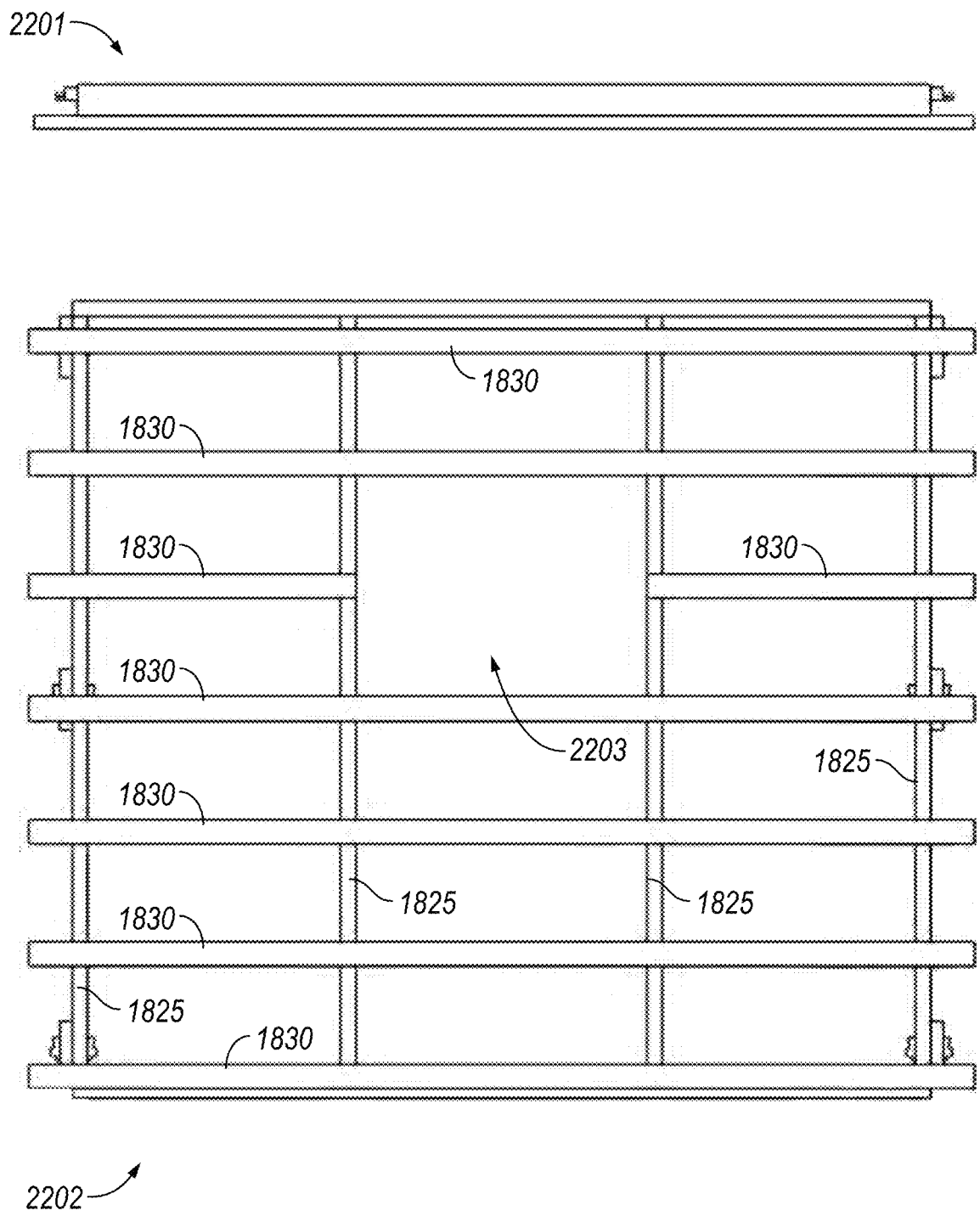
FIG. 22 illustrates a top view of a framing panel according to various embodiments of the present disclosure.

FIG. 22 illustrates a top view 2101 of one of the framing panels 505 (framing panel W4-W) aligned above an inside elevation view 2202 of the framing panel W4-W (also depicted twice in plan view in FIG. 10) of the present disclosure, including wall battens 1830 illustrated in FIG. 18C. The cutout 2203 for a window is also depicted.

Figure 22A:
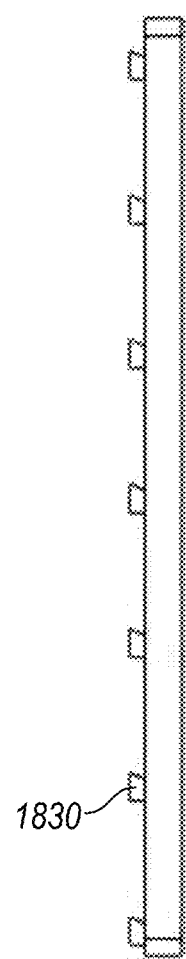
FIG. 22A illustrates a side elevational view (or cross section) of the framing panel of FIG. 22 according to various embodiments of the present disclosure.

FIG. 22A illustrates a side elevational view (or cross section) of the framing panel of FIG. 22, including attached wall battens 1830. FIG. 23 illustrates a top view 2301 of a siding panel S1-W aligned above an interior elevational view 2302 of siding panel S1-W, with tongue inset detail shown in the upper left area of the figure, and includes a plurality of siding boards 1820 illustrated in FIG. 18A and siding battens 1840 illustrated in FIG. 18D.

FIG. 23A illustrates a side elevational view (or cross section) of an exemplary siding panel 510 of the present disclosure, such as the siding panel 510 of FIG. 23, including attached siding battens 1840. FIG. 23B illustrates a side view juxtaposition of an exemplary siding panel 510 and framing panel 505 of the present disclosure, showing engagement of siding panel 510 with framing panel 505 through side and wall batten mating; bottom siding panel 1840A of the siding panel 510 is configured, in one embodiment, to engage with a batten installed on a perimeter floor joist beam, as illustrated, for example, in FIG. 7B. The siding battens 1840 can include a plurality of bottom siding battens 1840A as depicted in FIG. 23A. The floor assembly 200 can include a plurality of floor beams comprising a plurality of floor battens (noted in FIG. 23B as not depicted). The at least four modular wall assemblies 105 can be removably fastened to the floor assembly 200 based at least in part by the bottom siding battens 1840A engaging the floor battens.

Figure 24:
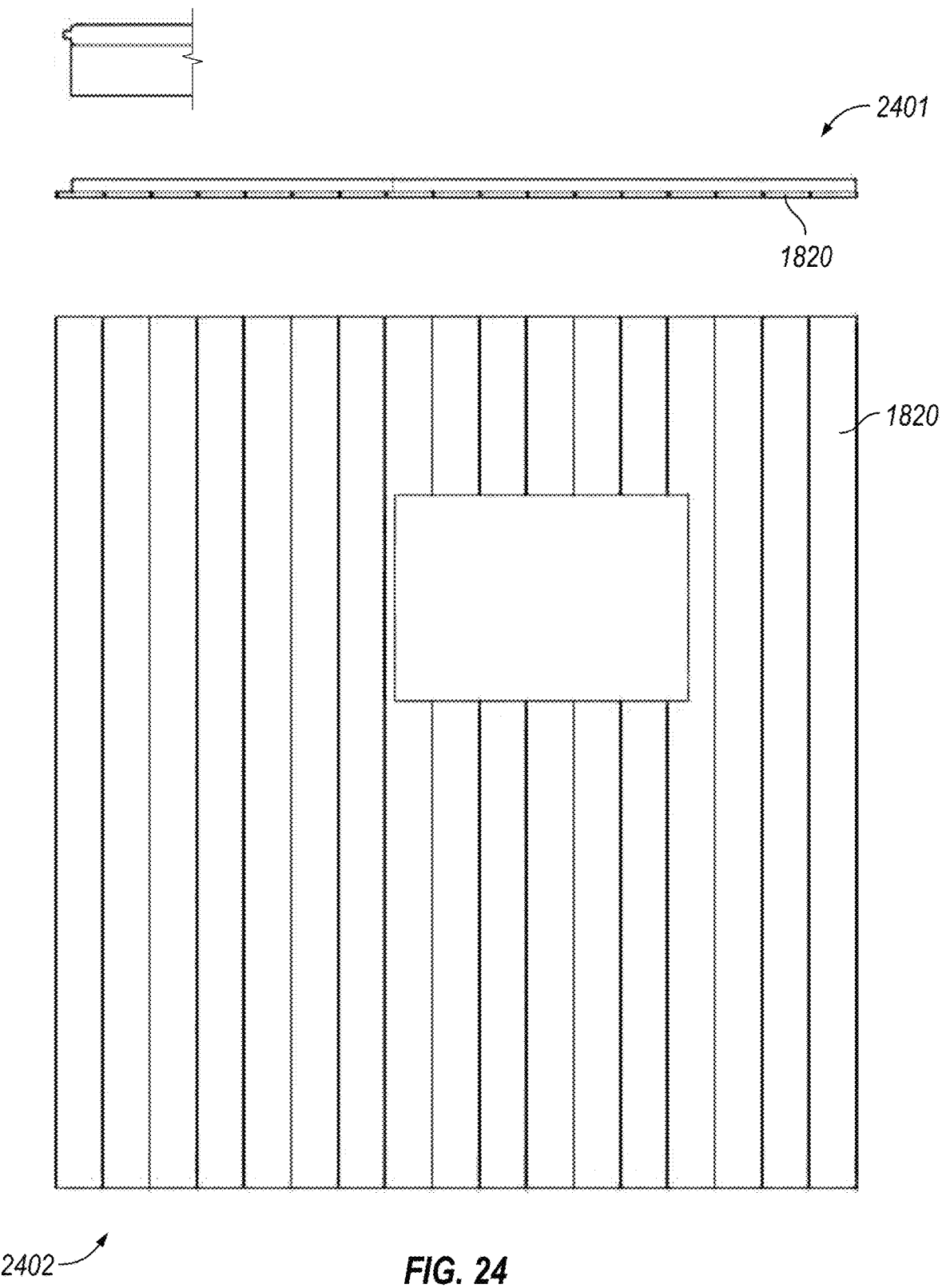
FIG. 24 illustrates a top view of an exemplary siding panel of the present disclosure according to various embodiments of the present disclosure.

FIG. 24 illustrates a top view 2401 of an exemplary siding panel of the present disclosure aligned above an exterior elevational view 2402 of the exemplary siding panel, with tongue inset detail shown in the upper left area of the figure, and includes a plurality of siding boards 1820 illustrated in FIG. 18A; a cutout for a window is also depicted.

Figure 25:
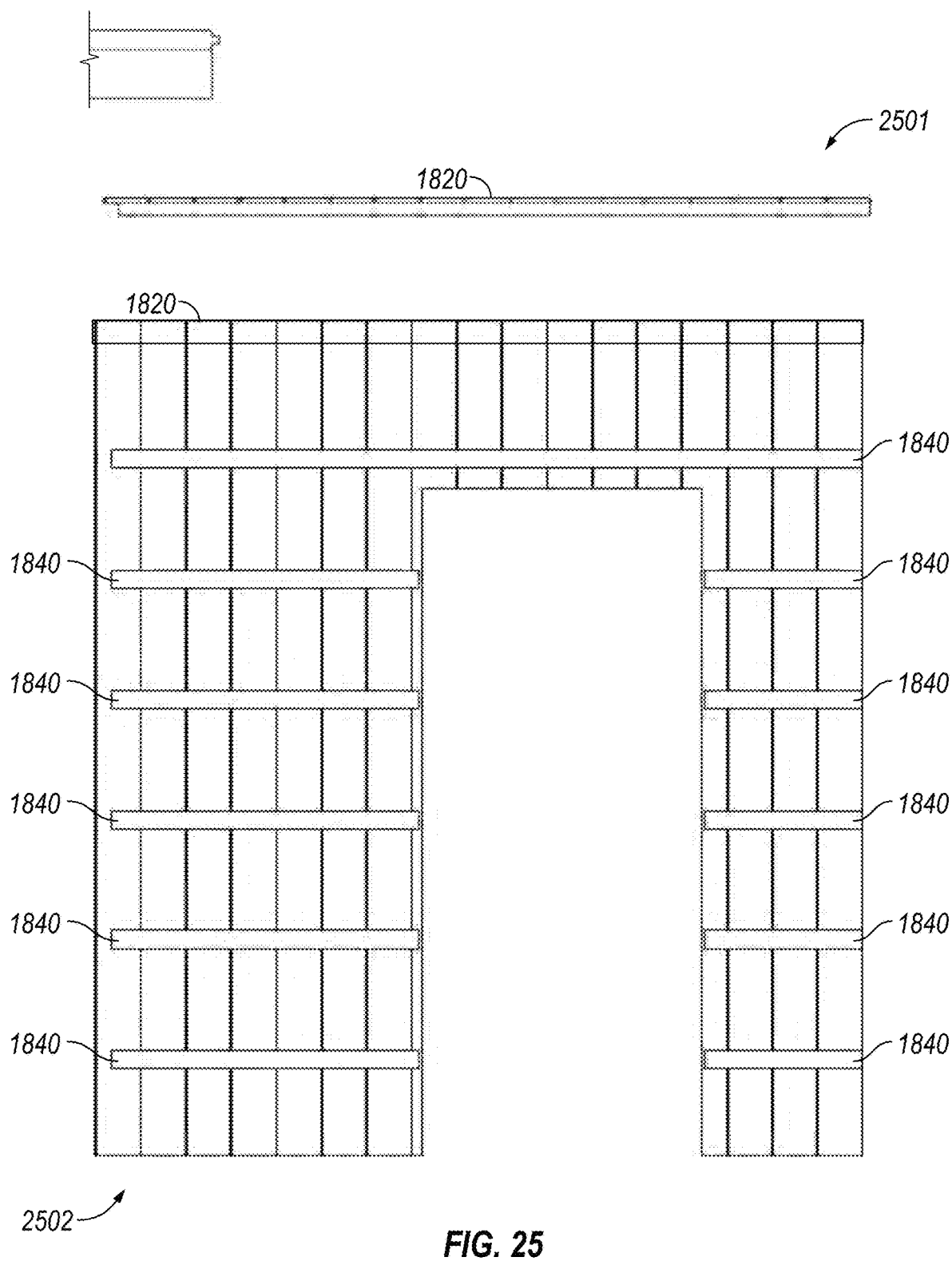
FIG. 25 illustrates a top view of a siding panel according to various embodiments of the present disclosure.
Figure 26:
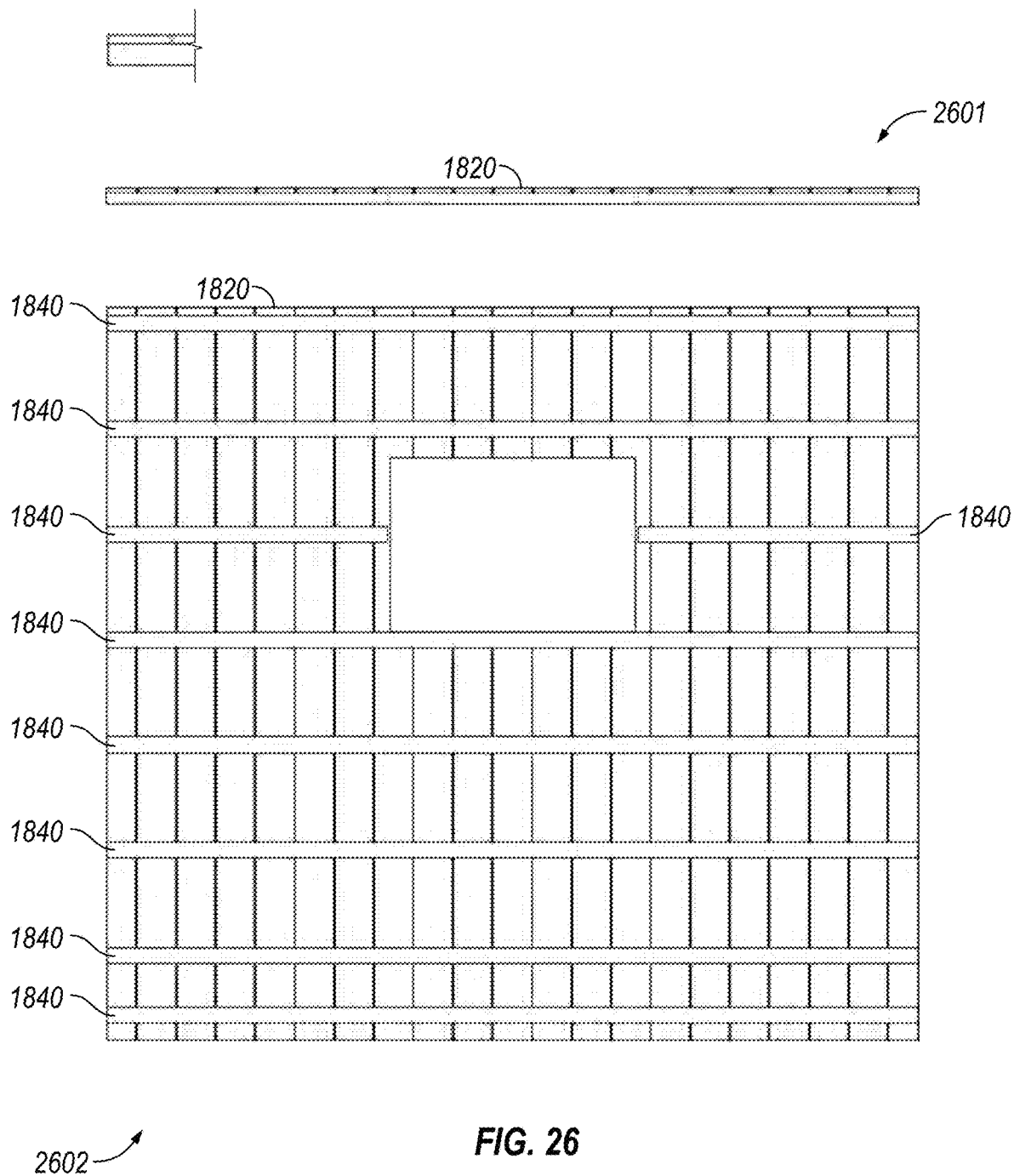
FIG. 26 illustrates a top view of a siding panel according to various embodiments of the present disclosure.

FIG. 25 illustrates a top view 2501 of a siding panel S3-D aligned above an interior elevational view 2502 of siding panel S3-D, with tongue inset detail shown in the upper left area of the figure, and includes a plurality of siding boards 1820 illustrated in FIG. 18A and siding battens 1840 illustrated in FIG. 18D; a cutout for a door is also depicted. FIG. 26 illustrates a top view 2601 of a siding panel S4-W aligned above an interior elevational view 2602 of siding panel S4-W, with tongue inset detail shown in the upper left area of the figure, and includes a plurality of siding boards 1820 illustrated in FIG. 18A and siding battens 1840 illustrated in FIG. 18D. A cutout for a centrally-located window is also depicted. FIG. 26 depicts that the siding panel S4-W can be adapted to form the cutout by cutting one or more siding boards of the siding panel S4-W flush with the siding battens 1840.

Figure 27:
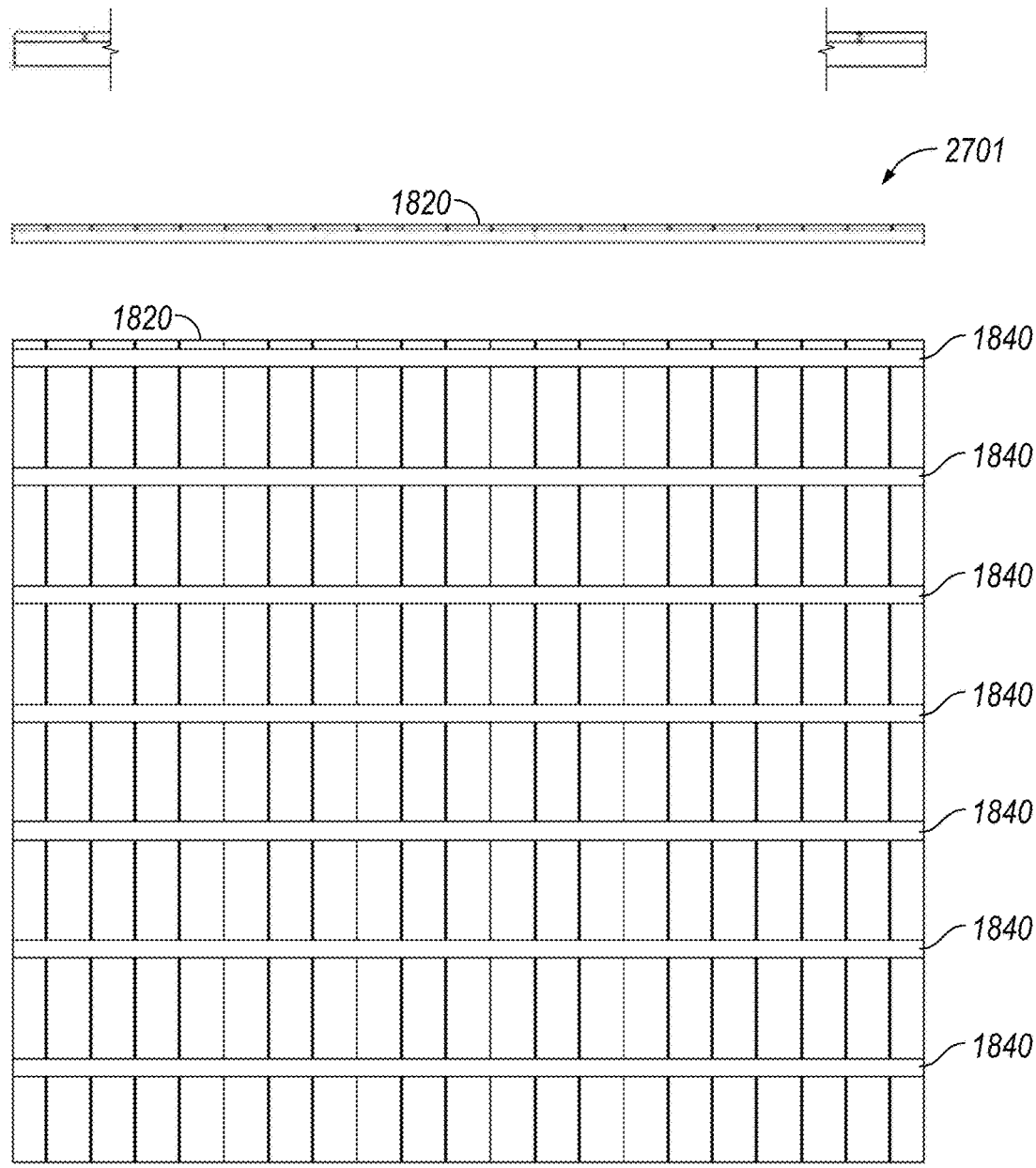
FIG. 27 illustrates a top view of a siding panel according to various embodiments of the present disclosure.
Figure 28:
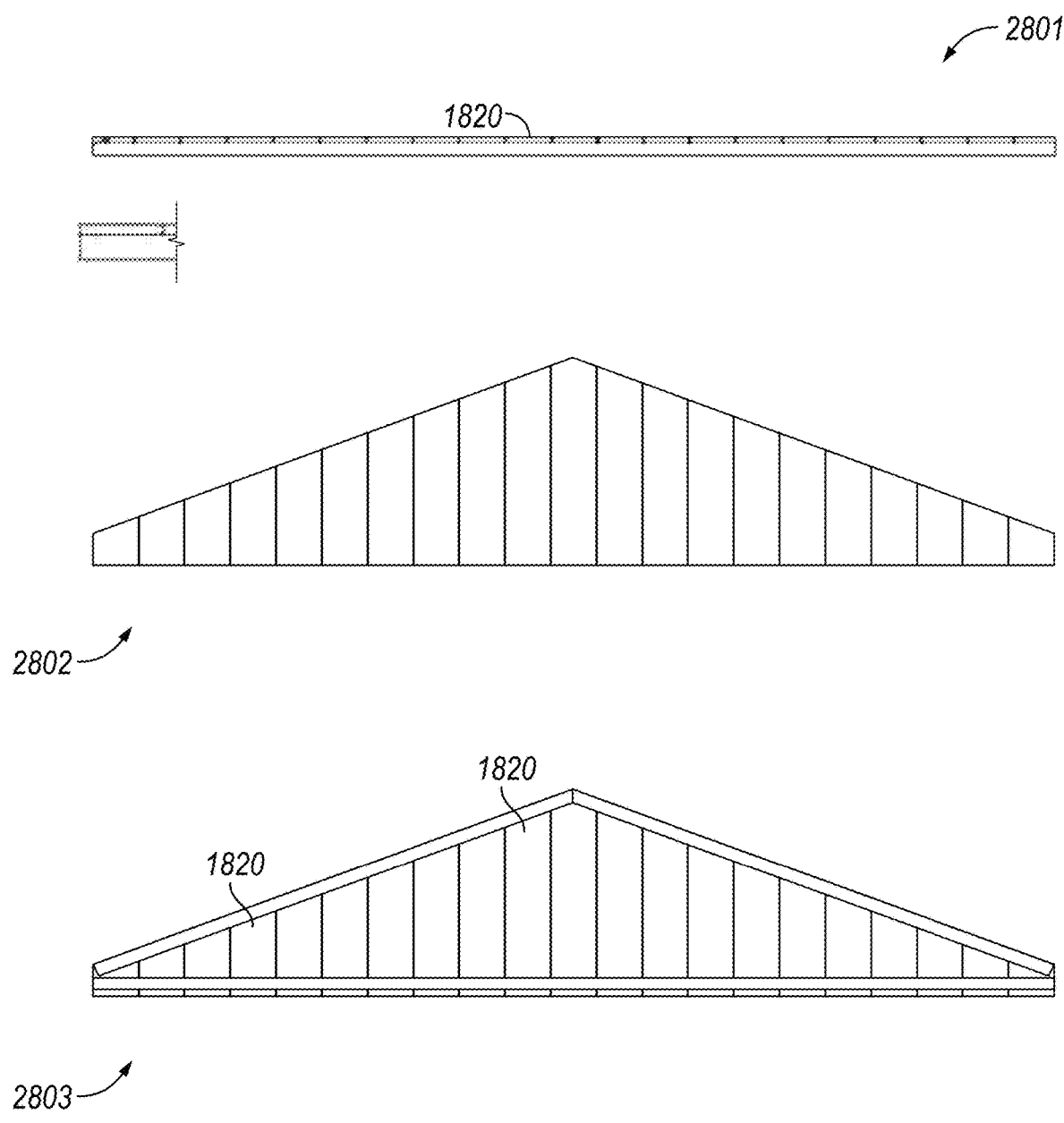
FIG. 28 shows a plan view of a gable siding panel according to various embodiments of the present disclosure.

FIG. 27 illustrates a top view 2701 of a siding panel S4 aligned above an interior elevational view 2702 of siding panel S4, and includes a plurality of siding boards 1820 illustrated in FIG. 18A and siding battens 1840 illustrated in FIG. 18D. FIG. 28 shows a plan view 2801 of a gable siding panel S5-G comprising a plurality of siding boards 1820, along with an exterior plan view 2803 of the gable side panel S5-G, along with an siding board length illustration 2802 depicting exemplary lengths of the siding boards 1820.

Figures 29C, 29D:
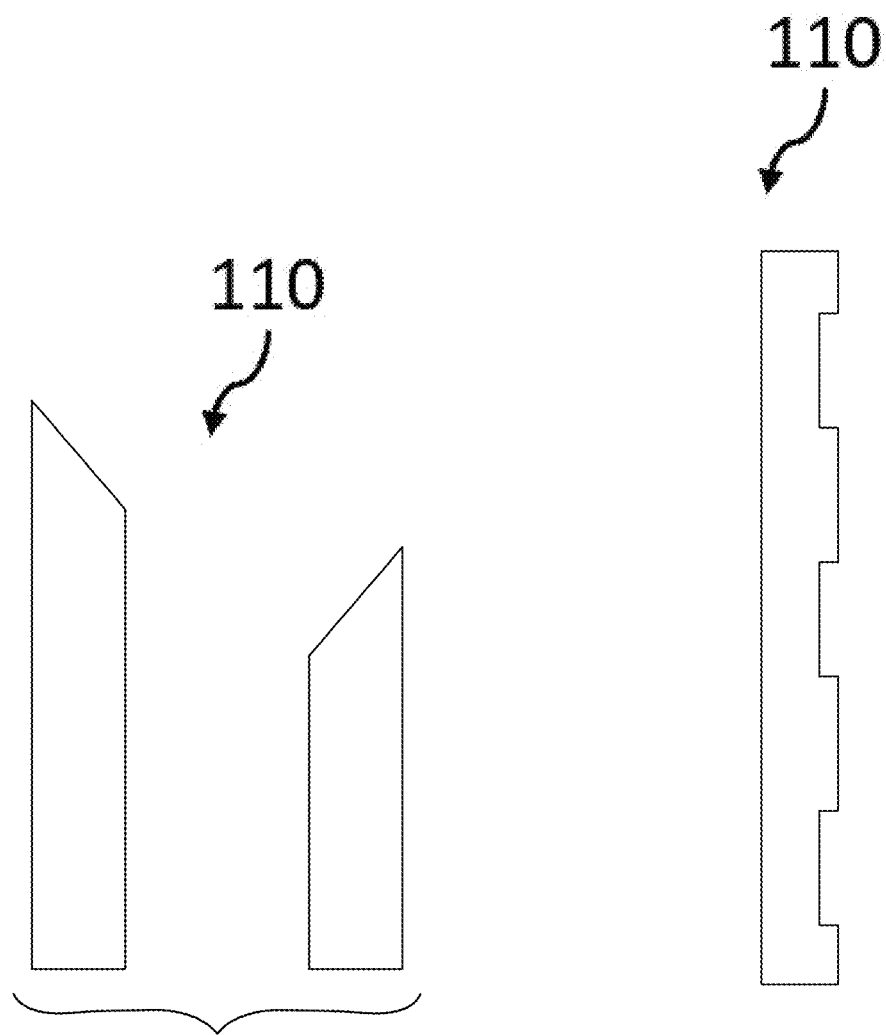
FIGS. 29C and 29D respectively show exemplary cross sectional views of roof members comprising a ridge board and a roof decking board according to various embodiments of the present disclosure.

FIGS. 29A and 29B respectively show exemplary cross sectional views of the roof assembly 110 comprising a truss batten (depicted as "truss/batten") and a roof batten (depicted as "roof batten"). FIGS. 29C and 29D respectively show exemplary cross sectional views of roof assembly 110 comprising a ridge board (depicted as "ridge board") and a roof decking board (depicted as "roof decking"). The roof assembly 110 can include a plurality of top chords 3050, a plurality of web members 3040, at least one web post 3030, and at least one bottom chord 3020.

Figure 30A:
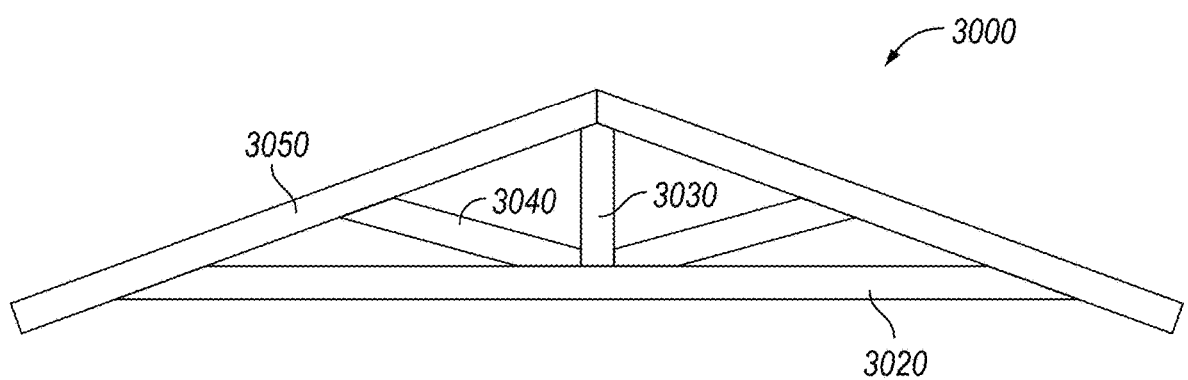
FIG. 30A illustrates an elevational view of an exemplary truss according to various embodiments of the present disclosure.
Figure 30B:
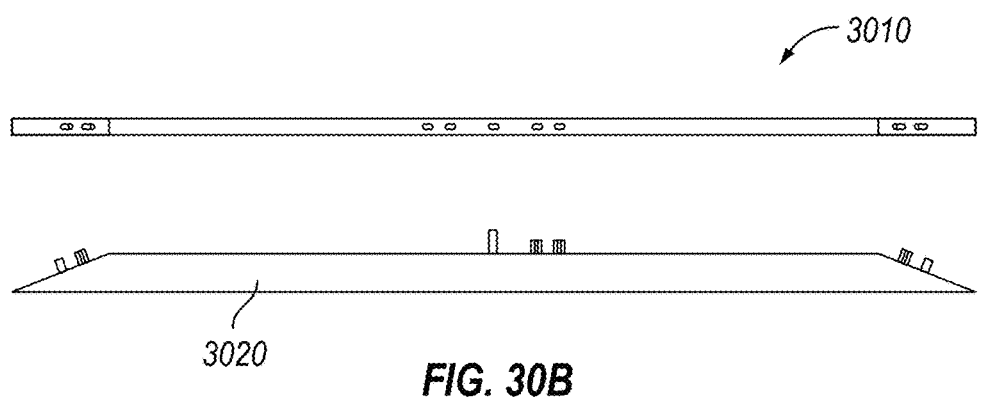
FIG. 30B illustrates a plan view of an exemplary bottom chord of a truss bottom according to various embodiments of the present disclosure.

FIG. 30A illustrates an elevational view of an exemplary truss 3000. FIG. 30B illustrates a plan view 3010 of an exemplary bottom chord 3020 of the truss bottom aligned over an elevational view 3000 of the bottom truss cord 3020, the elevational view showing tenons extending from top surfaces of the bottom chord 3020 for engaging in mortices (not shown) formed in the top chords, and web members and web posts of the truss 3000. FIG. 30C shows a plan view of a web member 3040 positioned above an elevational view of the web member 3040. FIG. 30D illustrates an elevational view of a web post 3030. FIG. 30E shows a plan view of a top chord 3050 positioned above an elevational view of the top chord 3050.

Figure 30F:
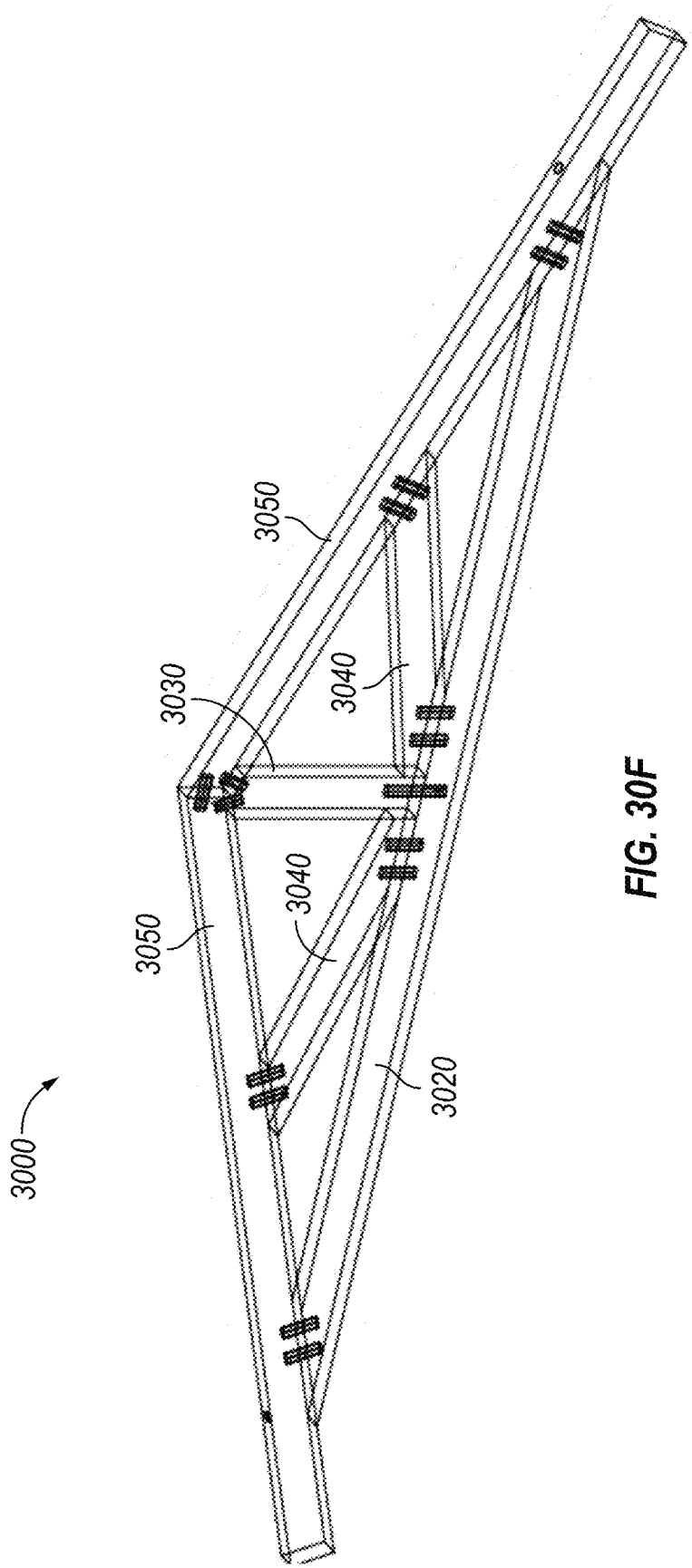
FIG. 30F illustrates a wireframe perspective view of the truss showing exemplary placement of tenons within mortices of respective truss members according to various embodiments of the present disclosure. An exemplary location for a global positioning system (GPS), general packet radio service (GPRS), and/or radio-frequency identification (RFID) tag is also illustrated according to various embodiments of the present disclosure.

FIG. 30F illustrates a wireframe perspective view of the truss 3000 showing exemplary placement of tenons within mortices of the respective truss members including the top chords 3050, the web members 3040, at least one web post 3030 (e.g., the web post 3030), and at least one bottom chord 3020 (e.g., the bottom chord 3020). An exemplary location for a GPRS/GPS/RFID tag 3060 is also illustrated on a top surface or within a shallow mortice of the bottom chord 3020.

FIG. 31 presents an exemplary list and specification for fasteners used in constructing various portions of the structure 100. In various embodiments, the fasteners may require corrosion protection, may include self-cutting/drilling features, and certain of the fasteners may comprise structural screws, such as the following fasteners: 4.8 mm×76.2 mm; 4.8 mm×63.5 mm; 5.5 mm×203.2 mm; and 7.0 mm×101.6 mm. The illustrated Recommended Manufacture column shows exemplary recommended manufacturer part numbers from Simpson Strong-Tie & Kreg (SML).

Figure 32:
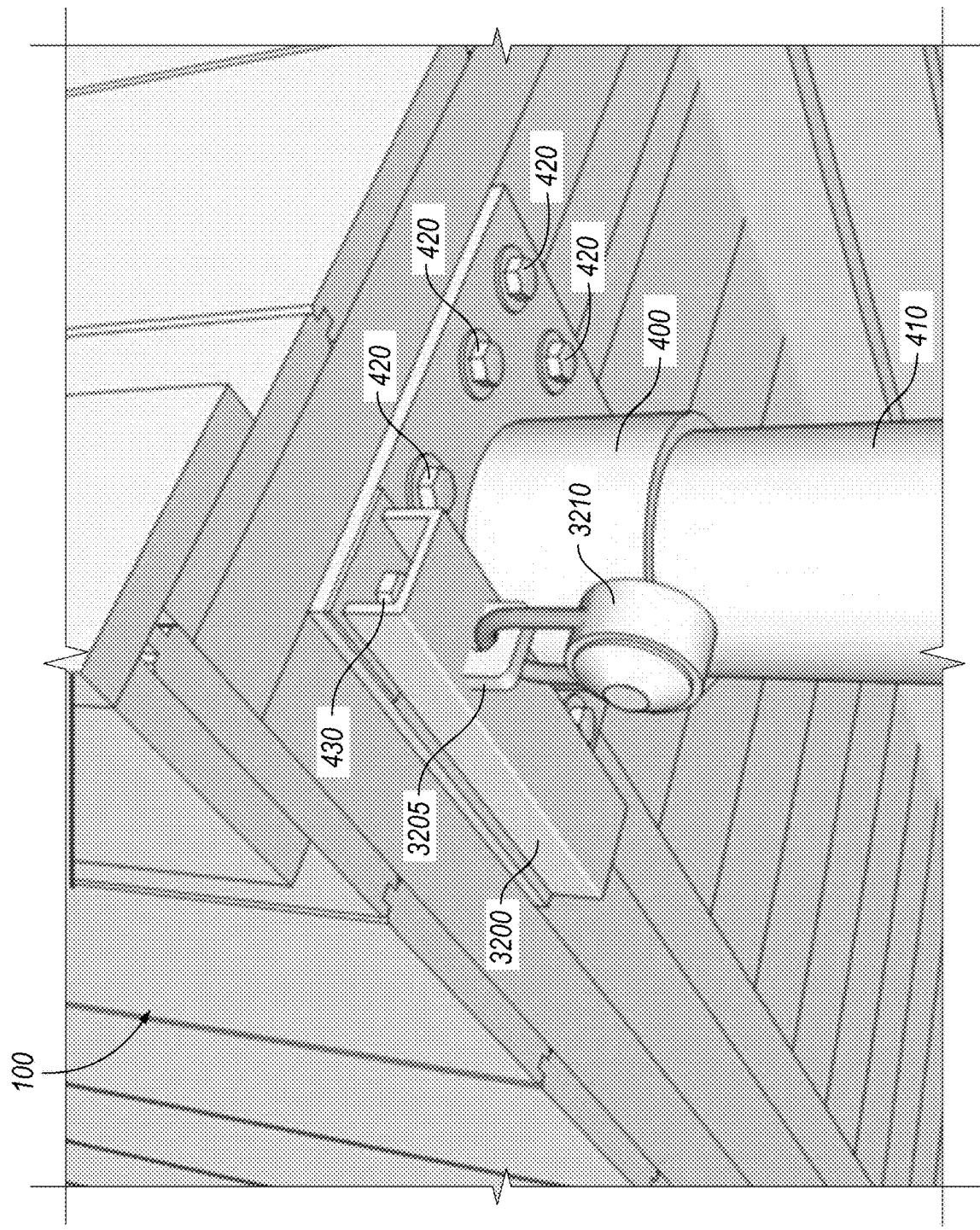
FIG. 32 shows a perspective view of a bottom corner of the structure according to various embodiments of the present disclosure.

FIG. 32 shows a perspective view of a bottom corner of structure 100 secured to a pier cap 400 through structural bolts 420, 430, and a locking mechanism 3200, 3205, and 3210 that inhibits access to structural bolts 430 (e.g., until lock 3210 is removed). The locking mechanism 3200, 3205, and 3210 can be adapted to be removably fastened to the floor assembly 200 and the foundation assembly 395. The locking mechanism 3200, 3205, and 3210 can be adapted to inhibit access to the at least one of the plurality of fasteners (e.g., the structural bolts 430) in an instance in which the locking mechanism 3200, 3205, and 3210 is removably fastened to the floor assembly 200 and the foundation assembly 395.

Component Fabrication and Assembly
Wall Segments and Panels

The modular wall assemblies 105 can be comprised of wall framing panels 505 and siding panels 510 (for purposes of the present disclosure the terms "framing panels," "wall framing panels," and "wall panels" may be used interchangeably). Detailed drawings and interconnections of wall segments may be seen, for example, in FIGS. 2A-D, 5, 6, 7, 7A-C, 10, 11, 18A-D, 19, 19A, 20, 20A, 21, 21A, 22, 22A, 23, 23A-B, and 24-27. The wall framing panels 505 can range from 2.5 m to 2.8 m in width. The wall framing panels 505 can be a predefined height. In a preferred embodiment, each one of the wall framing panels 505 can be a same predefined height in meters such as 2.6 meters. The wall framing panels 505 and siding panels 510 can be delivered as separate components to the site. The siding panel batten strips can be designed to interlock directly with the framing panel batten strips (see, for example, FIG. 23B) to form a finished wall. The vertical siding segments can be offered in three configurations; solid, or with a window or door opening.

The modular wall assemblies 105 (or modules or panels thereof) can be joined and retained together through a wedge and peg/tenon connection 700 (e.g., FIG. 7C). In one aspect, the wedge acts as a tenon in a mortice cut into the peg. Wedge and tenon may, in some embodiments, be comprised of wood such as one or more hardwoods. As the wedge can include a roughly orthogonal side and an opposite angled side, it can be inserted and hammer/friction fit into the peg from both ends, to apply force to maintain wall segments in proximity with one another with minimal metal fastener use, thus supporting a sustainable and cost-effective building model.

One or more segments of the siding panels 510 can be moved or modified to accommodate a door, window or screen. In some embodiments, modifying a siding panel will not compromise the structure 100. This can allow the occupant of the structure 100 to increase ventilation & airflow, sunlight, and sun heat according to their individual needs.

One or more siding panels 510 of the modular wall assemblies 105 can be removed to insert a window frame. The window frame can be the same width as the distance between the on-center spacing of the wall studs 1825. The window frame height can be designed to fit between the standard batten spacing, and the window frame can be removed from the wall panel and replaced with a solid siding blank. An added utility associated with being able to remove a wall segment of any wall and insert a window frame means the occupant of the structure 100 can choose to easily have an additional window added to the structure 100; similarly, if a structure 100 has a window facing east and it is determined it would be better for the window to face west, the window frame can be removed from the structure 100 and interchanged with the wall segment on the opposite wall—allowing them to have more or less sunlight/sun heat based on the time of the day.

The middle and bottom segments of the framing panel can be modified to insert a door frame; the door frame, in certain embodiments, can be the same width as the distance between the on-center stud spacing of the wall framing panels 505.

The utility associated with being able to remove a portion of siding without affecting the structure 100, can, in some instances mean the owner of the structure 100 can choose to easily have an additional door frame added to the structure; additional utility can be found when connecting a structure extension. A passageway or doorway can be easily added to connect the original structure and the new structure extension; or, wall framing inserts may be utilized to create a double-wide opening when adding an extension to the structure 100. Door frames, in various embodiments, may be added to create an entry door and an exit door to the new structure extension. Thus, the occupant of the structure 100 may, at will, add a new room extension to any side of any room, because a doorway may be created between the existing room and the new extension at any desired point.

Foundation and Locking System

The foundation assembly 395 can comprise a plurality of helical piers 410, which can support the gravity and environmental loads of the structure 100. A pier cap 400 can be placed onto the top of one or more helical pier 410. One or more pier cap 400 and helical pier 410 can be structurally pinned together, such as through a pier bolt mentioned below.

The helical piers 410 of the present disclosure, illustrated, for example, in FIGS. 4-6, can be selected based upon a heaviest expected design loads possibly also including a design safety margin, including the gravity loads from an added extension. Oversizing the six original piers 410 can eliminate or reduce the need to add or replace a pier where an extension attaches to the original/base structure 100. The floor framing panels of the structure 100 can have a continuous cleat that will receive a matching cleat positioned on the floor framing panel extension. The perimeter floor joist beam of the extension can also hook on the base unit cleat. The connection will support the floor loads and any load-bearing walls that support a roof load. The helical piers 410 can also be removable and reusable.

As shown in one embodiment of FIG. 32, one or more pier cap 400 of the structure 100 can include a security tab, which may be locked to deter removal of the structure 100 from the helical piers 410. At least one of a plurality of fasteners (e.g., the structural bolt 430) can attach to the structure 100 through a 2 mm×50 mm×50 mm thrust washer located at the corner of the pier cap 400 that can be protected from full access by the structural channel 3200. The larger washer position at the end of the channel 3200 can reduce a gap between the channel 3200 and the pier cap 400, thus increasing the difficulty involved in prying one end of the channel 3200 down and away from the pier cap 400 to expose the structural bolt 430 head. Access to the structural bolt 430 that connects the structure 100 to the pier cap 400 can be locked by a lock 3210 that secures to a staple 3205; staple 3205 can be affixed, such as by welding, to the pier cap 400, and can be configured to pass through a slot or opening defined in the structural channel 3200 to allow installation of lock 3210 through staple 3205.

Once the lock 3210 is removed, the structural channel 3200 may be removed or moved over the staple 3205, such as by a hinged motion from an internal hinge located at an end distal to the staple 3205, or through simple removal if no hinge is present. Once the structural channel 3200 is moved from its locked position to an unlocked position, access to obscured structural bolt 430 that affixes the pier cap 400 to the structure 100 can be allowed, and such bolt may be removed through standard tools to permit complete removal of structure 100 from its installed position on the pier caps 400 that are affixed to the helical piers 410.

In an alternate embodiment, an access hole (e.g., threaded or unthreaded) may be placed to define an opening between the pier cap 400 and the helical pier 410, through which a pier bolt may be passed and secured to prevent removal of the pier cap 400 from the helical pier 410. In this embodiment, access to the pier bolt would be allowed by removal of the structural channel 3200, which may occur only after lock 3210 is changed from a locked position to an unlocked position and removed from the staple 3205.

Floor Segment

The floor assembly 200 can comprise a number of structural components: a prefabricated floor framing panel (see, e.g. FIG. 8, FIG. 16); a prefabricated decking panel (see, e.g., FIG. 9, FIG. 17); and a pre-cut perimeter beam (see, e.g. FIG. 7B). The structure 100 can include two approximate 2.5 m×3 m floor joist and decking panels as shown in FIGS. 8 and 9. The floor framing panel can be mechanically attached to the helical pier caps 400. In an embodiment, lengths of the perimeter of the foundation beam box can match the lengths of the wall framing panels of the structure 100 being constructed. In additional aspects, the flooring boards can be attached to floor joist nailers 1501 to form a floor decking panel 1700. The floor joists can be fastened together to form the floor joist panel 1600, and the perimeter floor joist beam members will consist of four cut-to-length members. A bottom wall batten can be attached to the floor joist beam at the fabrication facility as part of the panelization process. In one preferred embodiment, nine 7 mm×101.6 mm structural fasteners may be used to attach the helical pier caps 400 to the floor system. The fasteners can be driven into the floor beam and floor joists.

Roof Components

The roof assembly 110 can include a gable truss roof. The truss roof can use floating tenons (see, e.g., FIG. 30F) as illustrated to fasten truss elements together, which can eliminate the need for screws and plates. The roof framing components and finish roofing panels can be shipped separately to the site. The roofing panel battens can mechanically attach to the roof framing battens. As shown, for example, in FIG. 13C, four identical roofing panels can be provided. The profile chosen for the roof boards utilized in the roof panels can allow the boards to interlock with each other. The alternating exposed channels in the roof boards can aid in preventing rain water from leaking where the boards overlap.

GPS/GPRS Locator Tag

Referring to FIG. 30F, the structure 100, e.g., the roof assembly 110, can be adapted for a GPS/GPRS locator tag 3060 to be installed. The tag 3060 can enable the house to be repossessed, whatever its location, in the event of non-payment of mortgage. Also once the structure 100 is delivered, its exact location can be provided to a mortgage company as security for a rural address system based on GPS location; i.e. when a structure 100 is delivered to a rural area with no street address, its location can be identified through a GPS address; this location data may then be used to create a national web of rural addresses, from which to create a national delivery system in rural 'off-grid' areas may allow the creation of an asset register for credit checks.

Referring to FIG. 30F, the GPS/GPRS locator tag 3060 may be within or on the upper portion of a truss chord 3020 (e.g., one of the bottom truss chord 3020). Depending on the selected size of the tag 3060, the tag 3060 may be placed in a shallow mortise formed within the bottom truss chord 3020.

In the event that a structure 100 becomes subject to repossession, a crew may travel to the registered location obtained from the tag 3060 and after removing any locking mechanism as described in regards to FIG. 32, lift the structure 100 up off the helical piers 410, place the structure 100 on a truck or trailer, and drive the structure to its new location or an impound/storage facility. In one approach, once the crew has removed the structure 100 to a safe location, the structure 100 may be taken apart and repurposed for use into inventory for redeployment elsewhere. This allows safe removal and reuse of the structure 100 with minimal likelihood of confrontation.

Various applications and/or other functionality may be executed according to various embodiments of the present disclosure. The tag 3060 can comprise a computing device and may be executed to identify a location of the structure 100. The tag 3060 may be in data communication over a network, including, for example, the internet, intranets, extranets, wide area networks (WANs), local area networks (LANs), wired networks, wireless networks, cable networks, satellite networks, or other suitable networks, etc., or any combination of two or more such networks.

In some examples, the tag 3060 may be in data communication with a remote computing device over the network. The remote computing device may be any computing device, computing environment, data provider, service provider, or computing resource provider, which may include an electronic address application (or system) for rural ecommerce and other applications where physical address identification may be desirable. Also, various data may be stored in a data store that is accessible to the tag 3060. The data stored in the data store can be associated with the operation of the applications or functional entities as further described herein.

The tag 3060 can be mechanically connected to the roof assembly 110. The tag 3060 may be executed to electronically identify a location of the modular structure 100. The tag 3060 comprising the computing device can be configured to store the location of the modular structure 100 in the data store in data communication with the remote computing device. In some examples, the computing device is configured to store an identifier in the data store that uniquely identifies a particular modular structure 100 from among other ones of the modular structure 100. The identifier can comprise a media access control (MAC) address of a network interface card (NIC), International Mobile Subscriber Identity (IMSI), International Mobile Equipment Identity (IMEI), a mobile subscriber integrated services digital network number (MSISDN), temporary Mobile Subscriber Identity (TMSI), globally unique temporary ID (GUTI) or other aspect or functionality associated with the tag 3060. In some examples, the tag 3060 comprising the computing device can generate and store the identifier that uniquely identifies the structure 100 by the location of the structure 100 electronically identified by the tag 3060.

Any logic or application described herein, including the tag 3060, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the tag 3060, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment. Additionally, it is understood that terms such as "application," "service," "system," "engine," "module," and so on may be interchangeable and are not intended to be limiting.

Figure 33:
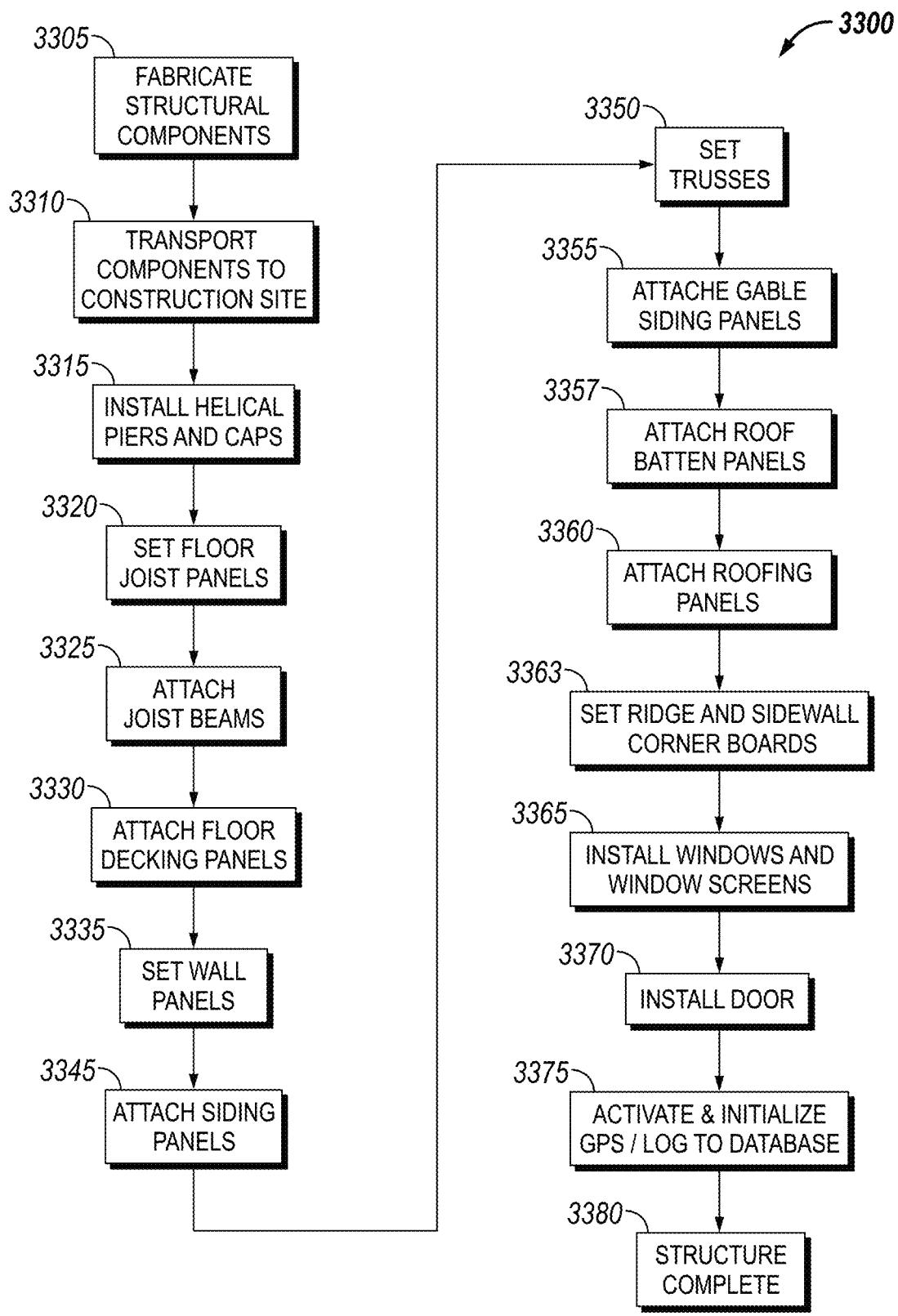
FIG. 33 illustrates a flow chart illustrating a method for the structure according to various embodiments of the present disclosure.

FIG. 33 illustrates a flow chart illustrating a method 3300 for the structure 100 the present disclosure. The method 330 shown in FIG. 33 illustrates examples for constructing the structure 100, among other things.

At box 3305, components of the structure 100 can be prefabricated centrally, e.g., beginning with milling lumber, roofing & siding, and assembling the lumber into the modules and panels described in more detail below. At box 3310, the prefabricated components can be shipped to a site where the structure 100 can be assembled typically in less than a day. In one example configuration, the structure 100 comprises the following modules or assemblies or panels, that when interconnected as described and shown, can substantially comprise the complete structure 100: two floor joist panels 1600; two floor decking panels 1700; floor beams (cut to length, and wall battens attached thereto); six framing panels 505 (also may be referred to herein as "wall panels") with attached framing battens; six siding panels 510 with attached siding battens; five roof trusses; two gable siding panels; two roof batten panels/assemblies; four roofing panels; five assemblies of ridge boards and corner boards; four windows; four screens; one door; and six helical piers 410; in addition to structural and non-structural eave blocks, ten truss eave blocks, fascia blocks, and other components illustrated in the referenced Figures.

At box 3315, installation and construction of the structure 100 can proceed with layout and installation of a foundation assembly 395 comprising helical piers 410. The foundation assembly 395 can comprise helical pier caps 400. Box 3315 can include removably fastening a floor assembly 200 to a foundation assembly 395 comprising the helical pier caps 400.

At box 3320, the method 3300 can include removably fastening floor joist panels 1600 to the helical pier caps 400. The floor joist panels 1600 can be set and attached to the helical pier caps 400 with structural fasteners.

At box 3325, the joist beams can be attached to joists and helical pier caps 400. At box 3330, the floor decking panels 1700 can be attached and nailers 1501 can be fastened to side joists.

The method 3300 can include removably fastening at least four modular wall assemblies 105 to the floor assembly 200 as described herein. The modular wall assemblies 105 can be adapted to support a roof assembly 110. The modular wall assemblies 105 can include a plurality of wall framing panels 505 comprising wall battens 1830 and a plurality of siding panels 510 comprising siding battens 1840.

At box 3335, the wall framing panels 505 can be set by directly fastening to joists and a plurality of wedge tenons secured thereto. At box 3345, the method 3300 can include engaging the siding battens 1840 with the wall battens 1830 to removably fasten the siding panels 510 to the wall framing panels 505. The siding panels 510 can be attached by directly engaging wall battens 1830 with the siding battens 1840.

At box 3350, wall trusses can be set, including truss bridging. At box 3355, gable siding panels can be attached by directly fastening wall battens 1830 to siding battens 1840. At box 3357, roof batten panels can be attached and truss eave blocks installed. At box 3360, roofing panels can be installed by directly fastening truss battens to roofing battens. At box 3363, ridge and sidewall corner boards can be set and attached with fasteners.

As previously noted, the plurality of wall framing panels 505 can include a plurality of wall studs 1825 adapted to be removably fastened to a door or a window. At box 3365, windows and window screens can be installed by directly fastening windows to the wall studs 1825. At box 3370, a door can be installed by directly fastening to the wall studs 1825. At box 3375, the structure location determination device can be activated. The method 3300 can include mechanically connecting a Global Positioning System (GPS) or General Packet Radio Service (GPRS) device 3060 (FIG. 30F) to the roof assembly. A location can be measured for the construction site.

At box 3380, the method 3300 can include removably fastening a locking mechanism 3200, 3205, and 3210 to the floor assembly 200 and the foundation assembly 395 by at least one of a plurality of fasteners 420, 430. The locking mechanism 3200, 3205, and 3210 can be adapted to inhibit access to the structural bolts 430 or any of at least one of the plurality of fasteners 420, 430. Thereafter, the process can proceed to completion.

The particular implementations shown and described herein are illustrative of the disclosure and its best mode and are not intended to otherwise limit the scope of the present disclosure in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the disclosure. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present disclosure. These and other changes or modifications are intended to be included within the scope of the present disclosure, as expressed in the following claims, which illustrate non-limiting embodiments of the present disclosure.

The invention claimed is:

1. A modular construction system, comprising:
a modular structure having:
a floor assembly configured to be removably fastened to a helical pier foundation assembly by at least one of a plurality of fasteners, the helical pier foundation assembly comprising helical pier caps;
a locking mechanism configured to be removably fastened to the floor assembly and the foundation assembly such that the locking assembly inhibits access to the at least one of the plurality of fasteners;
a roof assembly comprising at least four purlins; and
at least four modular wall assemblies removably fastened to the floor assembly, the modular wall assemblies comprising:
a plurality of wall framing panels comprising wall battens; and
a plurality of siding panels comprising siding battens configured to engage with the wall battens on the plurality of wall framing panels such that the siding panels are removably fastened to the wall framing panels;
wherein the at least four modular wall assemblies support the roof assembly.

2. The system of claim 1, wherein the modular structure further comprising:
two floor joist panels installed on the helical pier caps; and
two floor decking panels installed on the floor joist panels.

3. The system of claim 1, wherein the siding battens configured to engage with the wall battens comprises strips of the siding battens adapted to interlock with strips of the wall battens to form a finished wall.

4. The system of claim 1, wherein the siding battens comprise a plurality of bottom siding battens, and the floor assembly comprises a plurality of floor beams comprising a plurality of floor battens, the at least four modular wall assemblies being removably fastened to the floor assembly based at least in part by the bottom siding battens engaging the floor battens.

5. The system of claim 1, wherein the plurality of wall framing panels further comprise a plurality of wall studs adapted to be removably fastened to a door or a window.

6. The system of claim 1, wherein at least one of the siding panels is adapted to form a cutout for supporting a door or a window in an instance in which the at least one of the siding panels is removably fastened to at least one of the wall framing panels.

7. The system of claim 1, wherein the floor assembly comprises:
two floor joist panels;
two decking panels; and
a plurality of floor beams comprising floor battens.

8. The system of claim 1, wherein the siding panels comprise a plurality of tongue-and-groove siding boards.

9. The system of claim 1, wherein each one of the plurality of wall framing panels is a predefined height in meters.

10. The system of claim 1, wherein the roof assembly further comprises roof members comprising a truss batten and a roof batten.

11. The system of claim 1, wherein the roof assembly further comprises a plurality of top chords, a plurality of web members, at least one web post, and at least one bottom chord.

12. The system of claim 1, further comprising a global positioning system (GPS), a general packet radio service (GPRS), or a radio-frequency identification (RFID) device that is mechanically connected to the roof assembly for electronically identifying a location of the modular structure, wherein the global positioning system (GPS), the general packet radio service (GPRS), or the radio-frequency identification (RFID) device is configured to store the location of the modular structure in a data store in data communication with a remote computing device.

13. The system of claim 1, wherein the at least four modular wall assemblies comprise two truss bearing walls and two gable end walls.

14. The system of claim 13, wherein at least one of the truss bearing walls is joined to at least one of the gable end walls by a wedge and peg or wedged tenon attachment and retention mechanism.

15. A method, comprising:
removably fastening a floor assembly to a helical pier foundation assembly comprising helical pier caps;
removably fastening floor joist panels to the helical pier caps;
removably fastening at least four modular wall assemblies to the floor assembly, the modular wall assemblies adapted to support a roof assembly comprising at least four purlins, the modular wall assemblies comprising:
a plurality of wall framing panels comprising wall battens; and
a plurality of siding panels comprising siding battens; and
engaging the siding battens with the wall battens to removably fasten the siding panels to the wall framing panels; and
removably fastening a locking mechanism to the floor assembly and the helical pier foundation assembly by at least one of a plurality of fasteners, the locking mechanism adapted to inhibit access to the at least one of the plurality of fasteners.

16. The method of claim 15, further comprising:
mechanically connecting a Global Positioning System (GPS) or General Packet Radio Service (GPRS) device to the roof assembly.

* * * * *